US008799537B1

(12) United States Patent
Zhu et al.

(10) Patent No.: US 8,799,537 B1
(45) Date of Patent: Aug. 5, 2014

(54) TRANSFER OF UNCOMPRESSED MULTIMEDIA CONTENTS AND DATA COMMUNICATIONS

(75) Inventors: Ning Zhu, San Jose, CA (US); Soumendra Mohanty, San Jose, CA (US)

(73) Assignee: Analogix Semiconductor, Inc., Santa Clara, CA (US)

( * ) Notice: Subject to any disclaimer, the term of this patent is extended or adjusted under 35 U.S.C. 154(b) by 152 days.

(21) Appl. No.: 13/461,761

(22) Filed: May 1, 2012

Related U.S. Application Data

(63) Continuation-in-part of application No. 13/365,624, filed on Feb. 3, 2012, which is a continuation-in-part of application No. 12/889,796, filed on Sep. 24, 2010, now Pat. No. 8,151,018.

(60) Provisional application No. 61/246,060, filed on Sep. 25, 2009.

(51) Int. Cl.
*G06F 13/20* (2006.01)
(52) U.S. Cl.
USPC .................................. 710/54; 710/51; 710/14
(58) Field of Classification Search
None
See application file for complete search history.

(56) References Cited

U.S. PATENT DOCUMENTS

| 7,856,104 | B2* | 12/2010 | Douillet | 380/223 |
|---|---|---|---|---|
| 7,856,520 | B2* | 12/2010 | Ranade et al. | 710/106 |
| 7,956,618 | B2* | 6/2011 | Lundquist et al. | 324/538 |
| 8,127,335 | B2* | 2/2012 | Hill et al. | 725/109 |
| 8,176,214 | B2* | 5/2012 | Jones et al. | 710/14 |
| 8,246,359 | B2* | 8/2012 | Sloey et al. | 439/76.1 |
| 8,307,401 | B1* | 11/2012 | Lida | 725/80 |
| 8,429,713 | B2* | 4/2013 | Candelore et al. | 726/3 |
| 8,593,996 | B2* | 11/2013 | Lee et al. | 370/265 |
| 2010/0104029 | A1* | 4/2010 | Lee et al. | 375/257 |
| 2010/0260336 | A1* | 10/2010 | Mulcahy | 380/210 |
| 2012/0159032 | A1* | 6/2012 | Onuki | 710/305 |
| 2013/0080665 | A1* | 3/2013 | Park et al. | 710/60 |

* cited by examiner

*Primary Examiner* — Cheng-Yuan Tseng
(74) *Attorney, Agent, or Firm* — Carr & Ferrell LLP

(57) ABSTRACT

A system and corresponding method for selectively communicating data between a first device and a second device is provided. An indication of a configuration of the second device is received by the first device. A selection signal is generated based on the configuration. Universal Serial Bus (USB) protocol data, uncompressed high definition media data, or a combination thereof may be caused to be selectively supplied to the second device by the first device based on the selection signal. The first device may be configured to transmit, on a DisplayPort link to the second device, a data flow comprising both USB protocol data and uncompressed high definition media data signals. The devices may be configured such that the USB protocol data is transferred from the second device to the first device during a video blanking period associated with the uncompressed high definition media data signals.

20 Claims, 40 Drawing Sheets

| Detection state | Compatiblity |
|---|---|
| Ground | USB |
| floating | USB |
| 124k ohm | USB |
| 68k ohm | USB |
| 36.5k ohm | USB |
| 10k ohm | HD uncompressed media data signal |

300

4200

| SS | SS | SS | SS |
|---|---|---|---|
| SS | SS | SS | SS |
| Dtotal23:16 | Dtotal23:16 | Dtotal23:16 | Dtotal23:16 |
| Dtotal15:8 | Dtotal15:8 | Dtotal15:8 | Dtotal15:8 |
| Dtotal7:0 | Dtotal7:0 | Dtotal7:0 | Dtotal7:0 |
| SE | SE | SE | SE |

| SS | SS |
|---|---|
| SS | SS |
| Dtotal23:16 | Dtotal23:16 |
| Dtotal15:8 | Dtotal15:8 |
| Dtotal7:0 | Dtotal7:0 |
| Dtotal23:16 | Dtotal23:16 |
| Dtotal15:8 | Dtotal15:8 |
| Dtotal7:0 | Dtotal7:0 |
| SE | SE |

| SS |
|---|
| SS |
| Dtotal23:16 |
| Dtotal15:8 |
| Dtotal7:0 |
| Dtotal23:16 |
| Dtotal15:8 |
| Dtotal7:0 |
| Dtotal23:16 |
| Dtotal15:8 |
| Dtotal7:0 |
| Dtotal23:16 |
| Dtotal15:8 |
| Dtotal7:0 |
| SE |

FIG. 42

TRANSFER OF UNCOMPRESSED MULTIMEDIA CONTENTS AND DATA COMMUNICATIONS

CROSS-REFERENCE TO RELATED APPLICATIONS

The present application is a continuation-in-part of U.S. patent application Ser. No. 13/365,624 filed Feb. 3, 2012, which is a continuation-in-part of U.S. patent application Ser. No. 12/889,796, filed Sep. 24, 2010 now U.S. Pat. No. 8,151,018, which claims the benefit of U.S. Provisional Patent Application No. 61/246,060 filed Sep. 25, 2009. Each of the above-cited applications are herein incorporated by reference.

FIELD OF INVENTION

The present invention relates generally to data transfer and, more particularly, to transfer of data, multimedia, or a combination thereof from source device to downstream device over a single source device port.

BACKGROUND

A Universal Serial Bus (USB) communication standard is a universal wired interface and protocol to enable electronic devices to exchange data. Various connectors are specified for information exchange in accordance with the standard. One or more dedicated USB ports, i.e., USB connectors, are typically employed in an electronic device. There are three basic types of connectors identified in various USB 2.0 Specifications: Standard, Mini-USB, and Micro-USB connectors. In USB 3.0 Specifications, two basic types of connectors are defined: Standard, and Micro-USB connectors. The USB port of a device is typically coupled to the USB port of another device via a cable. A USB transceiver may be employed in each device to send and receive USB protocol signals to and from the corresponding USB port. Additionally, the USB protocol defines the power and ground connectivity between the two devices.

A DisplayPort (DP) communication standard is an interface and link protocol for transferring high definition video/audio and data across computer systems and electronics devices. The Video Electronics Standards Association (VESA) has defined various standards versions, which are incorporated by reference herein, including 1.1, 1.1a and 1.2. The DisplayPort standard defines a multi-laned one-way serial interface for connecting a source device, such as a system that generates a media or multimedia signal, i.e., video and/or audio, with a sink device, such as a display that renders the signal in audio-visual manner. Additionally, the DisplayPort standard defines a two way serial communication side-band channel, along with the multi-laned serial interface, for device configurations on either side of the connected link to identify and set the correct transmission of the multimedia content. The DP communications standard is defined by VESA as royalty free.

The DP protocol is scalable in terms of usable bandwidth and has a higher bandwidth than the high definition multimedia interface (HDMI) standard. The DP protocol uses one to four pairs of communication lines (called lanes) depending on the bandwidth needed to transmit a single video/audio stream. In case the link does not need four lanes to transfer information, one or two lanes can also be used to transfer one stream of video/audio data or multiple streams/displays of video/audio data depending on the bandwidth needed. The two-way serial communication side-band channel is responsible for setting up the lanes requirement and other communications on both sides.

A dedicated DP protocol connector may be employed in a device for multimedia content communication with an external device in accordance with the DP communication standard. Most electronic devices that support wired data communication employ one or more USB connectors, but do not include a DP protocol connector due to size or upgradability limitations. Such electronic devices may include set-top boxes, and handheld communication devices, such as mobile telephones, tablets, digital still cameras, digital video camcorders, mp4 players, and media players, for example. What is needed is a more efficient system for communicating with devices having different communication protocols.

SUMMARY OF THE INVENTION

Various embodiments provide a system and method for transferring data. The data may be transferred between a USB port of a first device and a media port of a second device that is compatible with a first media standard. Uncompressed high definition media data may be received at a USB connector from the USB port. The received uncompressed high definition media data may be caused to be supplied to a media connector in accordance with the first media standard, such that the supplied data can be transmitted in accordance with the first media standard via the media connector to the media port of the second device. The uncompressed high definition media data may include multimedia data and side-band communication data. A single signal is encoded and decoded in accordance with a protocol such that the side-band communication to and from the source device can be communicated via the single signal. In some embodiments, the data and the uncompressed high definition media data may be transferred through a single physical connector interface.

According to various embodiments, data is transferred between a USB port of a first device and a media port of a second device, the media port being compatible with a first media standard. Uncompressed high definition media data may be received from the USB port of the first device. The received uncompressed high definition media data may be caused to be supplied to a media connector in accordance with the first media standard, such that the supplied uncompressed high definition media data in accordance with the first media standard can be transmitted in accordance with the first media standard via the media connector to the media port of the second device.

In some embodiments, a system for transferring data may include a universal serial bus (USB) connector having a first plurality of pins and a media connector having a second plurality of pins. The system may also include an electrical cable and a circuit. The electrical cable is for coupling the USB connector to the media connector and includes a plurality of conductors. The circuit is coupled to at least some of the plurality of conductors of the electrical cable at points between ends of the first plurality of pins of the USB connector and ends of the second plurality of pins of the media connector. The circuit is operable to cause uncompressed high definition media data received at the USB connector from a first device to be supplied in accordance with a first media standard to the media connector, such that the supplied media data can be transmitted via the media connector to a second device.

BRIEF DESCRIPTION OF THE DRAWINGS

FIG. 35$b$ is a block diagram of an exemplary embodiment of a system that allows USB data transmission on a media port link configured to transmit USB data in a USB mode.

FIG. 35$c$ is a block diagram of an exemplary embodiment of a system that allows USB data transmission on a media port link configured to transmit data in a mixed mode.

FIG. 42 is a table illustrating an exemplary main stream attribute data format.

DETAILED DESCRIPTION OF EXEMPLARY EMBODIMENTS

A system and corresponding method for transferring data is provided. Universal Serial Bus (USB) protocol data or uncompressed high definition media data may be selectively supplied to a USB port of a device based on an indication of a device type received by the device. The selected data can be transmitted via the USB port to an external interface. The uncompressed high definition media data may comprise at least one lane of media (or multimedia) data in accordance with a DisplayPort standard. The indication may be received at the USB port from an external interface and may be indicative of a USB mode or a media mode. In the USB mode, the USB protocol data is supplied to the USB port. In the media mode, high definition media data from the transmitter is supplied to the USB port. The device may be configured in the USB mode to receive USB protocol data via the USB port from the external interface. The external interface may be coupled to another device for transferring the USB protocol data or uncompressed high definition media data.

The uncompressed high definition media data may comprise at least one lane of media or multimedia data in accordance with a DisplayPort standard. Also, a two-way serial communication side-band channel is provided for setting up the lanes requirement and other communications on both sides. This channel may accommodate 3-wires (namely AUXP, AUXN and HPD) of communication into a single wire externally to both the devices on either side. Internal to the device, the signals through the three wires may be encoded, electrically transmitted across and then decoded on the other side. An extra layer of protocol may be defined on top of a standard, such as a DisplayPort Standard, to accomplish this task over 1-wire have it transmitted or received over 1-pin of the USB Port.

Figure 1A:
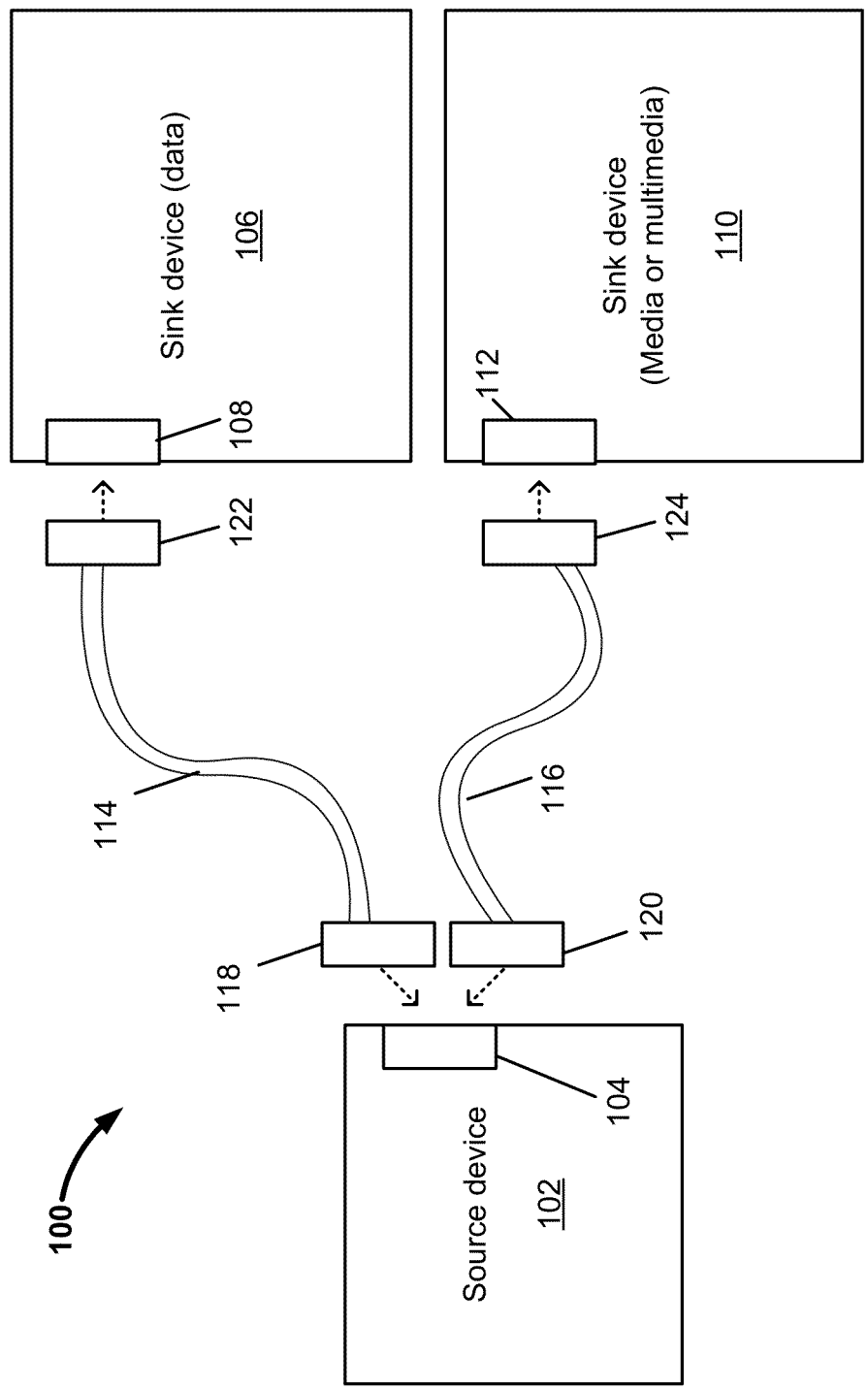
FIG. 1A is a block diagram of an environment for dual-mode data transfer of uncompressed multimedia contents or data communications.

FIG. 1A is an exemplary block diagram of an environment 100 for dual-mode data transfer of uncompressed media (or multimedia) contents or data communications. The environment 100 includes a system for transferring data according to various embodiments. The environment 100 includes a source device 102, a first sink device 106, and a second sink device 110. Source device 102 has a USB port 104, first sink device 106 includes a USB port 108, and second sink device 110 includes a DisplayPort port 112.

Source device 102 may provide an output of data in USB format or in another data transmission format over port 104. Source device 102 may communicate with first sink device 106 via USB cable 114 and with second sink device 110 via media cable 116. An exemplary source device 102 is discussed in more detail below with respect to FIG. 1B.

The USB port 104 and USB port 108 may be one of various types including, but not limited to, a Micro-USB connector in accordance with a USB 3.0 specification standard, a Mini-USB connector in accordance with a USB 2.0 specification standard, and a Micro-USB connector in accordance with a USB 2.0 specification standard. The term "port" may also be referred to herein as a receptacle or connector. Hence, "port" as used herein is merely explanatory for emphasizing the function as a receptacle included as part of a device that may accept a corresponding connector (plug).

A USB cable 114 may be used to couple source device 102 with first sink device 106 via USB ports 104 and 108 of devices 102 and 106, respectively. Device 106 may also be considered a master or a slave device, at least because USB transactions are bi-directional. Hence, either end of the USB connection (for example, device 106) may be considered either the master or the slave device in the connection, depending on who controls the transaction and what devices are connected on both sides. The USB cable 114 may have a USB connector 118 at one end and a USB connector 122 at the other end. The USB connectors 118 and 122 may each be configured to "plug" into the corresponding USB ports 104 and 108.

Media cable 116 may be used to couple source device 102 with second sink device 110. Media cable 116 includes a connector 120 at one end and a connector 124 at the other end. The connector 120 may be a USB connector configured to plug into port 104 of source device 102, and connector 124 may couple to port 112 of the second sink device 110. Media cable 116 may include conductors, circuits and other components to couple the connectors 120 and 124.

First sink device 106 may receive and/or transmit data in accordance with a USB standard or protocol. Though source device 102 may typically act as a "host" in a connection with first sink device 106, first sink device 106 may also act as a host in the connection. Examples of first sink device 106 include a camera, smart phone, and video cam.

Second sink device 110 may receive media (audio or video) or multimedia (both audio and video) signals via the media cable 116 and provide a media output (video and/or audio) or otherwise process the received data. Port 112 on second sink device 110 may be a media or multimedia port. In some embodiments, second sink device 110 is a Display Port compatible device, and port 112 is configured to receive a DisplayPort compatible connection. Port 112 and connector 124 may also be compatible with other media or multimedia standards. Examples of second sink device 110 include a projector, television, or other media or multimedia capable device.

Figure 1B:
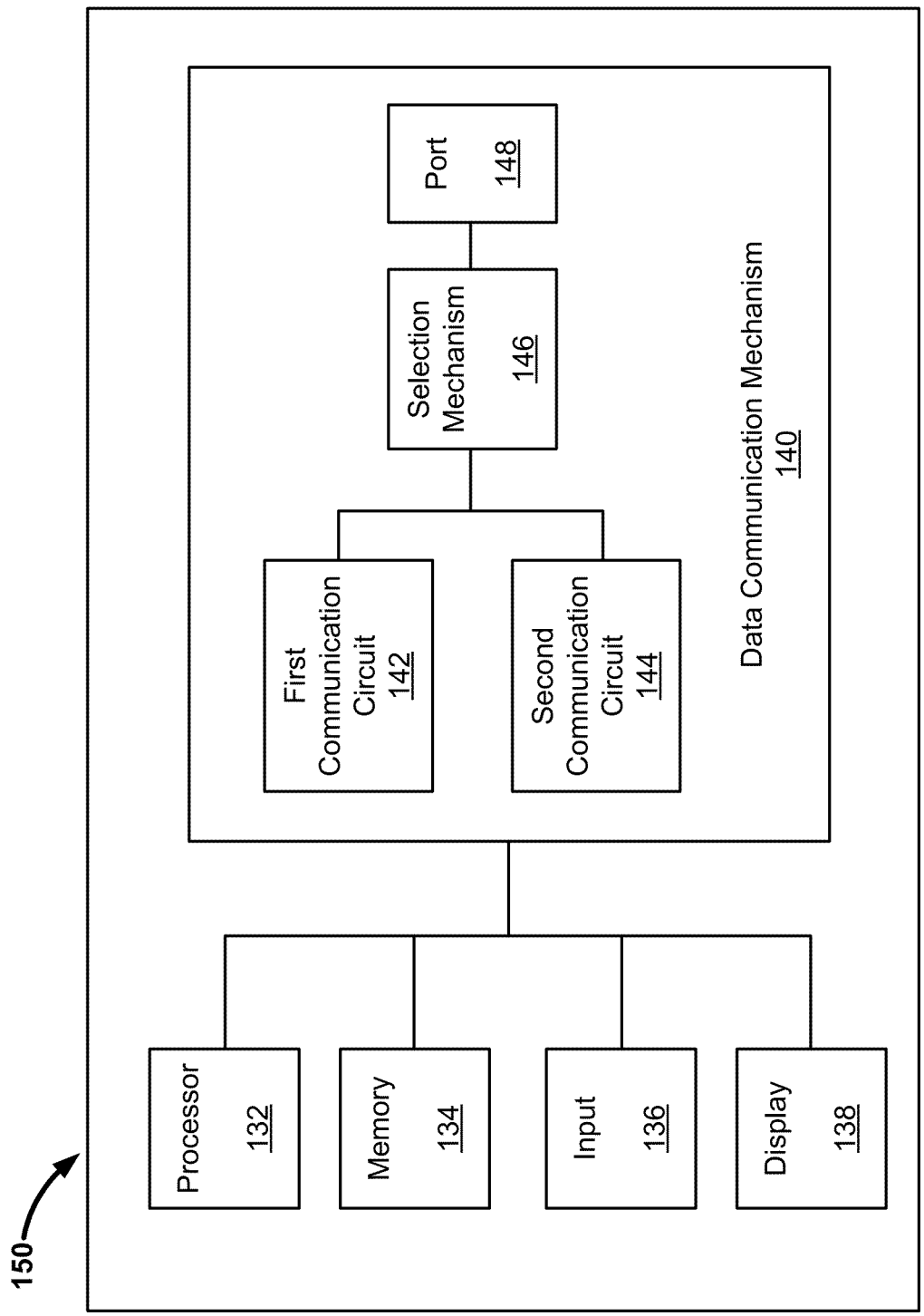
FIG. 1B is a block diagram of an exemplary source device.

FIG. 1B is a block diagram of an exemplary source device 150. Source device 150 may be used to implement source device 102 of FIG. 1A. Source device 150 includes a processor 132, memory 134, input 136, display 138, and data communication mechanism 140. Exemplary source device 150 may include additional or fewer components that those illustrated in FIG. 1B.

Processor 132 may be used to execute instructions that are stored in memory 134. Processor 132 may be implemented by one or more processors, one or more controllers, and other devices with execute instructions and control other devices.

Memory 134 may include a main memory for storing instructions as well as mass storage device, such as a magnetic disk drive or an optical disk drive. The mass storage device may include a non-volatile storage device for storing data and instructions for use by processor 132.

Input 136 may include one or more mechanisms for receiving data from a user or other system, such as but not limited to a keypad, various buttons, a touch screen, one or more microphones, and other input devices.

Display 138 may be a screen for providing an output to a user. The interface may be in the form of video or other media. The output may also be provided as audio, wireless data signal, or in some other data format over a suitable output mechanism (not illustrated in FIG. 1B).

Data communication mechanism 140 may include a first communication circuit 142, second communication circuit 144, selection mechanism 146, and port 148. Selection mechanism 146 may detect a connection type at port 148. Based on the detected connection type, selection mechanism 146 may enable communication through port 148 for either first communication circuit 142 or second communication circuit 144. The communication circuits 142 and 144 may communicate using different protocols, such as a USB 2.0 protocol, USB 3.0 protocol, a DataPort protocol, or some other protocol. The data signals sent by the different protocols of communication circuits 142 and 144 are configured to be sent over the same port 148. In some embodiments, data communication mechanism 140 may include more than two communication circuits and selectively configure communication over more than one port of source device 150. Exemplary data communication mechanisms are discussed in more detail below with respect to FIGS. 2, 4-11 and 14-15.

The source device 102 may be a device, portable or otherwise, having a USB port 104. The source device 102 may be, for example, small enough to be portable for a user, such as a cell phone or other mobile device. Mobile devices typically have a USB port operative for charging the battery of the device, and for data transfer and syncing with another device. The reduced size required for portability and transport may preclude adding another port for providing capability beyond these typical USB port capabilities.

Figure 2:
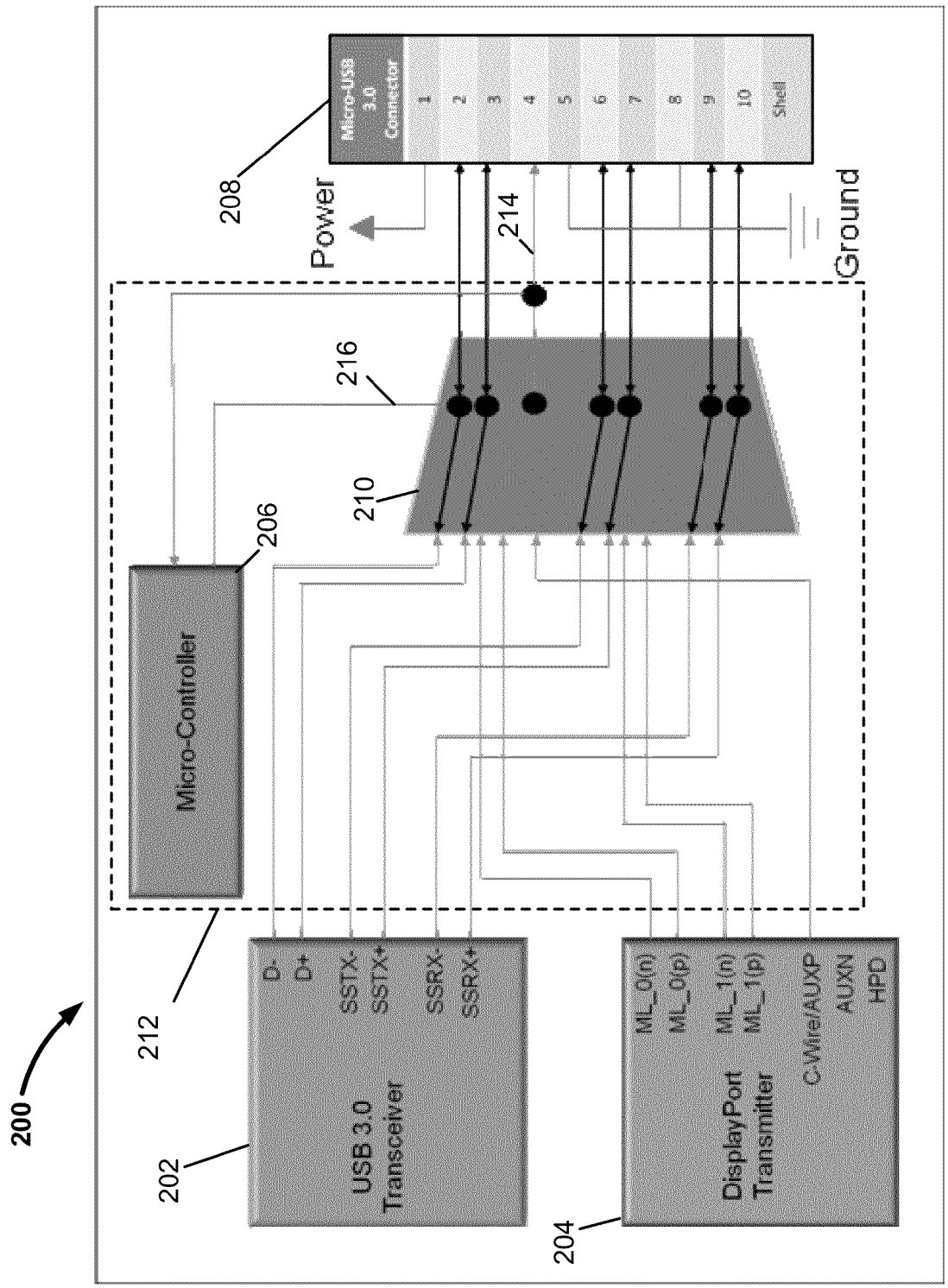
FIG. 2 is a block diagram of an exemplary data communication mechanism compatible with a Micro-USB 3.0 connector and selectively operating in a USB mode.

FIG. 2 is a block diagram of a exemplary system 200 for a source device having a Micro-USB 3.0 connector and selectively operating in a USB mode. The system 200 includes a USB 3.0 transceiver circuit 202, a DisplayPort transmitter circuit 204, a selection circuit 212, and a Micro-USB 3.0 connector 208. The USB 3.0 transceiver circuit 202 conforms to a USB 3.0 standard and may variously supply a data positive signal (D+), data negative signal (D−), super speed transmitter data positive signal (SSTX+), super speed transmitter data negative signal (SSTX−), super speed receiver data positive signal (SSRX+), and super speed receiver data negative signal (SSRX−). The D+ and D− signals are legacy USB 2.0 data signals, while the super speed signals are features of USB 3.0 for providing higher speed data communication.

The DisplayPort transmitter circuit 204 may be operative to transmit uncompressed high definition media signals. High definition media signals may include video signals having a resolution of at least a 720p, but may also include 720i, 1080i, 1080p video formats. In some embodiments, the uncompressed high definition media signals may be multimedia signals comprising both uncompressed high definition video data and compressed or uncompressed audio data.

DisplayPort transmitter circuit 204 may provide uncompressed high definition media or multimedia signals based at least in part on a DisplayPort standard. The signals may include at least one differential video data pair defining a lane in accordance with a DisplayPort standard. Two lanes are shown in the example in FIG. 2: lane number one differential pair, i.e., ML_0(n) and ML_0(p), and lane number two differential pair, i.e., ML_1(n) and ML_1(p). The DisplayPort transmitter circuit 204 provides uncompressed high definition media data that may include side-band communication data. In the example in FIG. 2, the side-band communication data is shown as a single C-wire signal that may be based on one or more of an Auxiliary channel positive signal (AUXP), an Auxiliary channel negative signal (AUXN), and a Hot Plug Detect signal (HPD) of the DisplayPort protocol.

In the environment 100 in FIG. 1, the source device 102 has a USB port 104. The Micro-USB 3.0 connector 208 is also referred to herein as the USB port 208 for the source device.

The selection circuit 212 includes a micro-controller 206 and a switch 210. In some embodiments, the switch 210 is an analog switch. The selection circuit 212 is operative to selectively couple the USB 3.0 transceiver circuit 202 or the DisplayPort transmitter circuit 204 to the USB port 208 based on an indication of a device type received through port 208. The indication may be received as a data format signal 214 received at a pin of the USB port 208 (see e.g., pin 4 of USB port 208). The pin of the USB port 208 may receive the device type indication from an external interface (see e.g., cables 114 and 116 in FIG. 1A). The data format signal 214 is coupled to the micro-controller 206. In some embodiments, the micro-controller 206 may generate a selection signal 216 based on the data format signal 214 to cause the switch 210 to selectively couple either the USB 3.0 transceiver circuit 202 or the DisplayPort transmitter circuit 204 to the USB port 208. The micro-controller 206 may be a standalone device or be embedded in another device such as an application processor. The term "micro-controller" may also be referred to herein as a "controller".

The data format signal 214 provides an indication of a data format to communicate over port 208. According to various embodiments, a predetermined impedance may be coupled between one of the conductors of a cable (e.g., cables 114 and 116 in FIG. 1A) and ground in order to provide the indication to the USB connector (USB port) connected to the cable. For instance, referring to FIG. 1A, plugging in either respective connector 118 or 120 of the respective cables 114 and 116 into the USB port 104 (connector 208 in FIG. 2) provides an indication to the source device 102 of a data type associated with the cable. Although the indication is shown as the data format signal 214 received at pin 4 of connector 208, another suitable pin may be used to receive the indication.

Figure 3:
FIG. 3 is an exemplary table illustrating compatibility for various detection states of the system.

FIG. 3 is an exemplary table 300 illustrating compatibility for various detection states of the system. The detection state represents detection of the predetermined impedance coupled to the cable conductor to provide the device type indication. The USB specification and the USB On-The-Go (OTG) supplement thereto define various impedances and corresponding states for an ID pin of the USB connector, e.g. pin 4 of connector 208 in the micro-USB 3.0 example in FIG. 2.

The first five detection states (i.e., ground, floating, 124 k ohm, 68 k ohm, and 36.5 k ohm) each represent a particular defined state compatible with a USB standard. Any of these first five states may thus provide an indication of USB compatibility. According to various embodiments, the detection state associated with USB compatibility, provides an indication of a USB device type. In the example in FIG. 2, responsive to the indication of a detection state associated with USB compatibility, the micro-controller 206 may generate a selection signal 216 to cause the switch 210 to selectively couple the USB 3.0 transceiver 202 to the USB port 208. For example, a USB cable such as the USB cable 114 in FIG. 1A may provide one of ground, floating, 124 k ohm, 68 k ohm, and 36.5 k ohm impedance detection states in FIG. 3 to provide an indication of USB compatibility.

An HD uncompressed media data signal may be indicated at the ID pin. For example, the uncompressed media data signal may have a detection state associated with an impedance other than that for a USB detection state and distinguishable from any USB detection state. Examples of such an impedance include 20 k ohm, 15 k ohm, 10 k ohm, 5 k ohm, or some other level of impedance. Though a particular impedance level of 10 k ohm may be discussed herein, different levels of impedance may be used to associate an uncompressed media data signal from USB signals at an ID pin.

Figure 4:
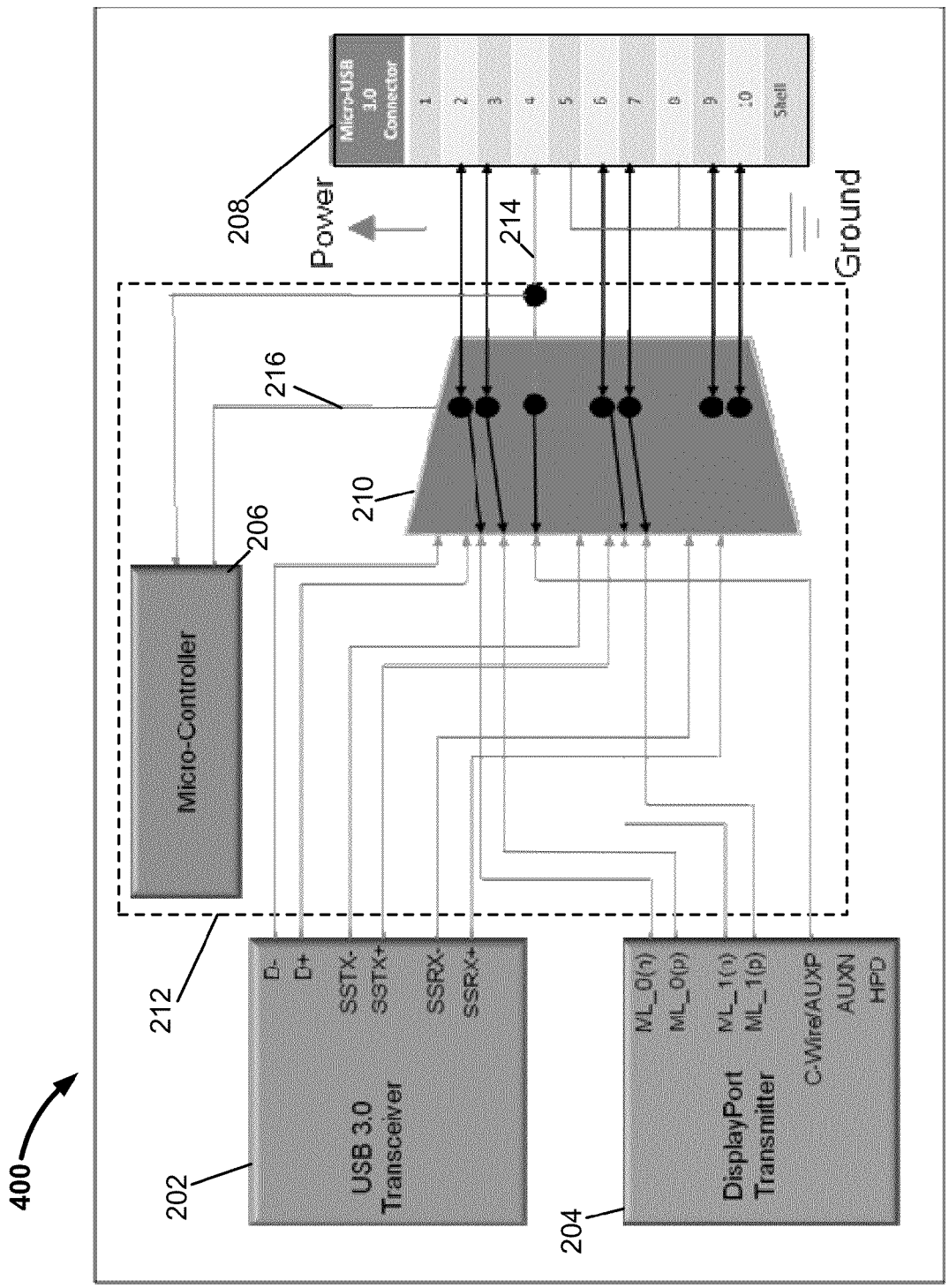
FIG. 4 is a block diagram of a exemplary data communication mechanism compatible with a Micro-USB 3.0 connector and selectively operating in a media mode.

According to various embodiments, a detection state shown in FIG. 3 corresponding to a 10 k ohm impedance indicates compatibility with a HD uncompressed media data signal cable, i.e., a media mode. Responsive to the indication of the media mode, the micro-controller 206 of selection circuit 212 may generate a selection signal 216 to cause the switch 210 to selectively couple the DisplayPort transmitter 604 to the USB port 208. This selective coupling and media mode operation may be as illustrated in FIG. 4, for example. FIG. 4 is a block diagram of a exemplary system 400 compatible with a Micro-USB 3.0 connector and selectively operating in a media mode.

If the media cable 116 in FIG. 1A provides the 10 k ohm impedance and couples the second sink device 110 and the source device 102, a system 400 in the source device 102 may couple signals from the DisplayPort transmitter 204 to the USB port 208 for supplying via the media cable 116 to the sink device 110. The second sink device 110 may be operative to generate a display and/or audio presentation from the received signals.

Figure 5:
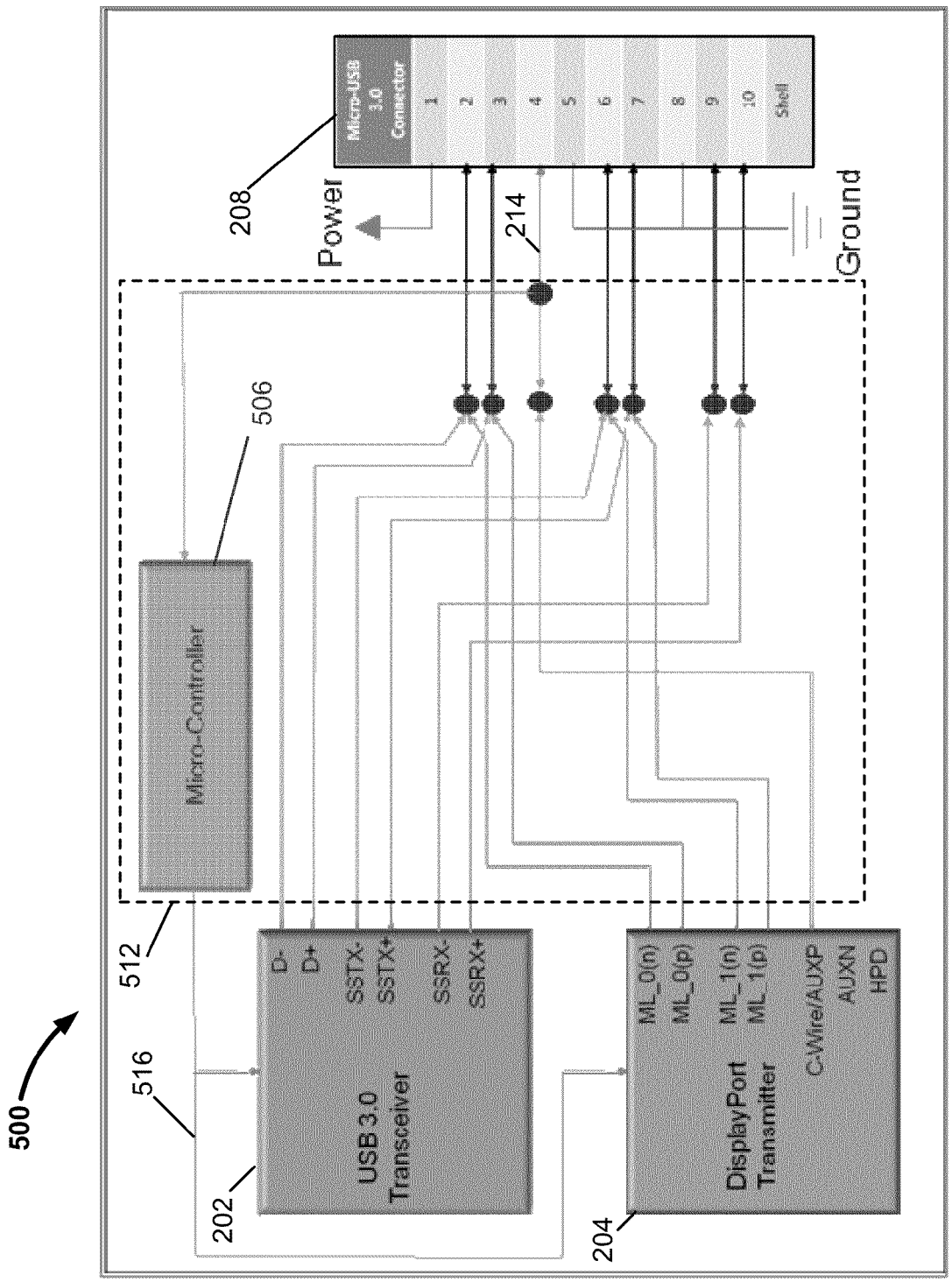
FIG. 5 is a block diagram of a exemplary data communication mechanism compatible with a Micro-USB 3.0 connector in accordance with some embodiments.

FIG. 5 is a block diagram of a exemplary system 500 for a source device having a Micro-USB connector in accordance with some embodiments. The system 500 includes a USB 3.0 transceiver circuit 202, a DisplayPort transmitter circuit 204, and a Micro-USB 3.0 connector 208, similar to the systems 200 and 400 in FIGS. 2 and 4. System 500 does, however, have a different selection circuit, i.e., selection circuit 512, which may not include a switch. The selection circuit 512 may include a micro-controller 506 coupled to the USB 3.0 transceiver circuit 202 and the DisplayPort transmitter circuit 204. Selected outputs from the USB 3.0 transceiver circuit 202 and DisplayPort transmitter circuit 204 to be selectively coupled to the same pin of the connector 208 may be joined as shown in the FIG. 5.

The micro-controller 506 of the selection circuit 512 may selectively couple the USB 3.0 transceiver circuit 202 or the DisplayPort transmitter circuit 204 to the USB port 208 based on a data format signal 214 received at the USB port 208. A selection signal 516 may be generated by the micro-controller 506. The USB 3.0 transceiver circuit 202 or the DisplayPort transmitter circuit 204 may be enabled to communicate with the USB port 208 based on the selection signal 516. The circuit 202 or 204 that is not enabled by selection circuit 512 in the system 500 will not communicate any output to connector 208. The micro-controller 506 may be a standalone device or be embedded in another device such as an application processor.

According to various embodiments, signals from the DisplayPort transmitter circuit 204 may be selectively coupled to different pins of the USB port, e.g., USB port/Micro-USB 3.0 connector 208 in FIGS. 2, 4, and 5. Tables 1, 2, and 3 illustrate schemes 1-36 for various combinations of DisplayPort signals routing to the Micro-USB 3.0 connector and Micro-USB 3.0 connector pin numbers that may be used in some embodiments.

TABLE 1

DisplayPort Signals Routing to the Micro-USB 3.0 Connector

| Scheme 1 | Scheme 2 | Scheme 3 | Scheme 4 | Scheme 5 | Scheme 6 | Scheme 7 |
| --- | --- | --- | --- | --- | --- | --- |
| PWR | PWR | PWR | PWR | PWR | PWR | PWR |
| AUXN | AUXP | AUXN | AUXP | AUXN | AUXP | AUXN |
| AUXP | AUXN | AUXP | AUXN | AUXP | AUXN | AUXP |
| HPD (thru MCU) | HPD (thru MCU) | HPD (thru MCU) | HPD (thru MCU) | HPD (thru MCU) | HPD (thru MCU) | HPD (thru MCU) |
| Ground | Ground | Ground | Ground | Ground | Ground | Ground |
| ML_0(n) | ML_0(n) | ML_0(p) | ML_0(p) | ML_0(n) | ML_0(n) | ML_1(n) |
| ML_0(p) | ML_0(p) | ML_0(n) | ML_0(n) | ML_0(p) | ML_0(p) | ML_1(p) |
| Ground | Ground | Ground | Ground | Ground | Ground | Ground |
| ML_1(n) | ML_1(n) | ML_1(n) | ML_1(n) | ML_1(p) | ML_1(p) | ML_0(n) |
| ML_1(p) | ML_1(p) | ML_1(p) | ML_1(p) | ML_1(n) | ML_1(n) | ML_0(p) |

| DisplayPort Signals Routing to the Micro-USB 3.0 Connector | | | | | Micro-USB 3.0 Connector Pin |
| --- | --- | --- | --- | --- | --- |
| Scheme 8 | Scheme 9 | Scheme 10 | Scheme 11 | Scheme 12 | Numbers N/A |
| PWR | PWR | PWR | PWR | PWR | 1 |
| AUXP | AUXN | AUXP | AUXN | AUXP | 2 |
| AUXN | AUXP | AUXN | AUXP | AUXN | 3 |
| HPD (thru MCU) | HPD (thru MCU) | HPD (thru MCU) | HPD (thru MCU) | HPD (thru MCU) | 4 |
| Ground | Ground | Ground | Ground | Ground | 5 |
| ML_1(n) | ML_1(p) | ML_1(p) | ML_1(n) | ML_1(n) | 6 |
| ML_1(p) | ML_1(n) | ML_1(n) | ML_1(p) | ML_1(p) | 7 |
| Ground | Ground | Ground | Ground | Ground | 8 |
| ML_0(n) | ML_0(n) | ML_0(n) | ML_0(p) | ML_0(p) | 9 |
| ML_0(p) | ML_0(p) | ML_0(p) | ML_0(n) | ML_0(n) | 10 |

TABLE 2

DisplayPort Signals Routing to the Micro-USB 3.0 Connector

| Scheme 13 | Scheme 14 | Scheme 15 | Scheme 16 | Scheme 17 | Scheme 18 | Scheme 19 |
| --- | --- | --- | --- | --- | --- | --- |
| PWR | PWR | PWR | PWR | PWR | PWR | PWR |
| ML_0(n) | ML_0(n) | ML_0(p) | ML_0(p) | ML_0(n) | ML_0(n) | ML_1(n) |
| ML_0(p) | ML_0(p) | ML_0(n) | ML_0(n) | ML_0(p) | ML_0(p) | ML_1(p) |
| HPD (thru MCU) | HPD (thru MCU) | HPD (thru MCU) | HPD (thru MCU) | HPD (thru MCU) | HPD (thru MCU) | HPD (thru MCU) |
| Ground | Ground | Ground | Ground | Ground | Ground | Ground |
| AUXN | AUXP | AUXN | AUXP | AUXN | AUXP | AUXN |
| AUXP | AUXN | AUXP | AUXN | AUXP | AUXN | AUXP |
| Ground | Ground | Ground | Ground | Ground | Ground | Ground |
| ML_1(n) | ML_1(n) | ML_1(n) | ML_1(n) | ML_1(p) | ML_1(p) | ML_0(n) |
| ML_1(p) | ML_1(p) | ML_1(p) | ML_1(p) | ML_1(n) | ML_1(n) | ML_0(p) |

TABLE 2-continued

| DisplayPort Signals Routing to the Micro-USB 3.0 Connector | | | | | Micro-USB 3.0 Connector Pin |
|---|---|---|---|---|---|
| Scheme 20 | Scheme 21 | Scheme 22 | Scheme 23 | Scheme 24 | Numbers N/A |
| PWR | PWR | PWR | PWR | PWR | 1 |
| ML_1(n) | ML_1(p) | ML_1(p) | ML_1(n) | ML_1(n) | 2 |
| ML_1(p) | ML_1(n) | ML_1(n) | ML_1(p) | ML_1(p) | 3 |
| HPD (thru MCU) | HPD (thru MCU) | HPD (thru MCU) | HPD (thru MCU) | HPD (thru MCU) | 4 |
| Ground | Ground | Ground | Ground | Ground | 5 |
| AUXP | AUXN | AUXP | AUXN | AUXP | 6 |
| AUXN | AUXP | AUXN | AUXP | AUXN | 7 |
| Ground | Ground | Ground | Ground | Ground | 8 |
| ML_0(n) | ML_0(n) | ML_0(n) | ML_0(p) | ML_0(p) | 9 |
| ML_0(p) | ML_0(p) | ML_0(p) | ML_0(n) | ML_0(n) | 10 |

TABLE 3

DisplayPort Signals Routing to the Micro-USB 3.0 Connector

| Scheme 25 | Scheme 26 | Scheme 27 | Scheme 28 | Scheme 29 | Scheme 30 | Scheme 31 |
|---|---|---|---|---|---|---|
| PWR | PWR | PWR | PWR | PWR | PWR | PWR |
| ML_0(n) | ML_0(n) | ML_0(p) | ML_0(p) | ML_0(n) | ML_0(n) | ML_1(n) |
| ML_0(p) | ML_0(p) | ML_0(n) | ML_0(n) | ML_0(p) | ML_0(p) | ML_1(p) |
| HPD (thru MCU) | HPD (thru MCU) | HPD (thru MCU) | HPD (thru MCU) | HPD (thru MCU) | HPD (thru MCU) | HPD (thru MCU) |
| Ground | Ground | Ground | Ground | Ground | Ground | Ground |
| ML_1(n) | ML_1(n) | ML_1(n) | ML_1(n) | ML_1(p) | ML_1(p) | ML_0(n) |
| ML_1(p) | ML_1(p) | ML_1(p) | ML_1(p) | ML_1(n) | ML_1(n) | ML_0(p) |
| Ground | Ground | Ground | Ground | Ground | Ground | Ground |
| AUXN | AUXP | AUXN | AUXP | AUXN | AUXP | AUXN |
| AUXP | AUXN | AUXP | AUXN | AUXP | AUXN | AUXP |

| DisplayPort Signals Routing to the Micro-USB 3.0 Connector | | | | | Micro-USB 3.0 Connector Pin |
|---|---|---|---|---|---|
| Scheme 32 | Scheme 33 | Scheme 34 | Scheme 35 | Scheme 36 | Numbers N/A |
| PWR | PWR | PWR | PWR | PWR | 1 |
| ML_1(n) | ML_1(p) | ML_1(p) | ML_1(n) | ML_1(n) | 2 |
| ML_1(p) | ML_1(n) | ML_1(n) | ML_1(p) | ML_1(p) | 3 |
| HPD (thru MCU) | HPD (thru MCU) | HPD (thru MCU) | HPD (thru MCU) | HPD (thru MCU) | 4 |
| Ground | Ground | Ground | Ground | Ground | 5 |
| ML_0(n) | ML_0(n) | ML_0(n) | ML_0(p) | ML_0(p) | 6 |
| ML_0(p) | ML_0(p) | ML_0(p) | ML_0(n) | ML_0(n) | 7 |
| Ground | Ground | Ground | Ground | Ground | 8 |
| AUXP | AUXN | AUXP | AUXN | AUXP | 9 |
| AUXN | AUXP | AUXN | AUXP | AUXN | 10 |

Figure 6:
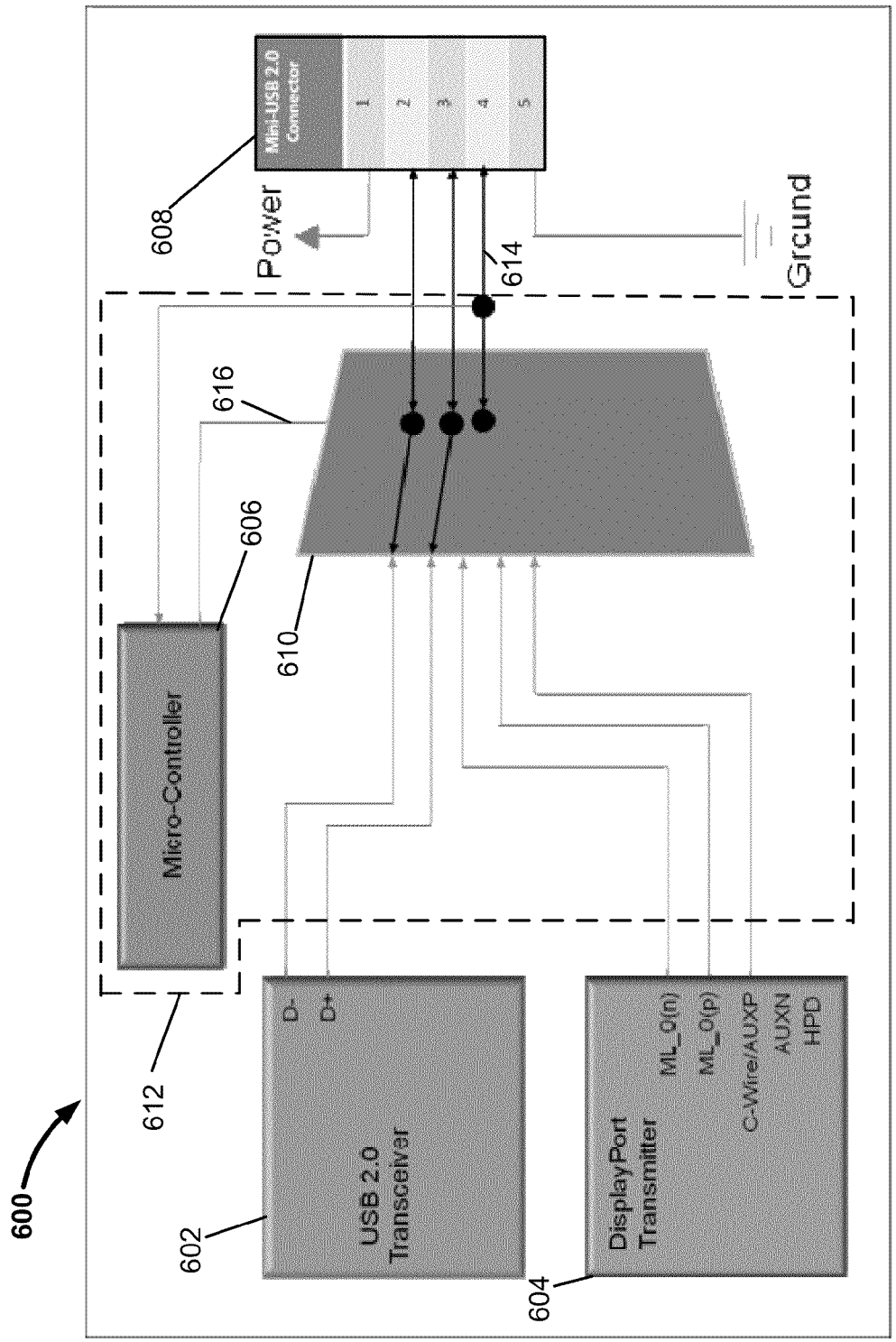
FIG. 6 is a block diagram of a exemplary data communication mechanism compatible with a Mini-USB 2.0 connector and selectively operating in a USB mode.

FIG. 6 is a block diagram of a exemplary system 600 for a source device having a Mini-USB 2.0 connector and selectively operating in a USB mode. The system 600 includes a USB 2.0 transceiver circuit 602, a DisplayPort transmitter circuit 604, a selection circuit 612, and a Mini-USB 2.0 connector 608. The USB 2.0 transceiver circuit 602 conforms to a USB 2.0 standard and may supply a data positive signal (D+), and a data negative signal (D−). The Mini-USB 2.0 connector 608 is also referred to herein as USB port 608 for the source device, see e.g., source device 102 and USB port 104 in FIG. 1A.

The DisplayPort transmitter circuit 604 may transmit uncompressed high definition media signals. The uncompressed high definition media signals may be multimedia signals comprising both uncompressed high definition video and compressed or uncompressed audio. DisplayPort transmitter circuit 604 provides uncompressed high definition media or multimedia signals based at least in part on a DisplayPort standard and include at least one differential video data pair, i.e., ML_0(n) and ML_0(p), defining a lane in accordance with a DisplayPort standard. The DisplayPort transmitter circuit 604 provides uncompressed high definition media data that may include side-band communication data. In the example in FIG. 6, the side-band communication data is shown as a single C-wire signal that may be based on one or more of an Auxiliary channel positive signal (AUXP), an Auxiliary channel negative signal (AUXN), and a Hot Plug Detect signal (HPD) of the DisplayPort protocol.

The selection circuit 612 includes a micro-controller 606 and a switch 610. The switch 610 may be an analog switch or other type of switch. The selection circuit 612 may selectively couple the USB 2.0 transceiver circuit 602 or the DisplayPort transmitter circuit 604 to the USB port 608 based on an indication in form of a data format signal 614 received at the USB port 608. The data format signal 614 may be received at a pin of the USB port 608 (see e.g., pin 4 of USB port 608 in the example). The pin of the USB port 608 may receive the device type indication from an external interface (see e.g., cables 114 and 116 in FIG. 1A). The data format signal 614 is coupled to the micro-controller 606. In some embodiments, the micro-controller 606 may generate a selection signal 616 based on the data format signal 614 to cause the switch 610 to selectively couple either the USB 2.0 transceiver circuit 602 or the DisplayPort transmitter circuit 604 to the USB port 608. The micro-controller 606 may be a standalone device or be embedded in another device such as an application processor.

The data format signal 614 is a signal as described above for the data format signal 214 in FIG. 2, except for being received at a different type of connector (i.e., a Micro-USB 3.0 connector 208 in FIG. 2 and Mini-USB 2.0 connector 608 in FIG. 6). In the example in FIG. 6, responsive to the indication of a detection state associated with USB compatibility, the micro-controller 606 generates a selection signal 616 to cause the switch 610 to couple the USB 2.0 transceiver 602 to the USB port 608. For example, a USB cable such as USB cable 114 in FIG. 1A may provide one of ground, floating, 124 k ohm, 68 k ohm, and 36.5 k ohm impedance detection states in FIG. 3 to provide an indication of USB compatibility.

Figure 7:
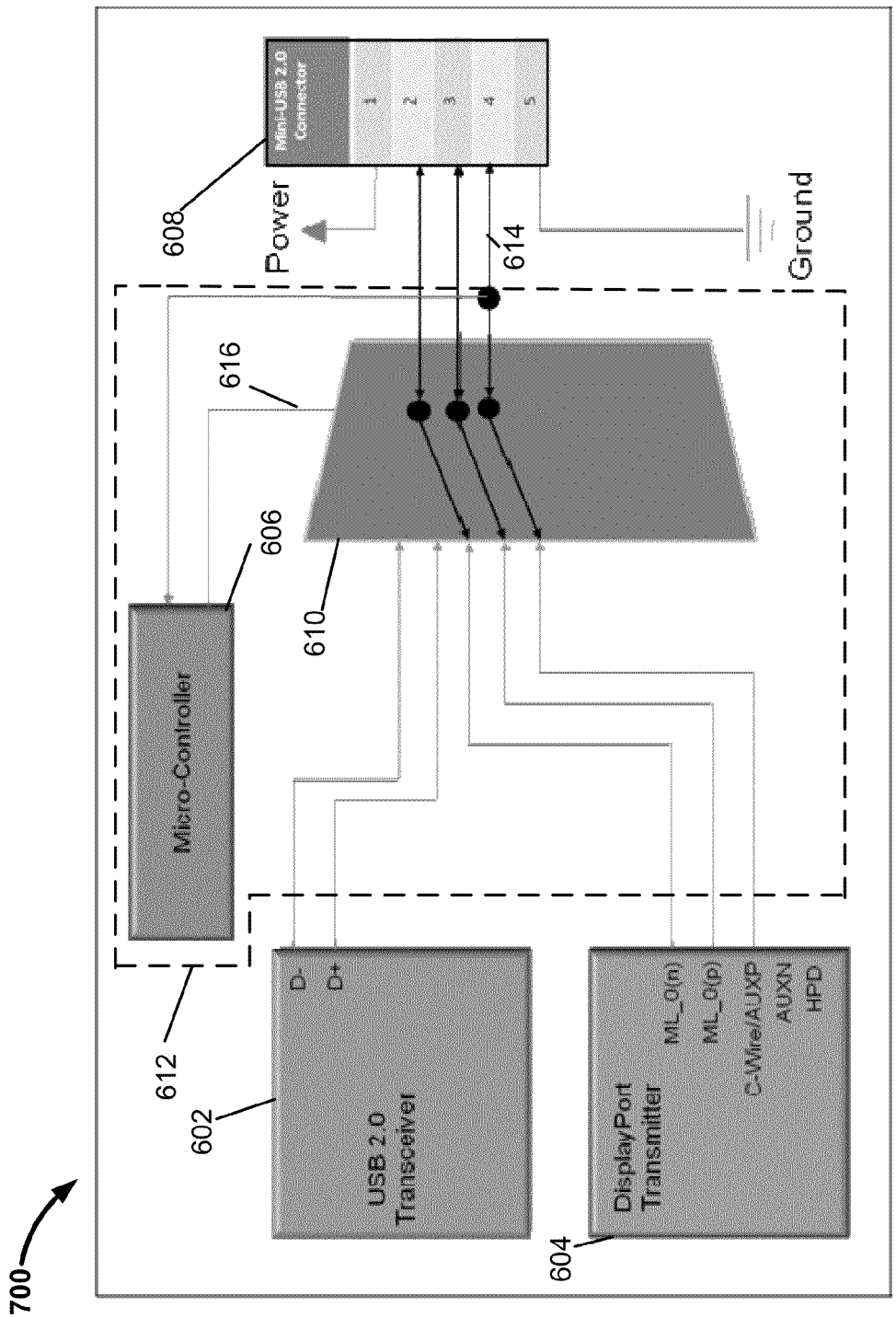
FIG. 7 is a block diagram of a exemplary data communication mechanism compatible with a Mini-USB 2.0 connector and selectively operating in a media mode.

As described above, a detection state shown in FIG. 3 corresponding to a 10 k ohm impedance indicates compatibility with a HD uncompressed media data signal cable, i.e., a media mode. In response to an indication of a media mode, the micro-controller 606 of selection circuit 612 generates a selection signal 616 to cause the switch 610 to couple the DisplayPort transmitter 604 to the USB port 608. FIG. 7 is a block diagram of a exemplary system 700 for a source device having a Mini-USB 2.0 connector and selectively operating in a media mode.

By way of example, if the media cable 116 in FIG. 1A provides the 10 k ohm impedance and couples the second sink device 110 and the source device 102, a system 700 in the source device 102 may couple signals from the DisplayPort transmitter 604 to the USB port 608 for supplying via the media cable 116 to the second sink device 110. The second sink device 110 may be operative to generate a display and/or audio presentation from the received signals. The process of selective transmission of data as a function of the device type indication is further illustrated in FIGS. 12 and 13, as described further above.

Figure 8:
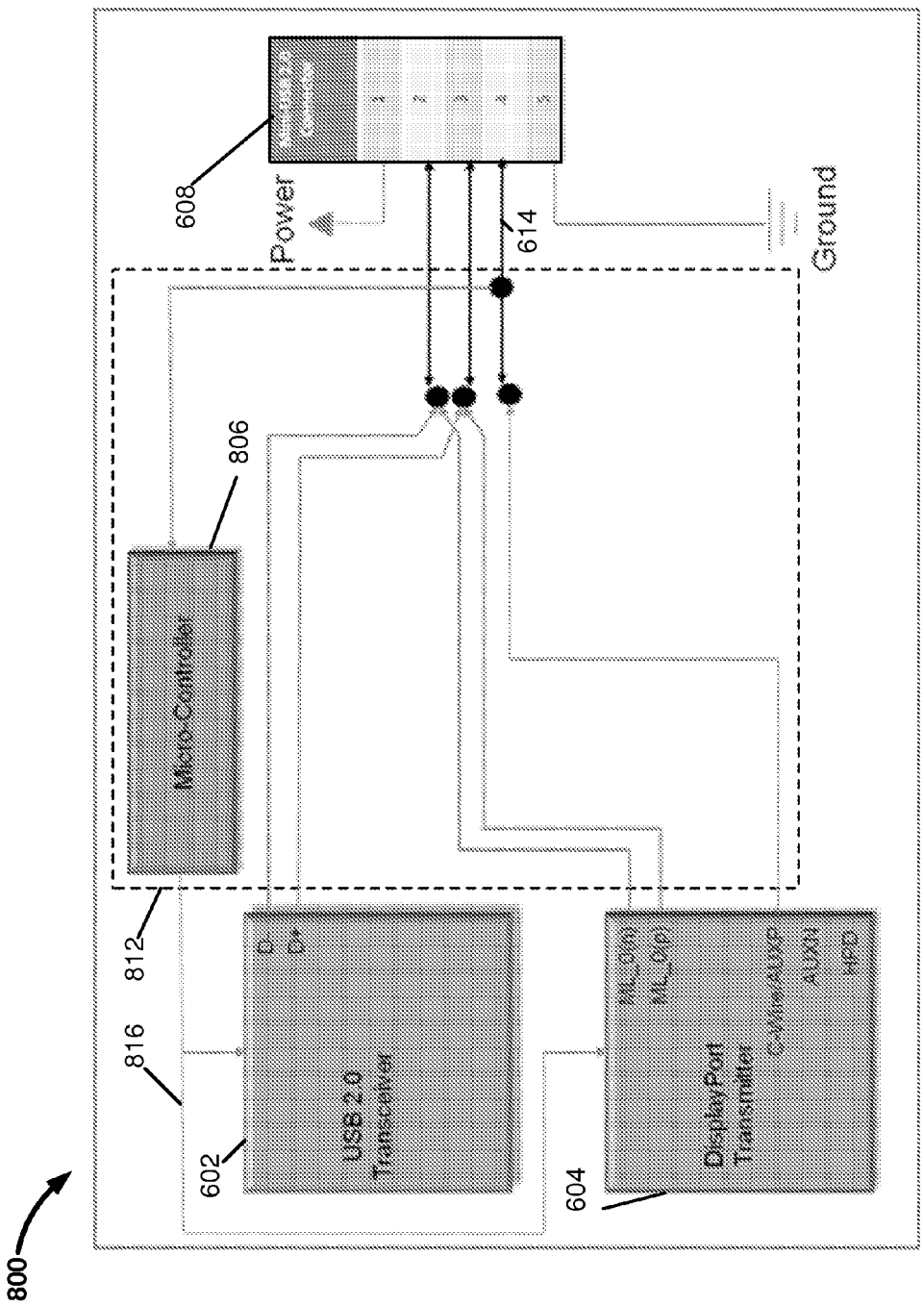
FIG. 8 is a block diagram of a exemplary data communication mechanism compatible with a Mini-USB 2.0 connector in accordance with some embodiments.

FIG. 8 is a block diagram of a exemplary system 800 for a source device having a Mini-USB 2.0 connector in accordance with some embodiments. The system 800 includes a USB 2.0 transceiver circuit 602, a DisplayPort transmitter circuit 604, and a Mini-USB 2.0 connector 608, similar to the systems 600 and 700 in FIGS. 6 and 7. System 800 has a different selection circuit, i.e., selection circuit 812, which does not include a switch. The selection circuit 812 includes a micro-controller 806 coupled to the USB 2.0 transceiver circuit 602 and the DisplayPort transmitter circuit 604. Certain outputs from the USB 2.0 transceiver circuit 602 and DisplayPort transmitter circuit 604 to be selectively coupled to the same pin of the connector 608 may be joined as shown in FIG. 8.

The micro-controller 806 of the selection circuit 812 may selectively couple the USB 2.0 transceiver circuit 602 or the DisplayPort transmitter circuit 604 to the USB port 608 based on a data format signal 614 received at the USB port 608. A selection signal 816 may be generated by the micro-controller 806. The USB 2.0 transceiver circuit 602 or the DisplayPort transmitter circuit 604 may be enabled to communicate with the USB port 608 based on the selection signal 816. The micro-controller 806 may be a standalone device or be embedded in another device such as an application processor.

According to various embodiments, signals from the DisplayPort transmitter circuit 604 may be selectively coupled to different pins of the USB port, e.g., Mini-USB 2.0 connector 608 in FIGS. 6, 7, and 8. Table 4 illustrates schemes 1-12 for various combinations of DisplayPort signals routing to the Mini-USB 2.0 connector and Mini-USB 2.0 connector pin numbers that may be used in some embodiments.

TABLE 4

DisplayPort Signals Routing to the Mini-USB 2.0 Connector

| Scheme 1 | Scheme 2 | Scheme 3 | Scheme 4 | Scheme 5 | Scheme 6 | Scheme 7 |
|---|---|---|---|---|---|---|
| AUXP | AUXN | AUXP | AUXN | ML_0(p) | ML_0(p) | ML_0(n) |
| ML_0(n) | ML_0(n) | ML_0(p) | ML_0(p) | ML_0(n) | ML_0(n) | ML_0(p) |
| ML_0(p) | ML_0(p) | ML_0(n) | ML_0(n) | AUXP | AUXN | AUXP |
| HPD (thru MCU) | HPD (thru MCU) | HPD (thru MCU) | HPD (thru MCU) | HPD (thru MCU) | HPD (thru MCU) | HPD (thru MCU) |
| Ground | Ground | Ground | Ground | Ground | Ground | Ground |

| DisplayPort Signals Routing to the Mini-USB 2.0 Connector | | | | | Mini-USB 2.0 Connector Pin |
|---|---|---|---|---|---|
| Scheme 8 | Scheme 9 | Scheme 10 | Scheme 11 | Scheme 12 | Numbers N/A |
| ML_0(n) | ML_0(p) | ML_0(p) | ML_0(n) | ML_0(n) | 1 |
| ML_0(p) | AUXP | AUXN | AUXP | AUXN | 2 |
| AUXN | ML_0(n) | ML_0(n) | ML_0(p) | ML_0(p) | 3 |
| HPD (thru MCU) | HPD (thru MCU) | HPD (thru MCU) | HPD (thru MCU) | HPD (thru MCU) | 4 |
| Ground | Ground | Ground | Ground | Ground | 5 |

Figure 9:
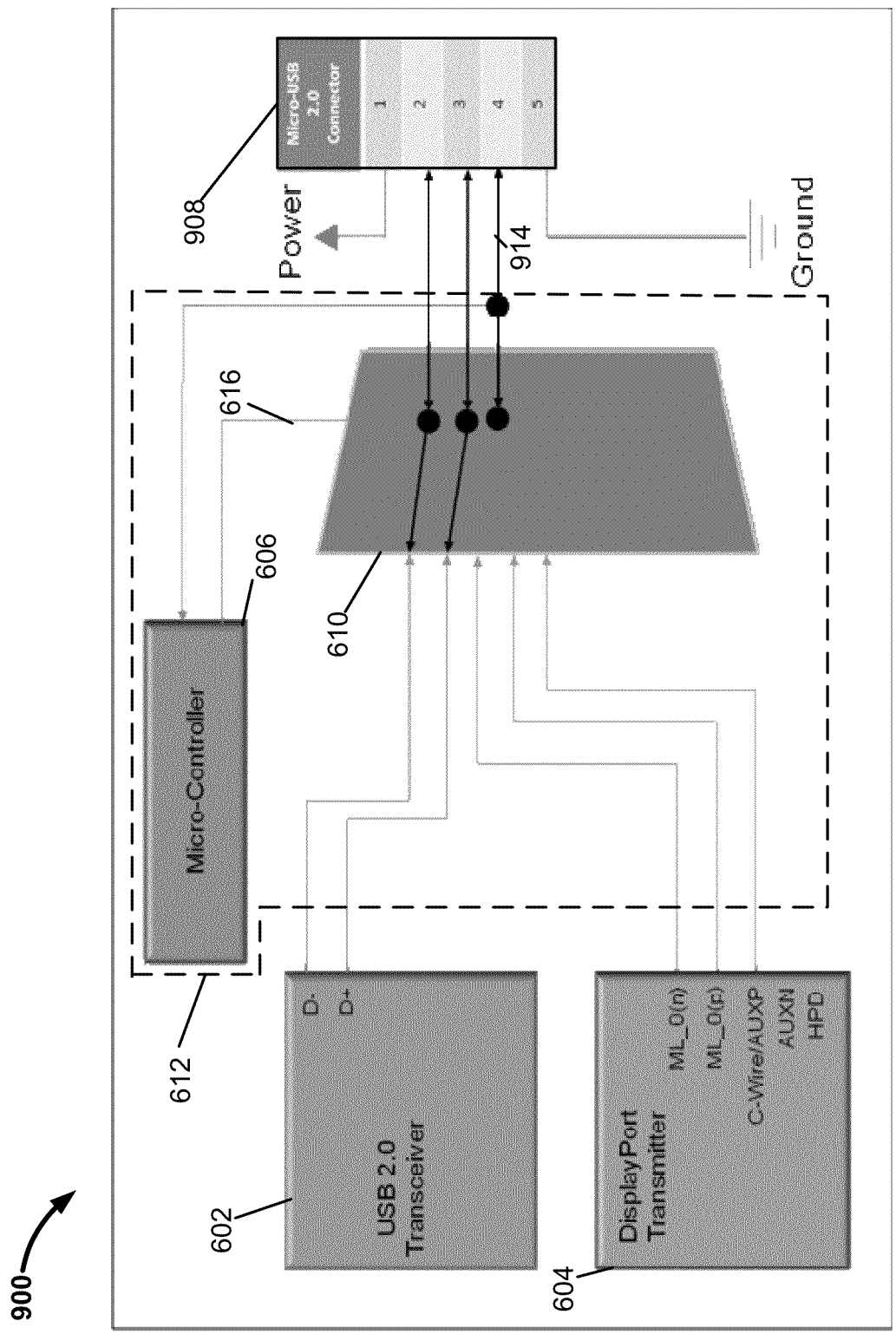
FIG. 9 is a block diagram of a exemplary data communication mechanism compatible with a Micro-USB 2.0 connector and selectively operating in a USB mode.

FIG. 9 is a block diagram of a exemplary system 900 for a source device having a Micro-USB 2.0 connector and selectively operating in a USB mode. The only differences between the system 900 and the system 600 are the type of USB 2.0 connector in the system and the data format signal received at that different type of USB 2.0 connector. More specifically, the system 900 has a Micro-USB 2.0 connector 908 for the USB port and a data format signal 914 received thereat. In contrast, system 600 has a Mini-USB connector 608 for the USB port and a data format signal 614 received thereat. Otherwise, the systems 600 and 900 are the same and illustrate the USB mode wherein the USB 2.0 transceiver circuit 602 is coupled to the respective USB port. Therefore, thereat. Otherwise, the systems 1100 and 800 are the same and both illustrate a configuration having a selection circuit 812 that does not include a separate switch. Therefore, FIG. 11 is a system as described above for FIG. 8, except for the connector and data format signal differences identified above.

Figure 10:
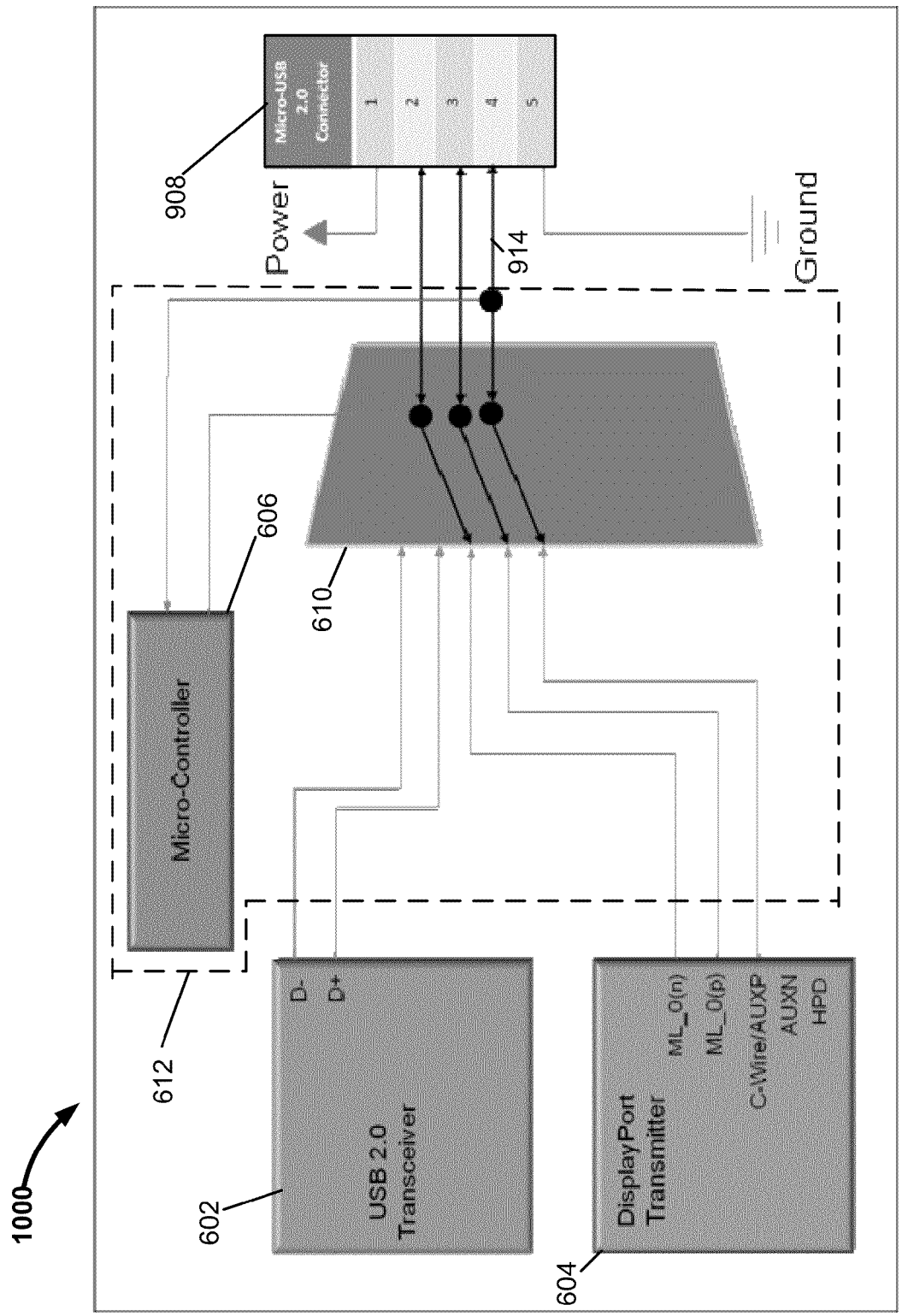
FIG. 10 is a block diagram of a exemplary data communication mechanism compatible with a Micro-USB 2.0 connector and selectively operating in a media mode.
Figure 11:
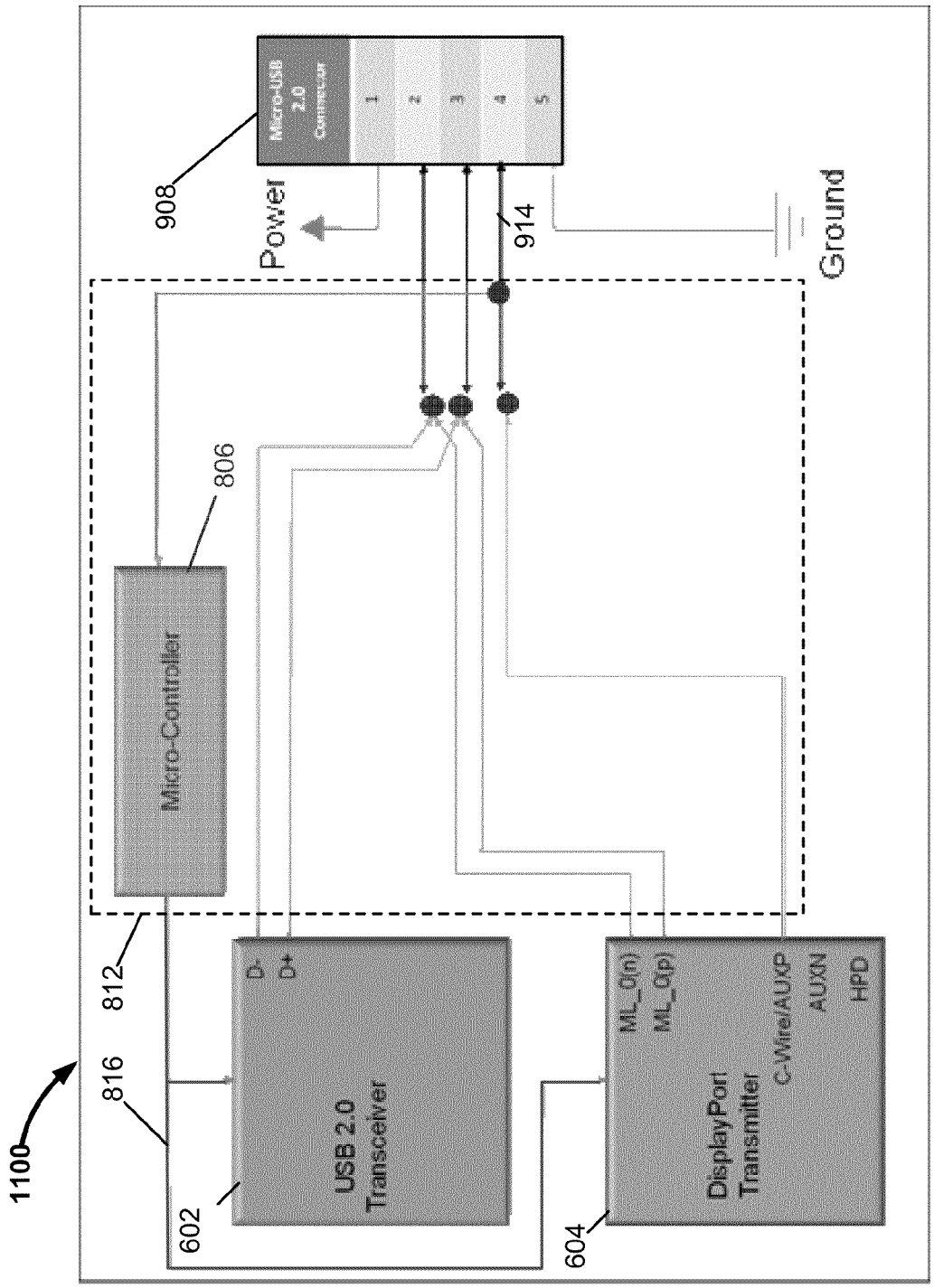
FIG. 11 is a block diagram of a exemplary data communication mechanism compatible with a Micro-USB 2.0 connector in accordance with some embodiments.

According to various embodiments, signals from the DisplayPort transmitter circuit 604 may be selectively coupled to different pins of the USB port, e.g., Micro-USB 2.0 connector 908 in FIGS. 9, 10, and 11. Table 5 illustrates schemes 1-12 for various combinations of DisplayPort signals routing to the Micro-USB 2.0 connector and Micro-USB 2.0 connector pin numbers that may be used in some embodiments.

TABLE 5

| DisplayPort Signals Routing to the Micro-USB 2.0 Connector | | | | | | |
|---|---|---|---|---|---|---|
| Scheme 1 | Scheme 2 | Scheme 3 | Scheme 4 | Scheme 5 | Scheme 6 | Scheme 7 |
| AUXP | AUXN | AUXP | AUXN | ML_0(p) | ML_0(p) | ML_0(n) |
| ML_0(n) | ML_0(n) | ML_0(p) | ML_0(p) | ML_0(n) | ML_0(n) | ML_0(p) |
| ML_0(p) | ML_0(p) | ML_0(n) | ML_0(n) | AUXP | AUXN | AUXP |
| HPD (thru MCU) | HPD (thru MCU) | HPD (thru MCU) | HPD (thru MCU) | HPD (thru MCU) | HPD (thru MCU) | HPD (thru MCU) |
| Ground | Ground | Ground | Ground | Ground | Ground | Ground |

| DisplayPort Signals Routing to the Micro-USB 2.0 Connector | | | | | Micro-USB 2.0 Connector Pin Numbers |
|---|---|---|---|---|---|
| Scheme 8 | Scheme 9 | Scheme 10 | Scheme 11 | Scheme 12 | N/A |
| ML_0(n) | ML_0(p) | ML_0(p) | ML_0(n) | ML_0(n) | 1 |
| ML_0(p) | AUXP | AUXN | AUXP | AUXN | 2 |
| AUXN | ML_0(n) | ML_0(n) | ML_0(p) | ML_0(p) | 3 |
| HPD (thru MCU) | HPD (thru MCU) | HPD (thru MCU) | HPD (thru MCU) | HPD (thru MCU) | 4 |
| Ground | Ground | Ground | Ground | Ground | 5 |

FIG. 9 is a system as described above for FIG. 6, except for the connector and data format signal differences identified above.

FIG. 10 is a block diagram of a exemplary system 1000 for a source device having a Micro-USB 2.0 connector and selectively operating in a media mode. The system 700 in FIG. 7 and the system 1000 both illustrate the media mode. The only differences are the type of USB 2.0 connector in the system and the data format signal received at that different type of USB 2.0 connector. More specifically, the system 1000 has a Micro-USB 2.0 connector 908 for the USB port and a data format signal 914 received thereat. In contrast, system 700 has a Mini-USB connector 608 for the USB port and a data format signal 614 received thereat. Otherwise, the systems 600 and 1000 are the same and both illustrate the media mode wherein the DisplayPort transmitter circuit 604 is coupled to the respective USB port. Therefore, FIG. 10 is a system as described above for FIG. 7, except for the connector and data format signal differences identified above.

Figure 12:
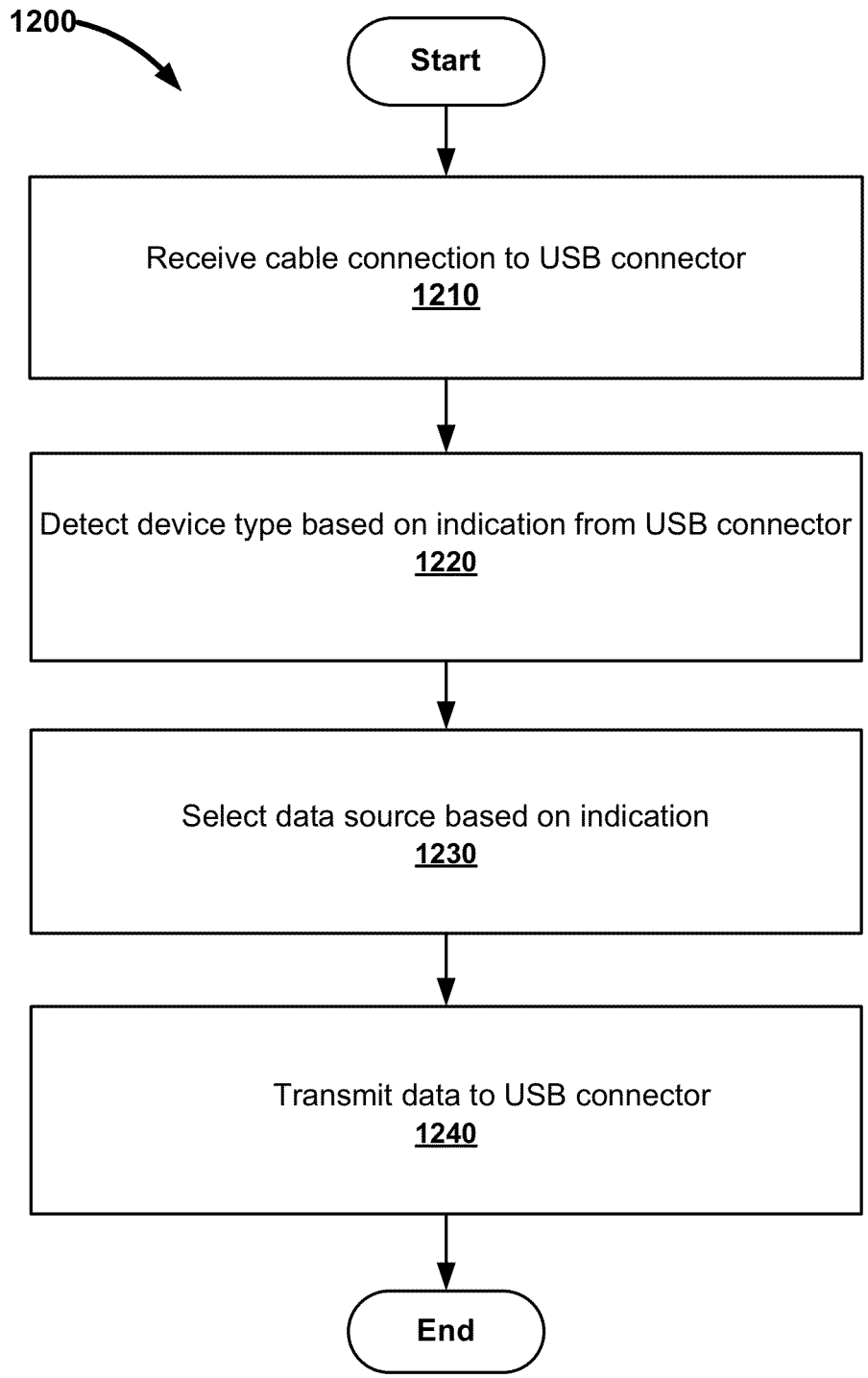
FIG. 12 is a flow chart of an exemplary method for transferring data.

FIG. 11 is a block diagram of a exemplary system 1100 for a source device having a Micro-USB 2.0 connector in accordance with some embodiments. The only differences between the system 1100 and the system 800 in FIG. 8 are the type of USB 2.0 connector in the system and the data format signal received at that different type of USB 2.0 connector. More specifically, the system 1100 has a Micro-USB 2.0 connector 908 for the USB port and a data format signal 914 received thereat. In contrast, system 800 has a Mini-USB connector 608 for the USB port and a data format signal 614 received FIG. 12 is a flow chart of an exemplary method 1200 for transferring data. A cable connection to the USB port (see e.g., ports 104 and 208 in FIGS. 1A and 2 respectively) is received at step 1210. A device type is detected based on an indication from the USB connector at step 1220 (see e.g., detection state/compatibility in FIG. 3). Detecting a device is discussed in more detail below with regards to the method of FIG. 13. A data source is selected based on the indication at step 1230. According to various embodiments, selection may be made between a USB protocol data source and an uncompressed high definition media data source (see e.g., FIG. 2). Data is transmitted to the USB connector at step 1240.

Figure 13:
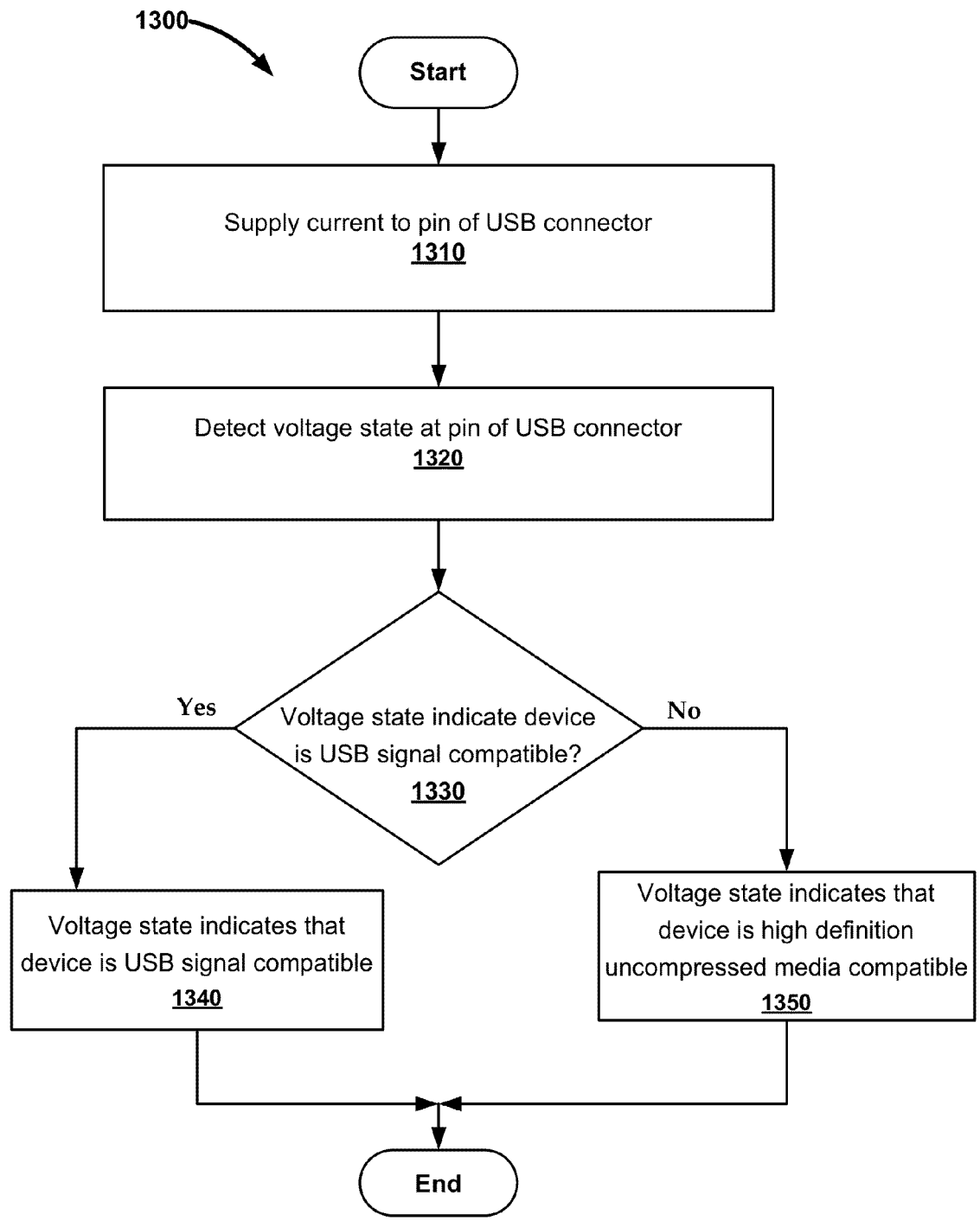
FIG. 13 is a flow chart of an exemplary method for detecting the device type based on the indication from the USB connector.

FIG. 13 is a flow chart of an exemplary method 1300 for detecting the device type based on the indication from the USB connector. A current may be supplied to a pin of USB connector at step 1310. The pin may be associated with an identification signal, such as for example pin 4 of a micro-USB 3.0 compatible port. A voltage state is detected at pin of USB connector at step 1320. The voltage state may be the voltage detected at the particular pin when a current is provided to the pin. A determination is made at step 1330 whether the voltage state indicates the device is USB signal compatible. The determination may be made based on the voltage state (i.e., voltage level, as indicated in FIG. 3). If the voltage state indicates that the device is USB signal compatible, the process proceeds to step 1340 where the device type is set as USB compatible accordingly. If the voltage state indicates that the device is not USB signal compatible, the device type is set as being high definition uncompressed media compatible at step 1350, and the process proceeds to the end.

Figure 14:
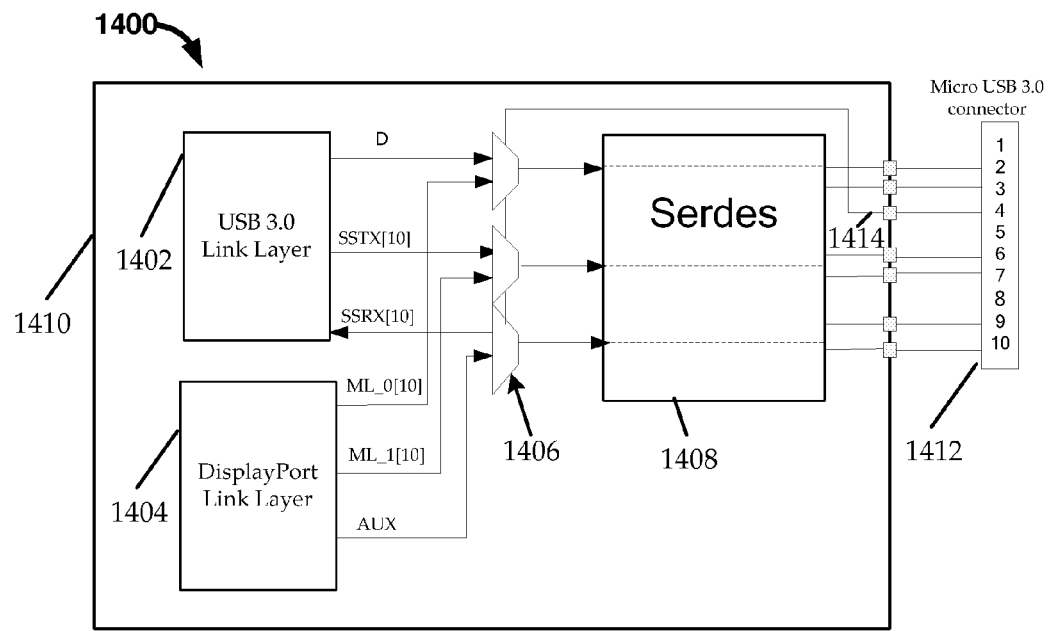
FIG. 14 is a block diagram of a exemplary data communication mechanism compatible with a Micro-USB 3.0 connector in accordance with some embodiments.

FIG. 14 is a block diagram of a exemplary system 1400 for a source device having a Micro-USB 3.0 connector in accordance with some embodiments. The system 1400 includes a semiconductor device 1410 and a Micro-USB 3.0 connector 1412 coupled thereto. The Micro-USB 3.0 connector 1412 is a USB port for coupling to an external interface having a mating connector. The semiconductor device 1410 may include a USB 3.0 link layer circuit 1402, a DisplayPort link layer circuit 1404, a multiplexer 1406, and a serializer/deserializer (Serdes) circuit 1408. The USB 3.0 Link Layer circuit 1402 may be a USB transceiver circuit operative to send and receive USB 3.0 protocol signals, such as D, SSTX[10], and SSRX[10] shown in FIG. 14. The DisplayPort link layer circuit 1404 may be a transmitter circuit operative to transmit uncompressed high definition media signals, such as ML_0 [10], ML_1[10], and AUX. ML_0[10] and ML_1[10] that represent respective DisplayPort main link lane numbers 0 and 1 for uncompressed high definition video and/or audio data. AUX represents a side-band communication signal. The multiplexer 1406 is configurable to selectively couple the USB 3.0 Link Layer circuit 1402 or the DisplayPort link layer circuit 1404 to the Serdes circuit 1408 based on a data format signal 1414 received at the USB port 1412 from the external interface. Since the USB 3.0 parallel data speed is 500 MHz and DisplayPort data speed is 270 MHz, a digital multiplexer 1406 configurable for switching between the two types of data and respective data speeds may be used.

The data format signal 1414 provides a device type indication and may be based on an impedance (see e.g., FIGS. 3, 12 and 13 described above regarding detecting a device type based on the indication). The data format signal 1414 is also described above with regards to other data format signals received at various connectors including data format signal 214 in FIG. 2 for a Micro-USB 3.0 connector, data format signal 614 in FIG. 6 for a Mini-USB 2.0 connector, and data format signal 914 in FIG. 9 for a Micro-USB 2.0 connector. Although the data format signal 1414 is shown at pin 4 of the Micro-USB 3.0 connector 1412, a different suitable pin may be used in some embodiments.

According to various embodiments of the system 1400, the multiplexer 1406 is operative to selectively couple the USB 3.0 Link Layer circuit 1402 to the Serdes circuit 1408 in response to the data format signal 1414 being indicative of a USB data format, i.e., USB mode. The multiplexer 1406 may be operative to selectively couple DisplayPort link layer circuit 1404 to the Serdes circuit 1408 in response to the data format signal 1414 being indicative of a media data format, i.e., media mode. In some embodiments, the Serdes circuit 1408 is operative to provide a plurality of signals configured for transmission via the Micro-USB 3.0 connector 1412 to the external interface. The configured plurality of signals from Serdes circuit 1408 may be coupled to the Micro-USB 3.0 connector 1412, i.e., the USB port.

Although the system 1400 includes a Micro-USB 3.0 connector, other types of USB connectors may be used including, but not limited to, various Micro-USB 2.0 connector types and Mini-USB 2.0 connector types. An exemplary system having a Micro-USB 2.0 connector is illustrated in FIG. 15.

Figure 15:
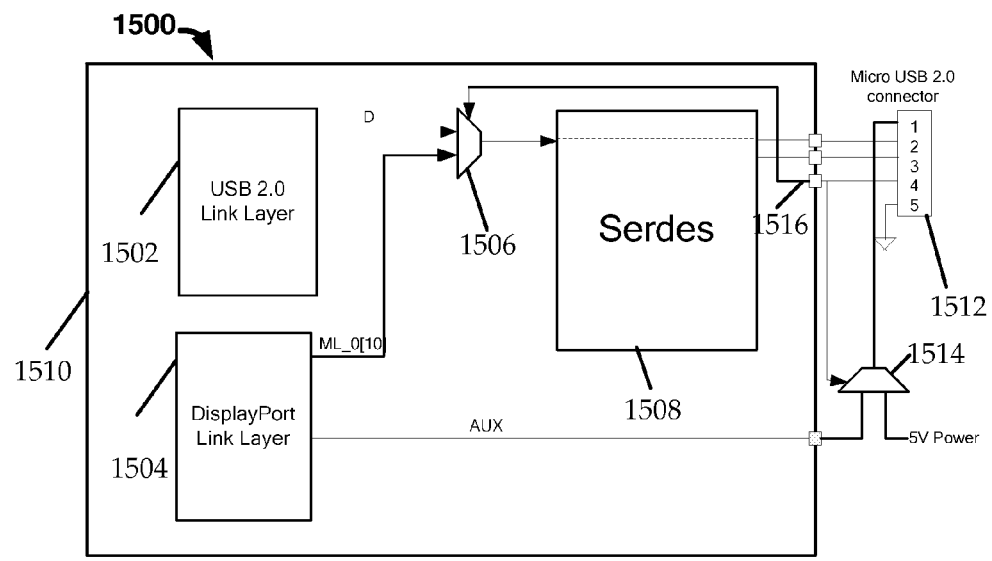
FIG. 15 is a block diagram of a exemplary data communication mechanism compatible with a Micro-USB 2.0 connector in accordance with some embodiments.

FIG. 15 is a block diagram of a exemplary system 1500 for a source device having a Micro-USB 2.0 connector in accordance with some embodiments. The system 1500 includes a semiconductor device 1510 and a Micro-USB 2.0 connector 1512 coupled thereto. The Micro-USB 2.0 connector 1512 is a USB port for coupling to an external interface having a mating connector. The semiconductor device 1510 may include a USB 2.0 link layer circuit 1502, a DisplayPort link layer circuit 1504, a multiplexer 1506, and a serializer/deserializer (Serdes) circuit 1508. The USB 2.0 Link Layer circuit 1502 may be a USB transceiver circuit operative to send and receive USB 2.0 protocol signals, such as D shown in FIG. 15. The DisplayPort link layer circuit 1504 may be a transmitter circuit operative to transmit uncompressed high definition media signals, such as ML_0[10] and AUX. ML_0[10] represents a DisplayPort main link lane number 0 for uncompressed high definition video and/or audio data. AUX represents a side-band communication signal. The multiplexer 1506 is configurable to selectively couple the USB 2.0 Link Layer circuit 1502 or the DisplayPort link layer circuit 1504 to the Serdes circuit 1508 based on a data format signal 1514 received at the USB port 1512 from the external interface. Since the USB 2.0 parallel data speed is 480 MHz and DisplayPort data speed is 270 MHz, a digital multiplexer 1506 configurable for switching between the two types of data and respective data speeds may be used.

The data format signal 1514 provides a device type indication and may be based on an impedance (see e.g., FIGS. 3, 12 and 13 regarding detecting a device type based on the indication). The data format signal 1514 is also described above with regards to other data format signals received at various connectors including data format signal 214 in FIG. 2 for a Micro-USB 3.0 connector, data format signal 614 in FIG. 6 for a Mini-USB 2.0 connector, and data format signal 914 in FIG. 9 for a Micro-USB 2.0 connector. Although the data format signal 1514 is shown at pin 4 of the Micro-USB 2.0 connector 1514, a different suitable pin may be used in some embodiments.

According to various embodiments of the system 1500, the multiplexer 1506 is operative to selectively couple the USB 2.0 Link Layer circuit 1502 to the Serdes circuit 1508 in response to the data format signal 1514 being indicative of a USB data format, i.e., USB mode. The multiplexer 1506 may be operative to selectively couple the DisplayPort link layer circuit 1504 to the Serdes circuit 1508 in response to the data format signal 1514 being indicative of a media data format, i.e., media mode. As shown in FIG. 15, the ML_0[10] signal is coupled to the multiplexer 1506 and may be configured by the Serdes circuit 1508 for coupling to the USB port in the media mode.

In some embodiments, a 5V power signal and the AUX side-band communication signal from the DisplayPort link layer circuit 1504 are coupled to a multiplexer 1506. Based on the data format signal 1516, the multiplexer 1506 selectively couples the AUX signal of the 5V power signal to the Micro-USB 2.0 connector 1512, e.g., pin 1 in FIG. 15. In the USB mode, the 5V power may be coupled to pin 1 to provide power for charging, etc., whereas, in the media mode the AUX signal may be coupled to pin 1 for side-band communication The Serdes circuit 1508 may be operative to provide a plurality of signals configured for transmission via the Micro-USB 2.0 connector 1512 to the external interface. The configured plurality of signals from Serdes circuit 1508 may be coupled to the Micro-USB 2.0 connector 1512, i.e., the USB port.

As discussed above in reference to FIG. 1A, the media cable 116 may be used to couple source device 102 with second sink device 110. The media cable 116 may provide an indication of the media mode and may couple the second sink device 110 and the source device 102. In the media mode, a system (e.g., system 400 in FIG. 4) in the source device 102 may couple uncompressed high definition media signals from the DisplayPort transmitter circuit 204 to the USB port 208 for supplying via the media cable 116 to second sink device 110. Second sink device 110 may receive media or multimedia signals via the media cable 116 and provide a media output (video and/or audio) or otherwise process the received data. Port 112 of second sink device 110 may be a media or multimedia port. In some embodiments, second sink device 110 is a Display Port compatible device, and port 112 is configured to receive a DisplayPort compatible connection. Port 112 and connector 124 may also be compatible with other media or multimedia standards. Second sink device 110 may be operative to generate a display and/or audio presentation from the received signals. Examples of second sink device 110 include a projector, television, or other media or multimedia capable device.

Figure 16:
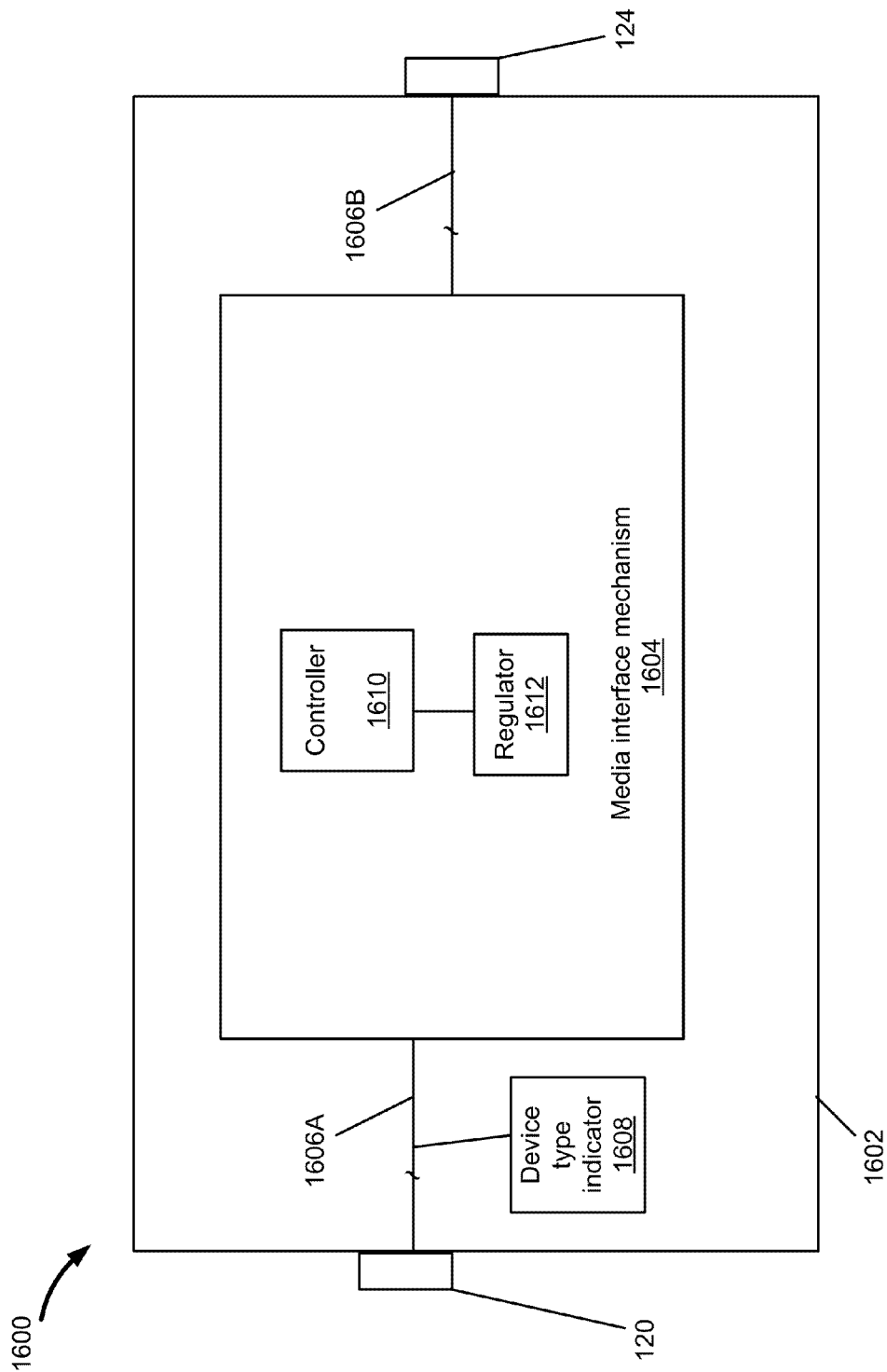
FIG. 16 is a block diagram of an exemplary interface assembly.

FIG. 16 is a block diagram of an exemplary interface assembly 1600 which may be used to implement media cable 116 of FIG. 1A. Interface assembly 1600 may include connector 120 at one end and connector 124 at the other end. Connector 120 may be a USB connector configured to plug into port 104 of source device 102. Connector 124 may be a media connector configured to plug into port 112 of second sink device 110.

The interface assembly 1600 may also include an assembly 1602 coupled between connectors 120 and 124. Assembly 1602 may include a media interface mechanism ("circuit") 1604, a first set of conductors 1606A, a second set of conductors 1606B, and a device type indicator 1608. First set of conductors 1606A and second set of conductors 1606B may be respective portions of an electrical cable.

Device type indicator 1608 may be coupled to at least one of the conductors of first set of conductors 1606A. Device type indicator 1608 may supply an indication to a pin of the USB connector 120. If a USB port (e.g., USB port 208 in FIG. 4) is coupled to USB connector 120, the indication may be received as a data format signal 214 at a pin of USB port 208 (see e.g., pin 4 of USB port 208). The pin of the USB port 208 may receive the device type indicating compatibility with an HD uncompressed media data signal from media cable 116, i.e., a media mode. For example, the uncompressed media data signal may have a detection state for the media mode associated with an impedance other than that for a USB detection state and distinguishable from any USB detection state. As described above, examples of such an impedance include 20 k ohm, 15 k ohm, 10 k ohm, 5 k ohm, or some other level of impedance. The device type indicator 1608 may include the impedance coupled between a conductor of first set of conductors 1606A and a reference potential such as ground. According to various embodiments, a detection state shown in FIG. 3 corresponding to a 10 k ohm impedance indicates the media mode. Though a particular impedance level of 10 k ohm is discussed herein, different levels of impedance may be used in the device type indicator 1608 to associate an uncompressed media data signal from USB signals at an ID pin.

Media interface mechanism 1604 may be coupled to USB connector 120 by the first set of conductors 1606A and to media connector 124 by the second set of conductors 1606B. Media interface mechanism 1604 may include a controller 1610 coupled to a regulator 1612. In some embodiments, media interface mechanism 1604 may be included in the second sink device 110 rather than being included in the interface assembly 1600.

Regulator 1612 may be a voltage regulator for regulating 5V power received from a 5V pin of USB connector 120 when that connector is coupled to source device 102. The 5V power is regulated by regulator 1612 to supply power required for the controller 1610.

Controller 1610 may be a standalone device or be embedded in another device such as an application processor. USB connector 120 is also coupled to media interface mechanism 1604 to provide uncompressed high definition media or multimedia signals from source device 102 to controller 1610 when USB connector 120 is coupled to source device 102.

The uncompressed high definition media data may comprise at least one lane of media or multimedia data in accordance with a DisplayPort standard. Also, a two-way serial communication side-band channel is provided for setting up the lanes requirement and other communications on both sides. This channel may accommodate 3-wires (namely AUXP, AUXN and HPD) of communication into a single wire externally to both the devices on either side. In the example in FIG. 2, the side-band communication data is shown as a single C-wire signal that may be based on one or more of AUXP, AUXN, and HPD of the DisplayPort protocol. Internal to source device 102, the signals through the AUXP, AUXN, and HPD wires may be encoded as a single C-wire signal and electrically transmitted to the interface assembly 1600.

Controller 1610 may decode the encoded C-wire signal. The decoded signal may be converted as needed to provide side-band communication signals compatible with second sink device 110 when it is coupled to media connector 124.

An extra layer of protocol may be defined on top of a standard, such as a DisplayPort Standard, to accomplish the task of using 1 signal to have side-band communication data transmit or received over 1-pin of the USB Port of the source device. In source device 102, the AUXP, AUXN, and HPD side-band communication signals of the DisplayPort protocol may be provided to a layer of logic which encodes the information from the three signals onto the single C-wire signal in accordance with a C-wire protocol. The encoded signal, which may also be referred to herein as the transcoded signal, may be transmitted from source device 102 to interface assembly 1600 for decoding. Controller 1610 may decode the encoded signals based on the C-wire protocol to reconstruct the auxiliary channels signals (e.g., AUXP, AUXN, and possibly HPD).

If media connector 124 is a DisplayPort connector for connection to a sink device compatible with the DisplayPort media standard, interface assembly 1600 is operable to couple the three auxiliary channel signals to the sink device in accordance with the DisplayPort specification. Any handshaking information to be communicated back from the sink device to the source device is received by interface assembly 1600, encoded onto the C-wire signal and transmitted to the source device. For instance, interface assembly 1600 may communicate handshake information for link training, HPD detection, and High-bandwidth Digital Content Protection (HDCP), etc. between the source device and sink device as defined by the DisplayPort specification. In addition, extended display identification data (EDID) may be provided by the sink device to describe its display capabilities to the source device. Interface assembly 1600 may be operable to perform C-wire encoding of EDID in order to communicate it to the source device.

Media connector 124 may be compatible with other media or multimedia standards besides DisplayPort such as but not limited to a Digital Video Interactive (DVI) or a high definition multimedia interface (HDMI) standard. If media connector 124 is compatible with one of these other, non-DisplayPort, standards, controller 1610 may provide suitable signals to the media connector based on the DisplayPort standard signals received from the source device. That is, controller 1610 is operable to convert DisplayPort media data that may comprise lane(s) of uncompressed high definition media data along with serial communication side-band channel data received on the C-wire signal from the source device, such that media or multimedia signals and side-band communication signals in accordance with the other, non-DisplayPort, standard are communicated with the sink device.

Figure 17:
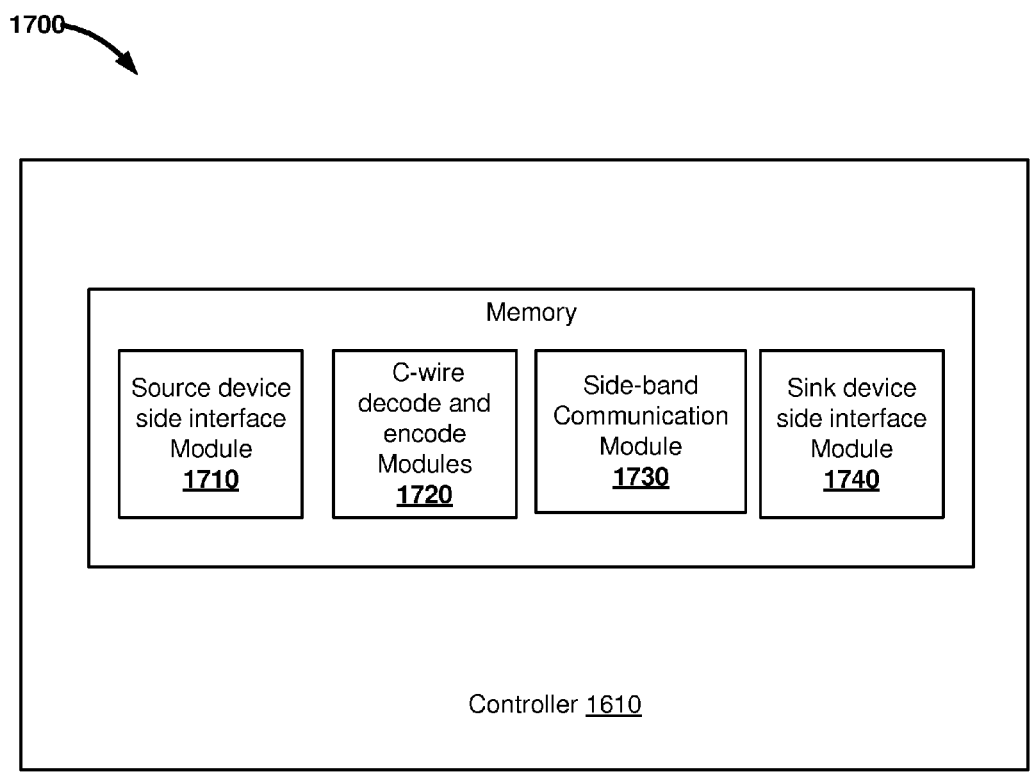
FIG. 17 illustrates an exemplary architecture of a system for the controller in FIG. 16.

FIG. 17 illustrates an exemplary architecture 1700 of a system for the controller 1610. The architecture 1700 may include a source device side interface module 1710, a C-wire decoding and encoding module 1720, a sideband communication module 1730, and a sink device side interface module 1740.

Alternative embodiments may comprise more, less, or functionally equivalent modules. Instructions may be retrieved and executed by a processor. Some examples of instructions include software, program code, and firmware. Instructions are generally operational when executed by the processor to direct the processor to operate in accord with certain embodiments. Although various modules may be configured to perform some or all of the various steps described herein, fewer or more modules may be provided and still fall within the scope of various embodiments.

Source device side interface module 1710 may provide the interface for the controller 1610 on the source device side. The source device side referring herein to a side that includes regulator 1612, device type indicator 1608 along with the USB connector 120 that is configured to plug into port 104 of source device 102. Uncompressed high definition media signals and a side-band communication signal may be received from the source device 102. The uncompressed high definition media signals may include at least one lane of data in accordance with a DisplayPort standard.

Controller 1610 may also receive DC power from the regulator 1612, as described further above. Once the required power is supplied by regulator 1612, controller 1610 may become operable. Source device side interface module 1710 may also receive and process an indication provided by device type indicator 1608 that may be coupled between media interface mechanism 1604 and connector 120. As described further above, device type indicator 1608 may include an impedance coupled between a conductor (of the electrical cable) 1606A and a reference potential, such that a voltage state indicative of a media mode is detectable at a respective one of the pins of the connector 120 when a current is provided to the respective pin.

Source device side interface module 1710 may provide for communicating side-band communications to and from the source device via a single side-band communication signal. The single signal may be encoded in accordance with a first protocol, also referred to herein as the C-wire protocol as will be described further below.

C-wire decoding and encoding module 1720 may provide decoding of the single signal (e.g., C-wire signal) supplied from source device 102 via connector 120 (e.g., USB connector 120). The single signal may be received at a single pin of USB connector 120 from a single pin of USB port 104 of source device 102 when the USB connector 120 is communicatively coupled to USB port 104. The decoding of the single signal may reconstruct (auxiliary) side-band communication signals with which the single signal was originally encoded. The auxiliary side-band communication signals originating at the source device 102 may be compatible with a DisplayPort standard.

C-wire decoding and encoding module 1720 may also provide encoding of side-band communication received from the sink device 110 into a single C-wire signal. The encoded C-wire signal may be provided to the source device 102 via USB connector 120. Side-band communication module 1730 may operate in conjunction with C-wire decode and encode module 1720 for processing side-band communication.

Sink device 110 may be compatible with a first media standard such as, but not limited to, the DisplayPort, high definition multimedia interface (HDMI), and Digital Video Interactive (DVI) standards. Controller 1610 may be operable to convert the side-band communication data received in the single signal into a plurality of signals in accordance with the first media standard. Sink device side interface module 1740 may be operable to supply the plurality of signals to media connector 124 via the conductor 1606B, such that the side-band communication data can be communicated to sink device 110 in accordance with its respective media standard.

The uncompressed high definition media signals supplied by source device 102 may include at least one lane of data in accordance with a DisplayPort standard. In that instance, if sink device 110 is compatible with a DisplayPort standard, controller 1610 (e.g., the sink device side interface module 1740) is operable to supply the at least one lane of data in accordance with a DisplayPort standard to media connector 124. Media port 112 of sink device 110 may be coupled to media connector 124. Sink device 110 may be configured for processing the at least one lane of data for presenting to a user.

On the other hand, if sink device 110 is compatible with another media standard (i.e., other than a DisplayPort standard), the at least one lane of data in accordance with a DisplayPort standard (e.g., received from source device 102) may be configured by controller 1610 in accordance with the other media standard and then supplied to media connector 124.

Sink device side interface module 1740 of controller 1610 may be operable to receive side-band communication data via media connector 124 (from sink device 110) and to configure the received side-band communication data to supply to USB connector 120. The configuring of the data received from sink device 110 may include converting the received data into a single signal (e.g., C-wire signal) that is coupled to USB connector 120. The conversion of the received data may include conversion by side-band communication module 1730, encoding by C-wire decode and encoding module 1720, and coupling by source device side interface module 1710.

Figure 18:
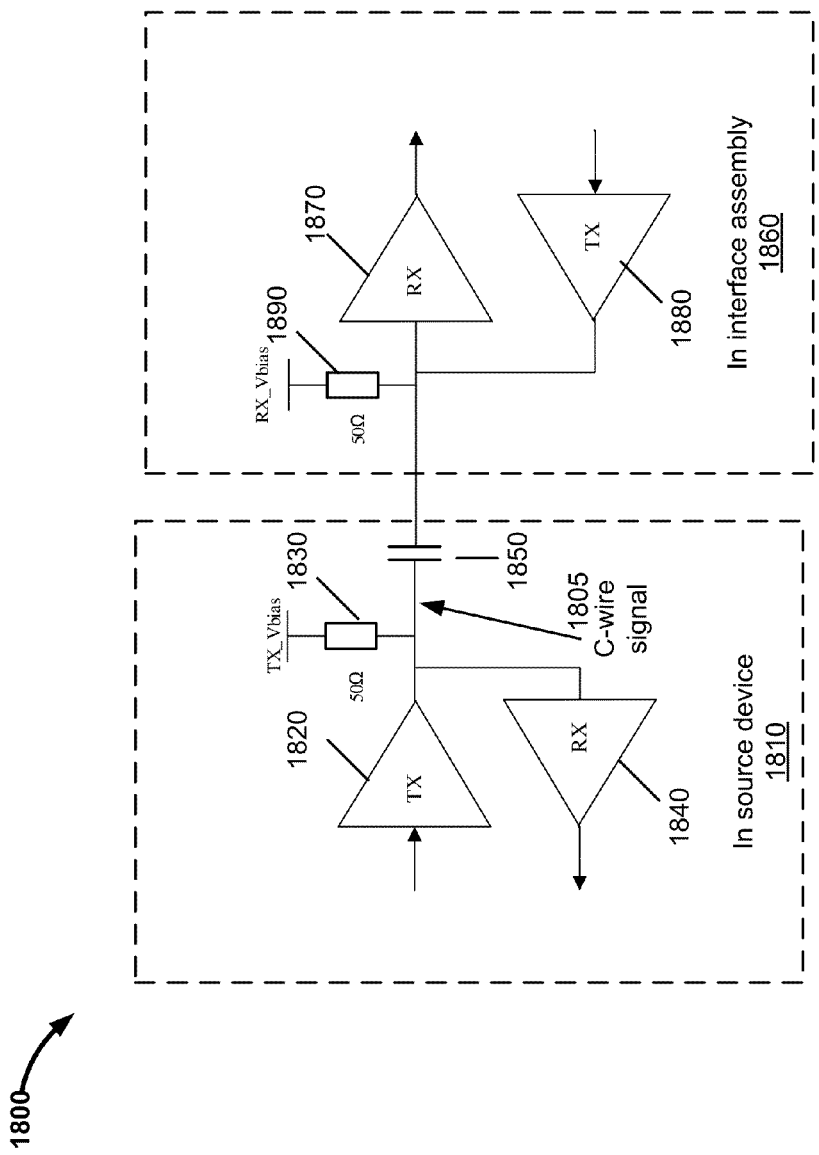
FIG. 18 is a block diagram illustrating various aspects of an exemplary single C-wire signal that may be used for communicating side-band communication.

FIG. 18 is a block diagram 1800 illustrating various aspects of an exemplary single signal (e.g., C-wire signal) that may be used for communicating side-band communication. The C-wire signal may be used for sending side-band communication data both to and from a source device (e.g., source device 102 in FIG. 1A). A circuit 1810 may include a transmitter TX 1820, a receiver RX 1840, an exemplary 50 ohm impedance 1830, a capacitor 1850, and a bias voltage identified as TX_Vbias. The output of transmitter TX 1820 and the input to receiver RX 1840 may be joined at a junction, the signal from the junction being identified as a C-wire signal 1805 in FIG. 18. C-wire signal 1805 may be transmitted by transmitter TX 1820 or received by receiver RX 1840 on the single signal line. The impedance 1830 is coupled between the TX_Vbias and the C-wire signal 1805 to provide signal pull-up. C-wire signal 1805 may be coupled to a circuit 1860 in interface assembly 1600 via the capacitor 1850 when source device 102 is coupled to interface assembly 1600.

Circuit 1860 includes a receiver RX 1870, transmitter TX 1880, exemplary 50 ohm impedance 1890, and a bias voltage identified as RX_Vbias. C-wire signal 1805 may be transmitted from source device 102 to receiver RX 1870 in interface assembly 1600. C-wire signal 1805 may be transmitted from transmitter TX 1880 in interface assembly 1600 to receiver RX 1840 in source device 102. The output of transmitter TX 1880 and the input to receiver RX 1870 may be joined at a junction which is coupled to the impedance 1890 that provides signal pull-up. Thus, a single C-wire signal may be transmitted or received to/from source device 102 and may be transmitted or received to/from interface assembly 1600.

Figure 19:
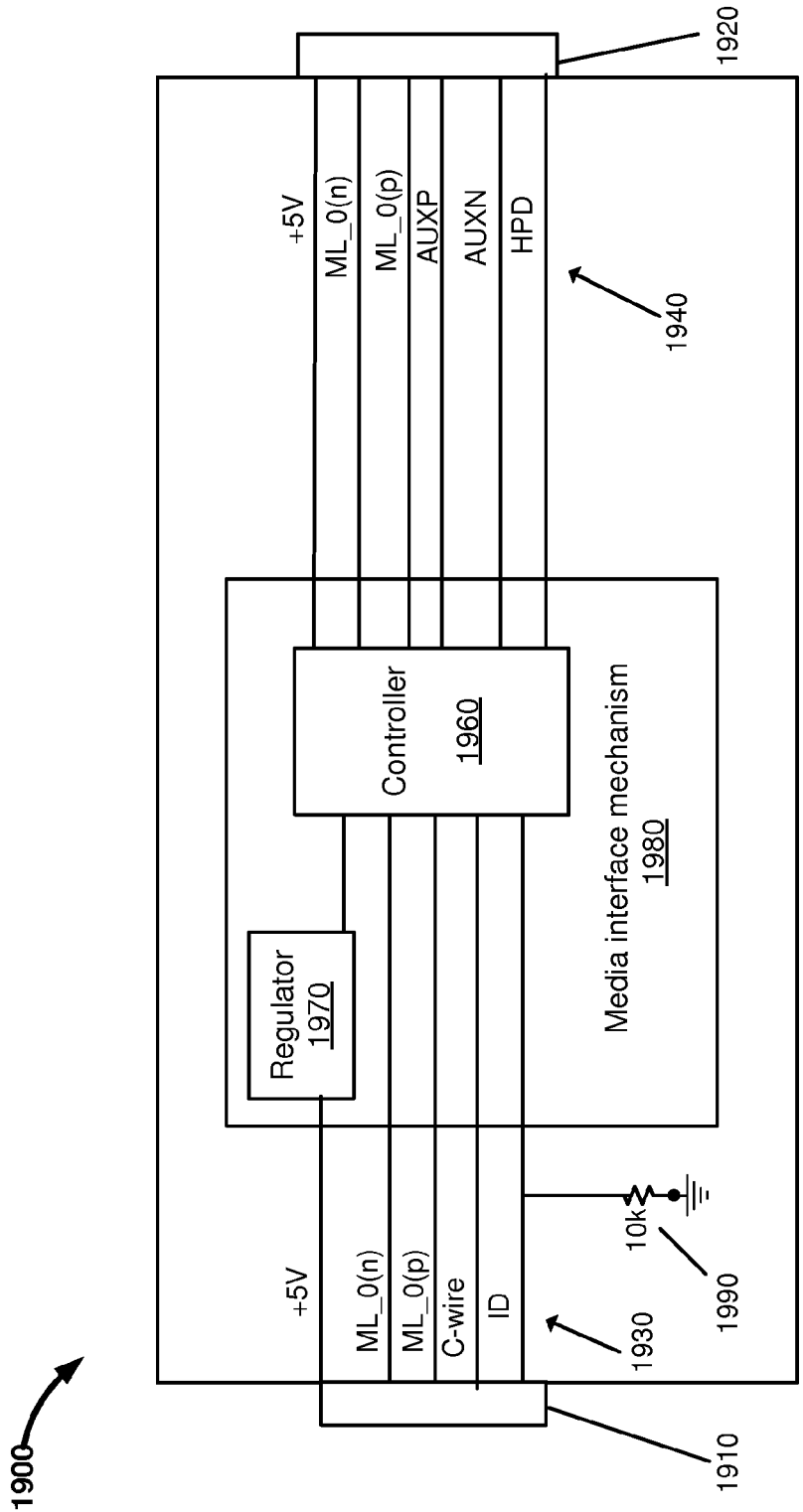
FIG. 19 is an exemplary interface assembly to implement the interface assembly of FIG. 16.

FIG. 19 is an exemplary interface assembly 1900 to implement the interface assembly 1600 of FIG. 16. Interface assembly 1900 may couple a DisplayPort compatible source device to a sink device having a DisplayPort compatible port. Interface assembly 1900 includes a USB connector 1910, a media interface mechanism 1980 coupled between a first cable portion 1930 and a second cable portion 1940, a device type indicator 1990, and a media connector 1920. The first cable portion 1930 may include a plurality of conductors for carrying a +5V signal, a C-wire signal, and an ID signal respectively. Conductors may also be included for carrying at least one lane of uncompressed high resolution media data in accordance with a DisplayPort media standard (see e.g., one lane identified as ML-0(n), and ML-0(p)). Although one lane is shown in FIG. 19 for a USB 2.0 connector 1910 of the interface assembly 1900, multiple lanes may be used (e.g., if a USB 3.0 connector is used). The corresponding source device USB port may provide multiple lanes in FIGS. 2-5 for a USB 3.0 port, and a single lane in FIGS. 6-11 for a USB 2.0 port. The USB connector 1910 includes corresponding pins having ends to which the conductors 1930 may be coupled. The C-wire signal is for providing a single signal for carrying side-band communication to and from the USB connector 1910.

Device type indicator 1990 may include a 10 k ohm impedance coupled between the conductor for the ID signal (at the ID pin) and a reference potential. Other suitable impedances may be used. A high definition (HD) uncompressed media data signal may be indicated at the ID pin. For example, the uncompressed media data signal may have a detection state associated with an impedance other than that for a USB detection state and distinguishable from any USB detection state. Examples of such an impedance include 20 k ohm, 15 k ohm, 10 k ohm, 5 k ohm, or some other level of impedance. Though a particular impedance level of 10 k ohm may be discussed herein and shown in FIG. 19, different levels of impedance may be used to differentiate an uncompressed media data signal from USB signals at an ID pin. According to various embodiments, a detection state shown in FIG. 3 corresponding to a 10 k ohm impedance indicates compatibility with a HD uncompressed media data signal cable, i.e., a media mode. Responsive to the indication of the media mode, the micro-controller 206 of selection circuit 212 in the source device may generate a selection signal 216 to cause the switch 210 to selectively couple the DisplayPort transmitter 604 to the USB port 208 (See FIG. 4).

Media interface mechanism 1980, controller 1960, and regulator 1970 may implement, respectively, media interface mechanism 1604, controller 1610, and regulator 1612, of FIG. 16. In the example in FIG. 19, media connector 1920 of the interface assembly 1900 may be coupled to a sink device that is compatible with a DisplayPort standard. The second cable portion 1940 may include a plurality of conductors separately carrying a +5V signal, the ML-0(n), and ML-0(p) signals for the at least one lane of uncompressed high resolution DisplayPort data, along with the AUXP, AUXN, and HPD side-band communication signals. The media connector 1920 includes corresponding pins having ends to which the conductors may be coupled.

In the example in FIG. 19, media connector 1920 is a DisplayPort connector for connection to a sink device that is DisplayPort compatible. Interface assembly 1900 is operable to couple the three auxiliary side-band communication signals (AUXP, AUXN, and HPD) to sink device 110 via media connector 1920 in accordance with the DisplayPort specification. Media interface mechanism 1980 may be supplied with the C-wire signal and may be operable to reconstruct the AUXP, AUXN, and HPD side-band communication signals from the supplied C-wire signal Any handshaking information to be communicated from sink device 110 on the AUXP, AUXN and HPD signals may be received by interface assembly 1900, encoded onto the C-wire signal and transmitted to source device 102 via USB connector 1910. The sink device 110 may be configured for processing the at least one lane of data for presenting to a user.

Figure 20:
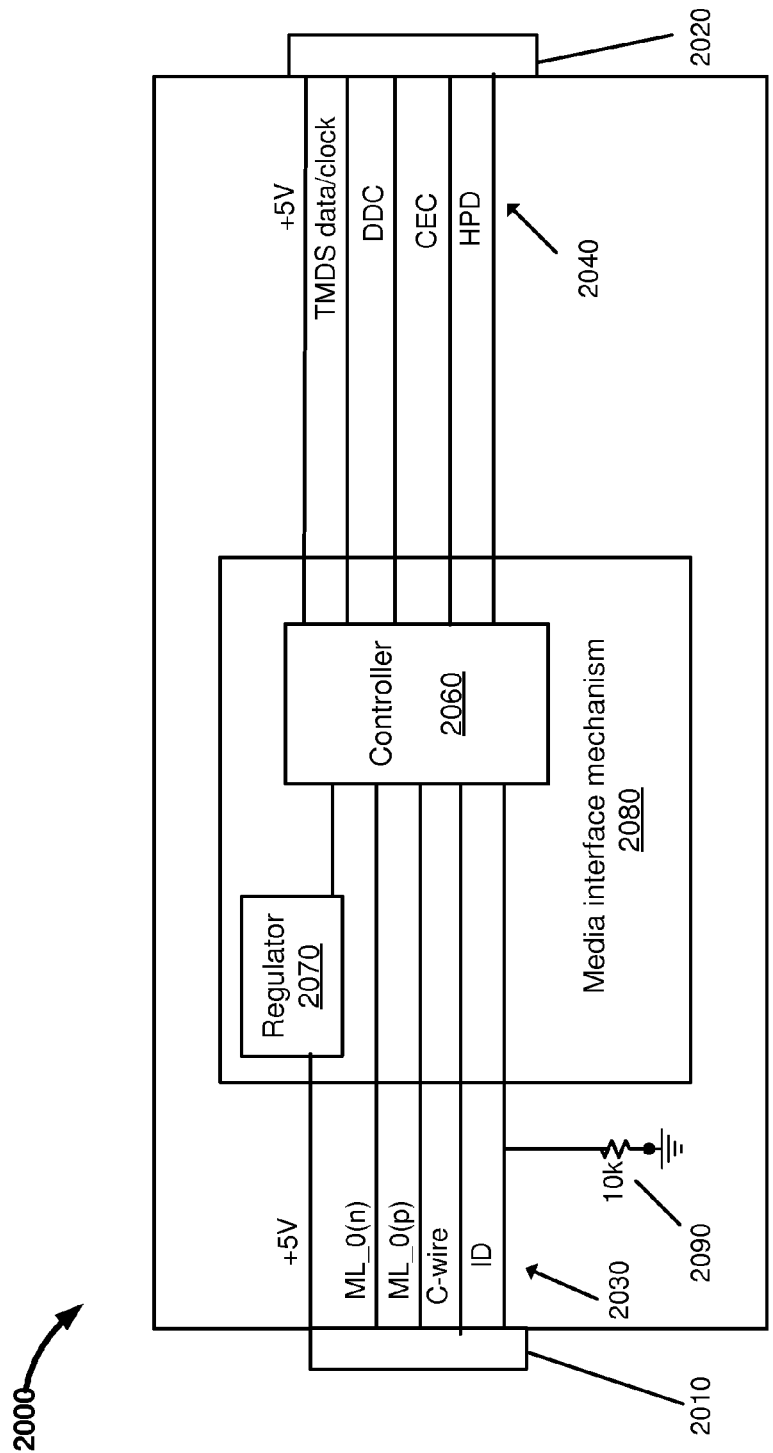
FIG. 20 is another exemplary interface assembly to implement the interface assembly of FIG. 16.

FIG. 20 is another exemplary interface assembly 2000 to implement the interface assembly of FIG. 16. The exemplary interface assembly 2000 may couple a DisplayPort compatible source device to a sink device having an HDMI compatible port. Although interface assembly 2000 is shown for HDMI in FIG. 20, other media standards port may be implemented. Interface assembly 2000 may include a USB connector 2010, a media interface mechanism 2080 coupled between a first cable portion 2030 and a second cable portion 2040, a media connector 2020, and a device type indicator 2090. Media connector 2020 is an HDMI connector in this example, i.e., not a DisplayPort connector.

First cable portion 2030 may include a plurality of conductors separately carrying a +5V signal, a C-wire signal for side-band communication, an ID signal, at least one lane of uncompressed high resolution media data in accordance with a DisplayPort media standard, ML-0(n), and ML-0(p). In some embodiments, a USB 3.0 connector may be used to supply multiple lanes of uncompressed high resolution media data to an interface assembly. The USB connector includes corresponding pins having ends to which the conductors may be coupled.

Device type indicator 2090 may include a 10 k ohm impedance coupled between the conductor for the ID signal (at the ID pin) and a reference potential. Other suitable impedances may be used. A high definition (HD) uncompressed media data signal may be indicated at the ID pin. For example, the uncompressed media data signal may have a detection state associated with an impedance other than that for a USB detection state and distinguishable from any USB detection state. Examples of such an impedance include 20 k ohm, 15 k ohm, 10 k ohm, 5 k ohm, or some other level of impedance. Though a particular impedance level of 10 k ohm may be discussed herein and shown in FIG. 20, different levels of impedance may be used to differentiate an uncompressed media data signal from USB signals at an ID pin. According to various embodiments, a detection state shown in FIG. 3 corresponding to a 10 k ohm impedance indicates compatibility with a HD uncompressed media data signal cable, i.e., a media mode.

Media interface mechanism 2080, controller 2060, and regulator 2070 may implement, respectively, media interface mechanism 1604, controller 1610, and regulator 1612 of FIG. 16. In the example in FIG. 20, media connector 2020 of the interface assembly 2000 may be coupled to a sink device that is compatible with an HDMI media standard. Second cable portion 2040 may include a plurality of conductors separately carrying a +5V signal, Transition Minimized Differential Signaling (TMDS) data/clock signal, along with the Display Data Channel (DDC), Consumer Electronics Control (CEC) and Hot Plug Detect (HPD) signals in accordance with the HDMI standard.

Since the HDMI standard for the media connector 2020 is other than a DisplayPort standard, the at least one lane of received (DisplayPort) data (ML_0(n), ML_0(p)) is configured by the controller 2060 before being supplied to the media connector 2020 (i.e., configured in accordance with the HDMI standard).

Controller 2060 is further operable to convert the side-band communication data received in the C-wire signal from USB connector 2010 into a plurality of signals in accordance with the HDMI standard (e.g., DDC, CEC, HPD). The plurality of side-band communication signals are coupled to media connector 2020 from controller 2060 by the second cable portion 2040, such that the side-band communication data can be communicated to an HDMI compatible sink device via the HDMI connector 2020.

Controller 2060 may be operable to receive side-band communication data via the HDMI media connector 2020 from an HDMI compatible sink device. Controller 2060 is further operable to configure the received side-band communication data to supply to USB connector 2010. The configuring of the side-band communication data by the controller 2060 may include converting the received side-band communication signals (e.g. DDC, CEC, HPD) into a single signal (e.g., C-wire signal) and coupling it to USB connector 2010. The conversion includes encoding the single C-wire signal for supplying to USB connector 2010 and processing any required responses to the side-band communications from the sink device via media connector 2020.

Controller 2060 is operable to detect that a source device (e.g., source device 102 in FIG. 1A) is coupled to USB connector 2010 and that a sink device (e.g., sink device 110 in FIG. 1A) is coupled to media connector 2020. Regulator 2070 is operable to regulate the +5V input supplied by the source device to provide suitable power required by the controller 2060.

Figure 21:
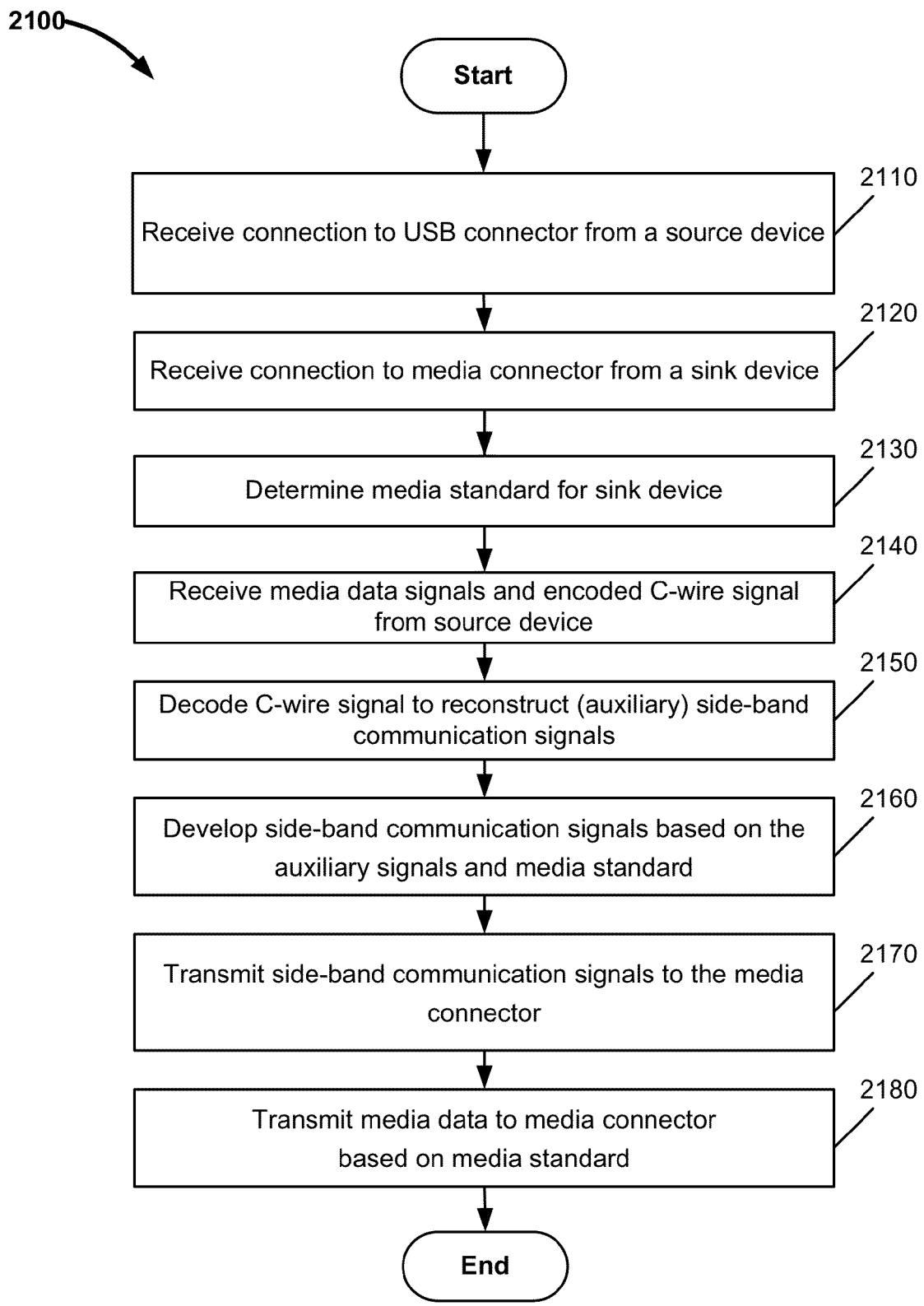
FIG. 21 is a flow chart of an exemplary method for transferring data.

FIG. 21 is a flow chart of an exemplary method 2100 for transferring data. Method 2100 may be for transferring data to the media connector of the interface assembly (see e.g., media connector 124 in FIG. 16, DisplayPort standard connector 1920 in FIG. 19, and HDMI standard connector 2020 in FIG. 20). A connection to the USB connector (see e.g. connector 120 in FIG. 16) is received from a source device at step 2110. The connection may be from a USB port of a source device (see e.g. source device 102 in FIG. 1A). A connection to the media connector is received from a sink device at step 2120. The connection may be from a media port of a sink device (see e.g. sink device 110 in FIG. 1A). A determination is made of the media standard for the sink device at step 2130. The media standard may be predetermined by the type of media connector in the interface assembly. Media data signals and an encoded C-wire signal may be received from the source device at step 2140. At step 2150, the C-wire signal may be decoded to reconstruct the (auxiliary) side-band communication signals (e.g., signals AUXP, AUXN, HPD). Side-band communication signals are developed based on the auxiliary signals and the media standard, at step 2160. The side-band communication signals are transmitted to the media connector at step 2170. At step 2180, media data is transmitted to the media connector based on media standard.

Figure 22:
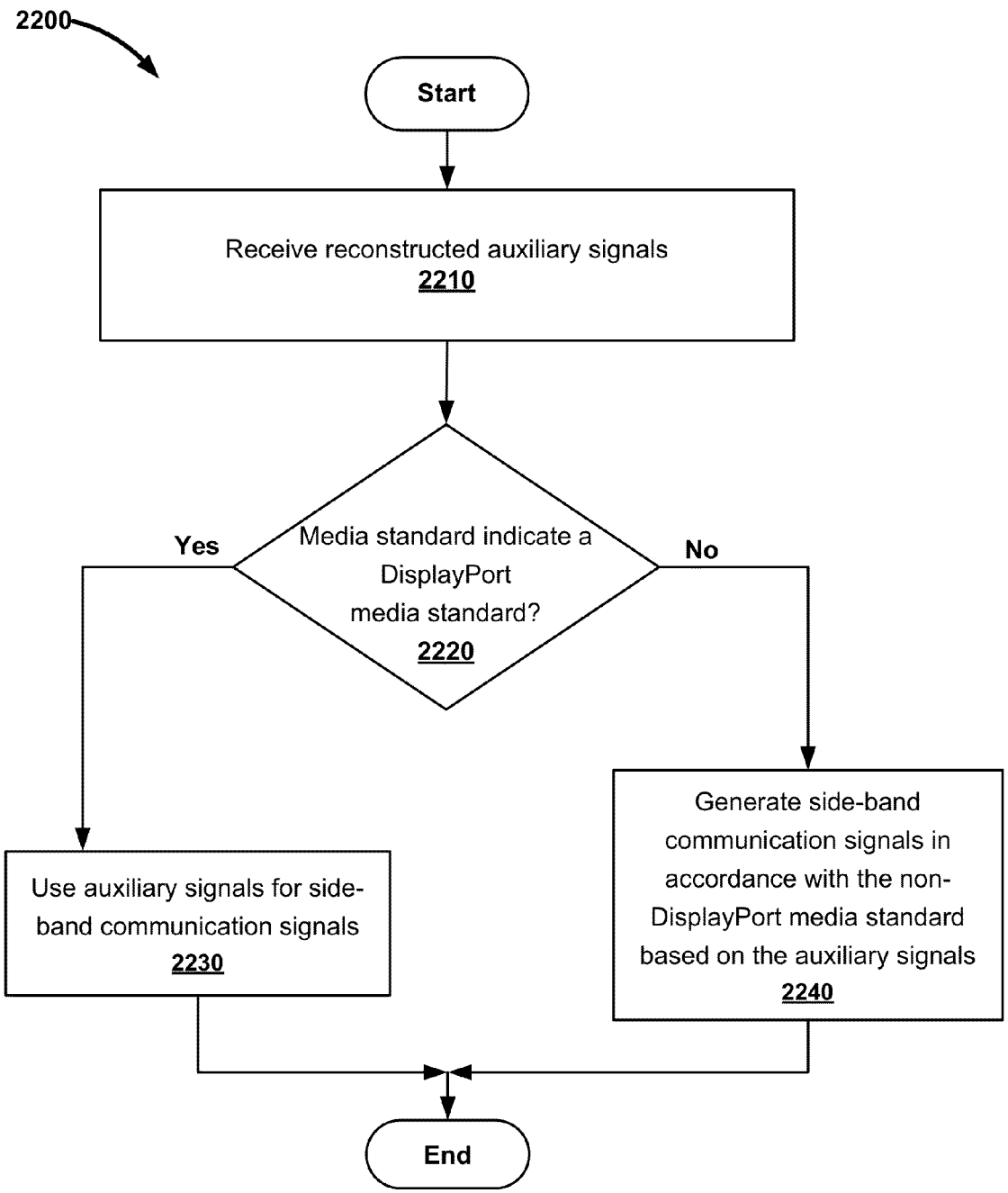
FIG. 22 is a flow chart of an exemplary method for developing side-band communication signals based on the auxiliary signals and the media standard.

FIG. 22 is a flow chart of an exemplary method 2200 for developing side-band communication signals based on the auxiliary signals and the media standard. The reconstructed auxiliary signals are received at step 2210. A determination is made at step 2220 whether the media standard indicates a DisplayPort media standard. The media standard may be determined by the media standard for the media connector of the interface assembly (see e.g., connector 124 in FIG. 16, DisplayPort standard connector 1920 in FIG. 19, and HDMI standard connector 2020 in FIG. 20). If the media standard indicates a DisplayPort standard, the auxiliary signals are used for the side-band communication signals at step 2230. If the media standard indicates a standard that is not a DisplayPort standard, the side-band communication signals are generated at step 2240 (e.g., by the controller 1610 in FIG. 16) in accordance with the non-DisplayPort media standard based on the auxiliary signals.

Figure 23:
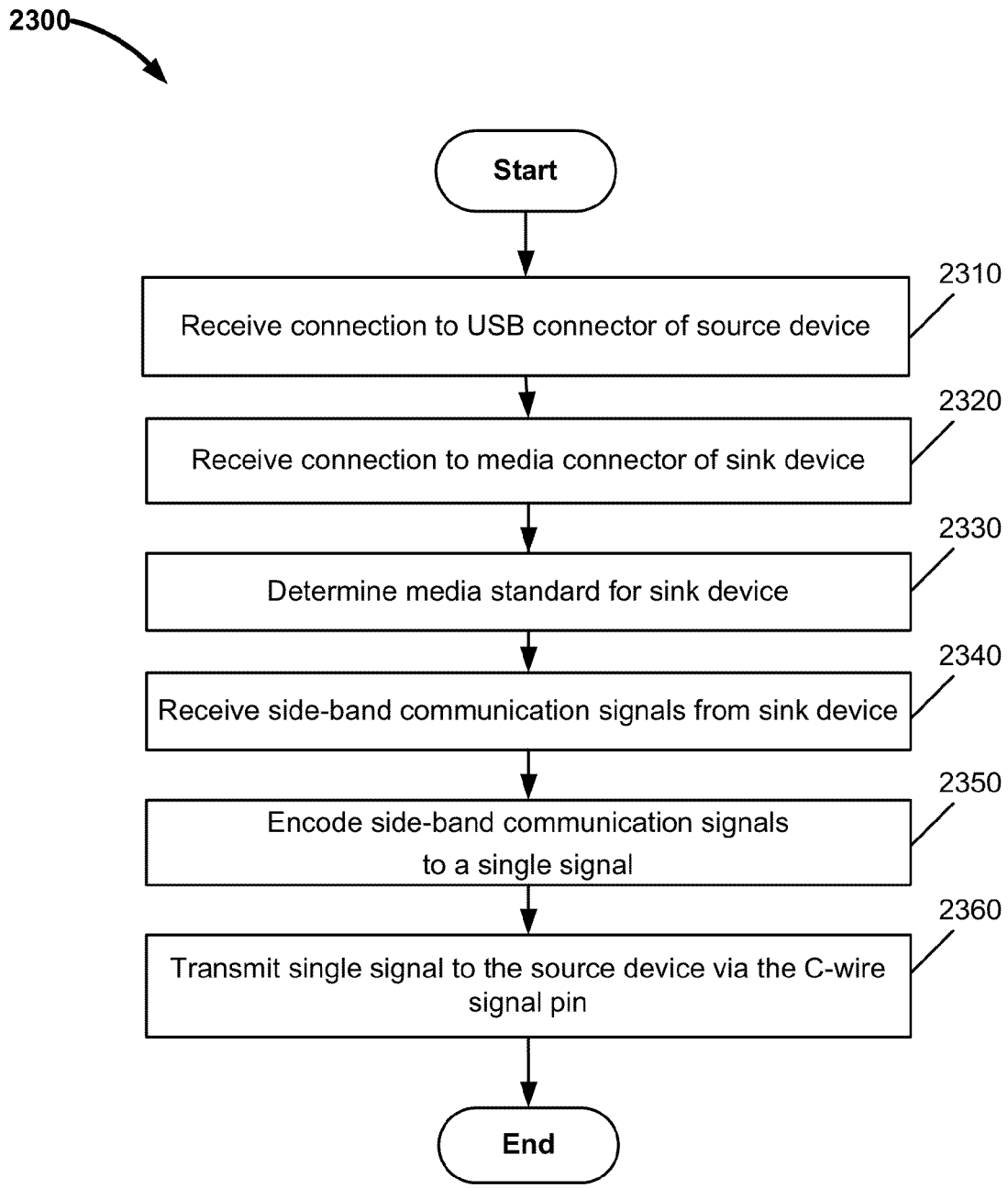
FIG. 23 is a flow chart of an exemplary method for transferring data.

FIG. 23 is a flow chart of an exemplary method 2300 for transferring data. The exemplary method 2300 may be for transferring side-band communication data to the USB connector of the interface assembly (see e.g., USB connector 120 of interface assembly 1600 in FIG. 16, USB connector 1910 of interface assembly 1900 in FIG. 19, and USB connector 2010 of interface assembly 2000 in FIG. 20). A connection to a USB connector of a source device is received at step 2310. A connection to a media connector of a sink device is received at step 2320. A determination is made of the media standard for the sink device at step 2330. The media standard may be determined by the media standard for the media connector of the interface assembly. Side-band communication signals are received from the sink device at step 2340. The side-band communication signals are encoded onto a single signal (e.g., the C-wire signal in FIG. 16) at step 2350. The single signal is transmitted to the source device via the C-wire signal pin of the USB connector (see e.g., connector 1910 in FIG. 19 and connector 2010 in FIG. 20) at step 2360.

In exemplary embodiments, a single wire (e.g. a Micro or Mini USB ID pin) to communicate side-band information between transmitter devices and receiver devices. As stated above, this single wire may be named C-wire. The C-wire may be a relatively low-speed (e.g., 1 Mbps, 2 Mbps, or any suitable speed) half-duplex bi-directional single-end link. See FIG. 18 for an exemplary embodiment of an exemplary single signal (e.g., C-wire signal) that may be used for communicating side-band communication.

Figure 31:
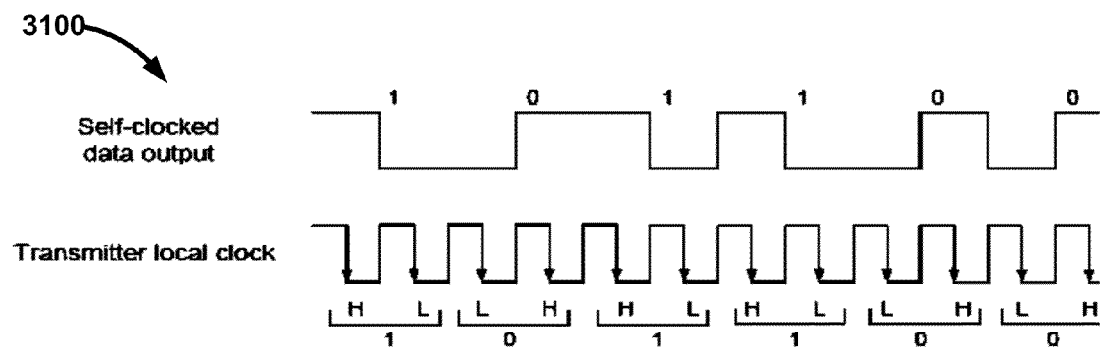
FIG. 31 is a timing diagram illustrating an exemplary c-wire that performs self-clocked transmission of signals.

The C-wire may, in some embodiments, utilize Manchester-II code for the self-clocked transmission of signals 3100 as shown in FIG. 31.

Figure 32:
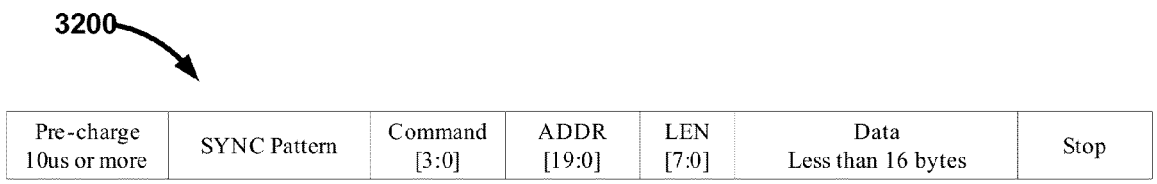
FIG. 32 illustrates an exemplary data format of a request transaction.

An exemplary data format of a request transaction may be represented as shown in FIG. 32, in data flow 3200.

Figure 33:
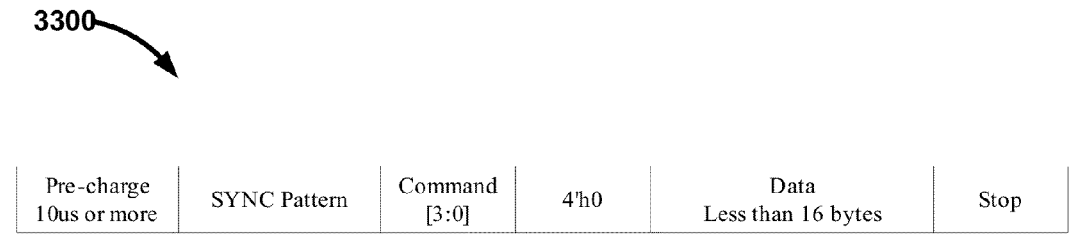
FIG. 33 illustrates an exemplary data format of a reply transaction.

An exemplary reply transaction may take the form shown in data flow 3300 of FIG. 33. At a pre-charge state, 10 to 16 consecutive 0's in Manchester II code may pre-charge a C-wire line.

At an exemplary Sync Pattern state, the transaction may commence with 16 consecutive 0's in Manchester II code. At the end of the exemplary Sync Pattern, the C-wire may be driven high for a two-bit period and low for a two-bit period. Such an operation is illegal in some embodiments of Manchester II code.

The Request Command may take one of the forms shown below in Table 6:

TABLE 6

| COMM[3] | COMM[2] | COMM[1] | COMM[0] |
|---|---|---|---|
| 1: DisplayPort transaction | 000: Request type is write<br>001: Request type is read<br>others: Reserved | | |
| 0: I2C transaction | 11: MOT (Middle-of-Transaction) = 1<br>10: MOT (Middle-of-Transaction) = 0 | 00: write<br>01: read<br>00: write_status_request<br>01: Reserved | |

The Reply Command may take the one of the forms shown below in Table 7:

TABLE 7

| COMM[3] | COMM[2] | COMM[1] | COMM[0] |
|---|---|---|---|
| I²C-over-AUX Reply field: | | Native Reply field: | |
| 00: I²C_ACK. | | 00: ACK. | |
| 01: I²C_NACK. | | 01: NACK. | |
| 10: I²C_DEFER. | | 10: DEFER. | |
| 11: Reserved. | | 11: Reserved. | |

At an exemplary "Stop" state, the C-wire line 2640 may be driven too high for a two bit period and low for a two bit period, which is illegal in Manchester II code.

The functions of the C-wire may include plugged device type identification, where a host device (see e.g. Host 2610 in FIG. 26) may use the C-wire to identify the receiver device (see e.g. Sink/repeater 2620 in FIG. 26) or if a traditional mobile device USB accessory may be plugged in. The C-wire may also be used for HPD Detection, where a host device can get HPD information of downstream receiver (or sink) device, which may utilize any of a DisplayPort, an HDMI, a DVI, and/or a VGA converter device. The C-wire may also be used for DPCD reading, where the host device may read DPCD of a repeater/converter with the C-wire.

Figure 24:
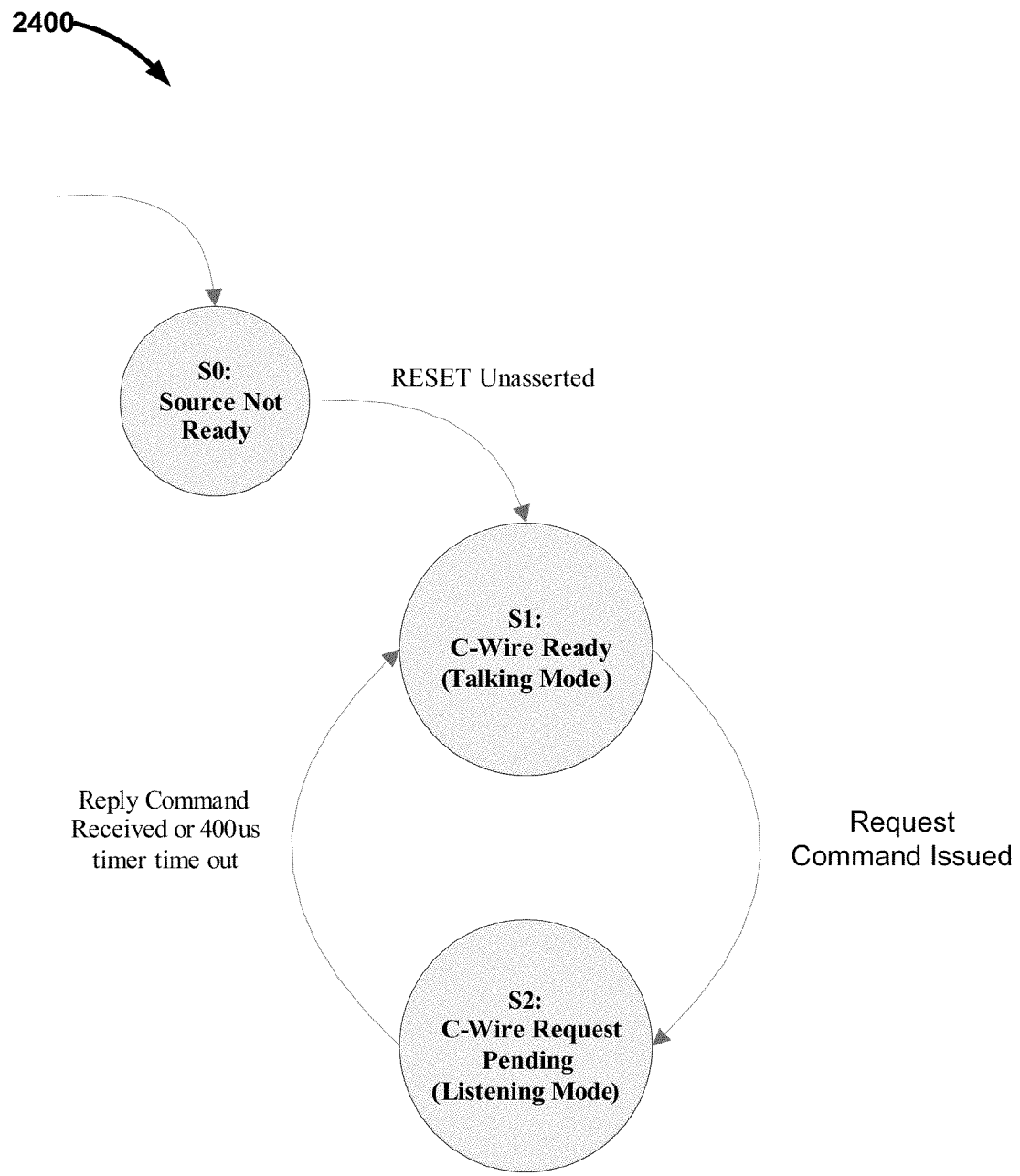
FIG. 24 is a state diagram of an exemplary C-wire source device.
Figure 25:
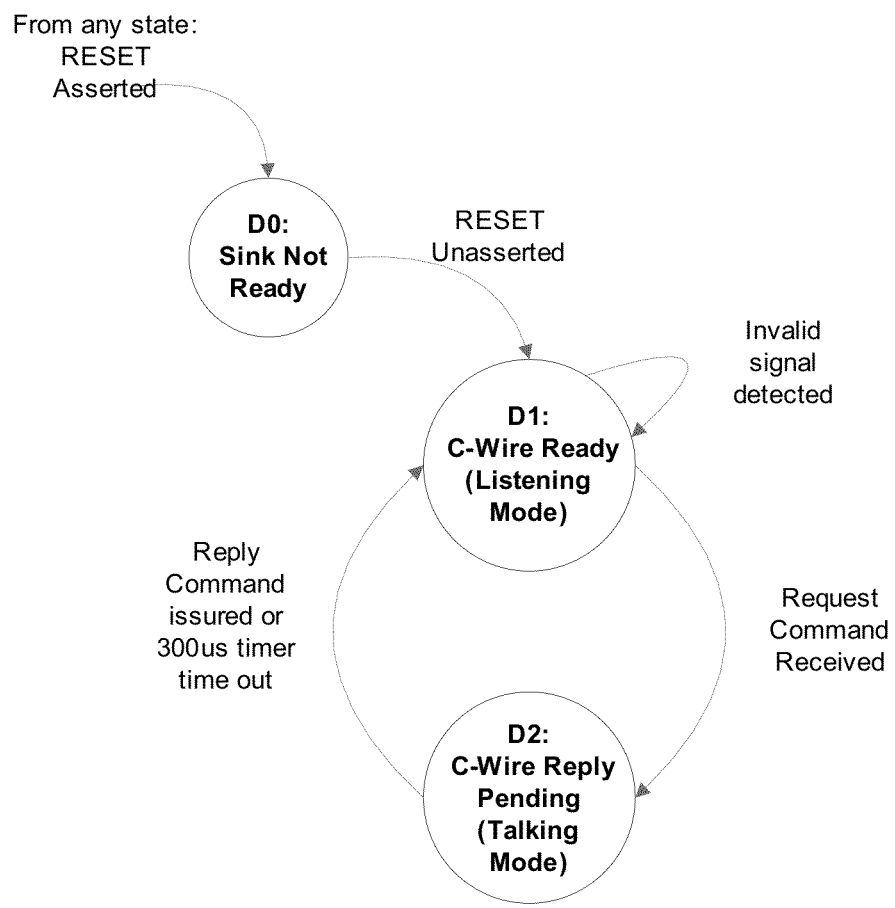
FIG. 25 is a state diagram of an exemplary C-wire sink device.

The C-wire may also be used for configuration registers access, where the host device may read and write to a configuration register of a receiver (or sink) device. Furthermore, EDID reading may be performed, where a host device may read EDID of any of a DisplayPort, an HDMI, a DVI, and/or a VGA sink device. In some embodiments, link training, where a host device performs link training of DP link with repeater/converter device, may be performed using the C-Wire. Additionally, DCP authentication, wherein a host device performs HDCP authentication with one or more downstream receiver devices, may be performed using a C-wire. CEC Support may also, in some embodiments, be provided by the C-wire. A host device may send one or more CEC commands with access configuration register over the C-wire. If a CEC command is received by a compatible repeater/converter through sink devices, the repeater/converter will notify the host device with a vendor specific interrupt. These and other examples of the functionality provided by the C-wire are shown in FIGS. 24 and 25.

Figure 26:
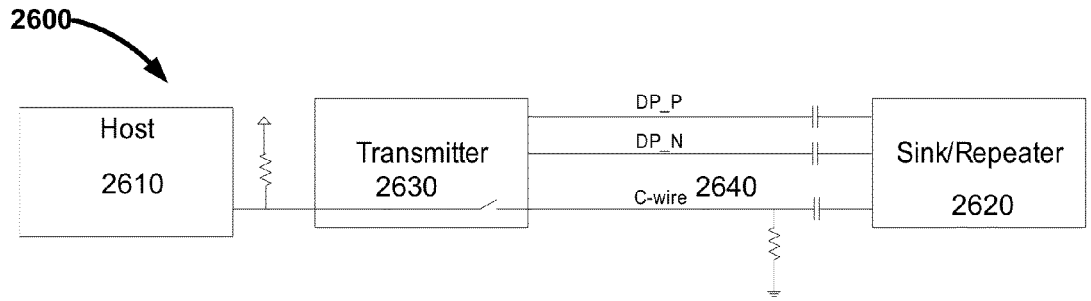
FIG. 26 is a block diagram of an exemplary interface assembly.

As stated above, plugged device type identification may be performed using the C-wire. As shown in FIG. 26, the mobile system could detect sink/repeater/converter chip plug-in through an ID pin (defined in Micro-USB) pull-down resistance. The resistance value may be defined by system requirement in various embodiments. The plugged device type identification is described below, with regard to the downstream device detect, in further detail.

When a host device 2610 detects that the repeater/converter device 2620 (also referred to herein as the sink/repeater) is plugged in, it may initialize the DPCD read operation of the downstream device (e.g., transmitter 2630) via the C-wire 2640. If the DPCD read operation is successful, then the transmitter 2630 is self-powered and ready to operate. Otherwise the host device 2610 may send power through SP_PWR pin to the repeater/converter device 2620. Then the host device 2610 may read the DPCD of the repeater/converter device 2620 again. In this example, if a correct reply is received by the host device 2610, it is confirmed that a compatible sink/repeater/converter device 2620 is plugged in. If the DPCD read operation fails, the host device 2610 will go back to the device detection state, in this example.

Figure 27:
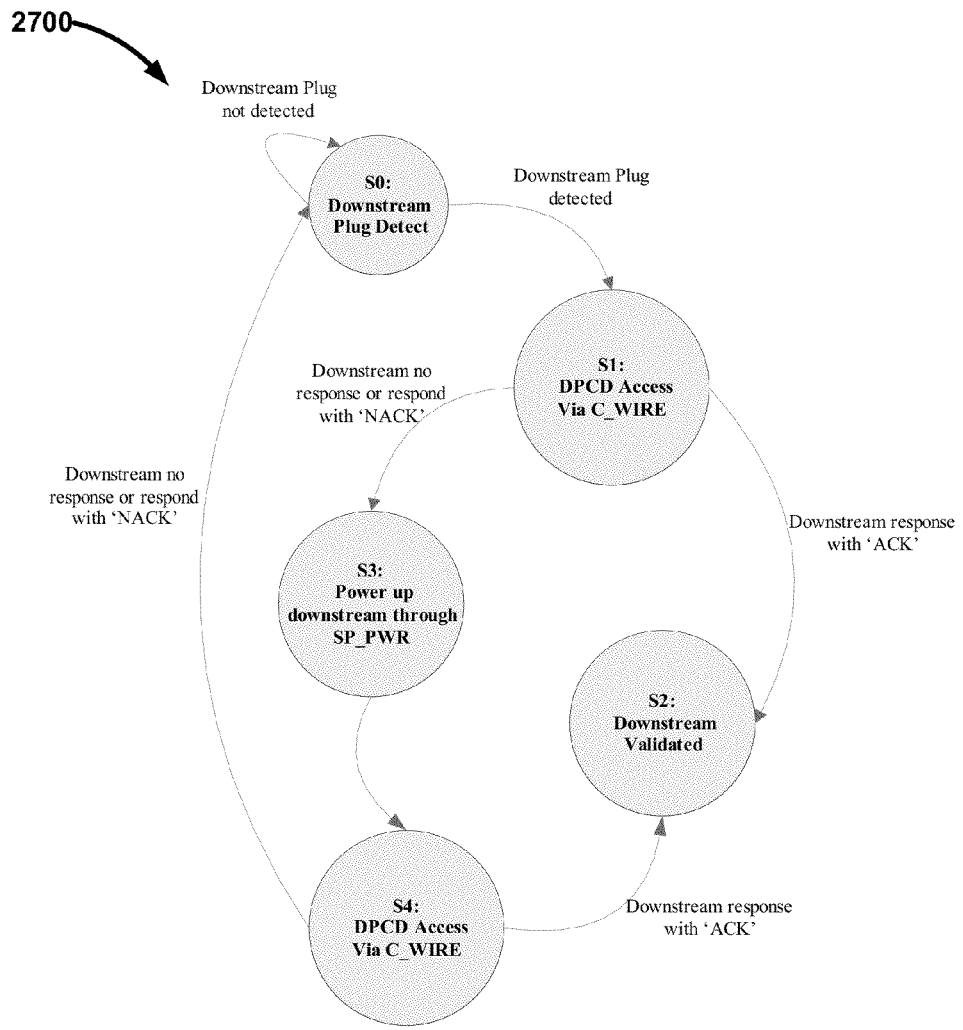
FIG. 27 is a state diagram of an exemplary interface assembly detecting a downstream device.

The above downstream device detection scheme is described in FIG. 27.

Figure 28:
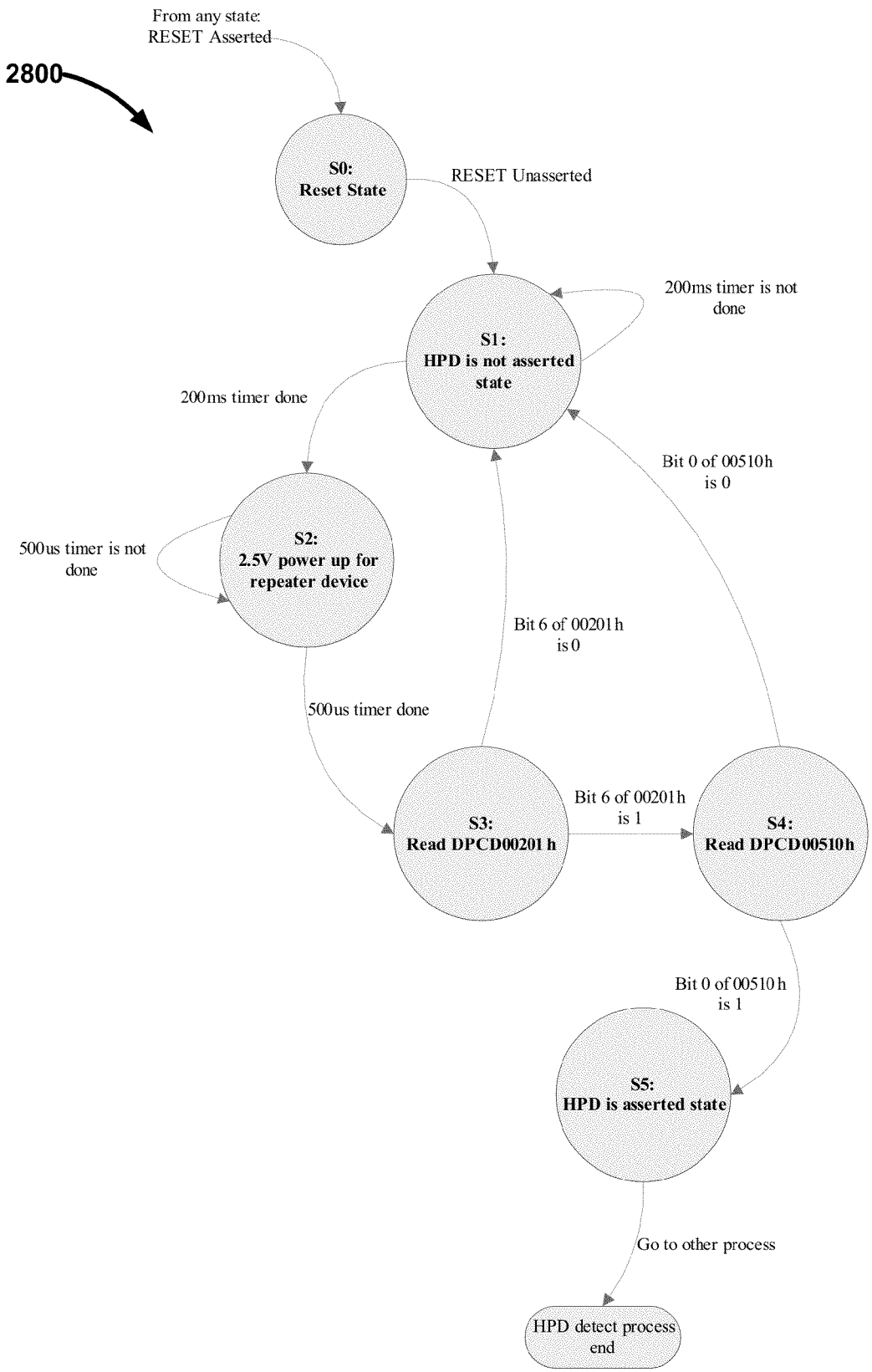
FIG. 28 is a state diagram of an exemplary interface assembly detecting a hot-plug-detect (HPD) device.

In various embodiments, after the repeater/converter 2620 device is identified, an upstream device will be polling DPCD DEVICE_SERVICE_IRQ_VECTOR (00201h) of the repeater/converter 2620 within 200 ms, also known as the "heartbeat function." An embodiment of the heartbeat function is described in FIG. 28. If the host device 2610 detects bit 6 (SINK_SPECIFIC_IRQ) of DEVICE_SERVICE_IRQ_VECTOR is 1, host device 2610 will read DPCD 00510h to identify which kind of device service interrupt is asserted. If bit 0 of DPCD 00510 is 1, that means downstream device is plugged. Otherwise the downstream device is unplugged. How the repeater/converter 2620 detects downstream device plug/unplug may be implementation specific in some embodiments.

The C-wire may provide additional functionality in some embodiments. The host device 2610 may use the C-wire 2640 to read or write DPCD of the repeater/converter 2620 with same mechanism defined in a DisplayPort standard specification. The host device 2610 may fully control all of configuration register of Repeater/converter with DPCD read/write using the C-wire 2640. The host device 2610 may also use the C-wire 2640 to read EDID with same mechanism defined in a DisplayPort standard specification.

The host device 2610 may use the C-wire 2640 to read and write to a sink device internal register. The sink internal register block may include a plurality of blocks, where each block may contain a 256-byte configuration register. Different commands to the sink device internal register are described below in Tables 8.1-8.3:

TABLE 8.1

SINK_DEV_SEL, DisplayPort Address: 0x005f0

| Bit | Name | Type | Def. value | Description |
|---|---|---|---|---|
| 7:4 | Reserved | R/O | 0x0 | |
| 3:0 | SINK_DEV_SEL | R/W | 0x0 | Select which block of sink internal register will be accessed. |

TABLE 8.2

SINK_ACCESS_OFFSET, DisplayPort Address: 0x005f1

| Bit | Name | Type | Def. value | Description |
|---|---|---|---|---|
| 7:0 | SINK_AC-CESS_OFFSET | R/W | 0x0 | This register gives the offset (register address) for accessing the internal registers defined in chip spec. |

TABLE 8.3

SINK_ACCESS_REG, DisplayPort Address: 0x005f2

| Bit | Name | Type | Def. value | Description |
|---|---|---|---|---|
| 7:0 | SINK_AC-CESS_REG | R/W | 0x0 | This register is the content mapping with the internal registers. |

For example, if host device 2610 wants to read configuration register block #7 and the offset is 0x01, the host device 2610 may:
  Write 0x07 to DPCD 005F0h using C-wire.
  Write 0x01 to DPCD 005F1h using C-wire.
  Read the content of block #7:0x01 from DPCD 005f2h.

Additionally, in an exemplary embodiment, if host device 2610 wants to read configuration register block #1 and the offset is 0x50 with 0xFF, the host device 2610 may:
  Write 0x01 to DPCD 005F0h using C-wire.
  Write 0x50 to DPCD 005F1h using C-wire.
  Write 0xFF to DPCD 005f2h, the data 0xFF will be written to block #1:0x50.

In further embodiments, host device 2610 may perform link training using the C-wire 2640 to transfer hand shake information as defined in a DisplayPort standard specification. When repeater/converter device 2620 detects the main link has lost synchronization, the repeater/converter device 2620 may set bit 6 of DPCD 00201h and bit 2 of DPCD 00510h to notify the link status to the host device 2610. The host device 2610 may be, in some embodiments, polling 00201 within 200 ms intervals. When the host device 2610 detects the link fail interrupt, the host device 2610 may be configured to re-perform link training to recover the main link.

In some embodiments, the host device 2610 may perform downstream HDCP authentication with the C-wire 2640 to transfer the hand shake information as defined in a DisplayPort standard specification. When HDCP authentication is performed, the repeater/converter device 2620 may set bit 6 of DPCD 00201h and bit 3 of DPCD 00510h to notify the host device 2610 that the authentication has been performed. Meanwhile, Bit 4 of DPCD 00510h may indicate the result of the HDCP authentication process. If Bit 4 is asserted with Bit 3 is 1 of DPCD 00510h, it is indicated that the HDCP authentication failed. However, if Bit 4 is 0, the HDCP authentication was successful. If the repeater/converter 2620 detects that HDCP link integrity check has failed, the repeater/converter 2620 may set Bit 6 of DPCD 00210h and Bit 5 of DPCD 00510h to notify host device 2610 about the event.

CEC may be supported over the C-wire 2640 in some embodiments. The commands sent from the sink device may be transferred to the source devices through a C-wire channel. The DPCD registers relative with CEC function are listed below, in Tables 9.1-9.4:

TABLE 9.1

CEC Control Register, DisplayPort Address: 0x00570

| Bit(s) | Name | Type | Default | Description |
|---|---|---|---|---|
| 7:4 | CEC_LADDR | R/W | 0x0 | CEC receiver logical address |
| 3 | CEC_RX_EN | R/W | 0x0 | CEC receiver enables. 1: enable; 0: disable |
| 2 | CEC_TX_ST | R/W S/C | 0x0 | CEC sending start |
| 1 | Reserved | | | |
| 0 | CEC_RESET | R/W S/C | 0x0 | CEC reset |

TABLE 9.2

CEC Rx Status Register, DisplayPort Address: 0x00571

| Bit(s) | Name | Type | Default | Description |
|---|---|---|---|---|
| 7 | CEC_RX_BUSY | R/O | 0x0 | CEC Rx busy. 1: receiver busy; 0: receiver idle |
| 6 | Reserved | | | |

TABLE 9.2-continued

CEC Rx Status Register, DisplayPort Address: 0x00571

| Bit(s) | Name | Type | Default | Description |
|---|---|---|---|---|
| 5 | CEC_RX_FUL | R/O | 0x0 | CEC Rx FIFO full indicator. 1: FIFO is full; 0: FIFO is not full. |
| 4 | CEC_RX_EMP | R/O | 0x1 | CEC Rx FIFO empty indicator. 1: FIFO is empty; 0: FIFO is not empty |
| 3:0 | RX_FIFO_CNT | R/O | 0x0 | The number of bytes in CEC Rx FIFO |

TABLE 9.3

CEC Tx Status Register, DisplayPort Address: 0x00572

| Bit(s) | Name | Type | Default | Description |
|---|---|---|---|---|
| 7 | CEC_TX_BUSY | R/O | 0x0 | CEC Tx busy. 1: receiver busy; 0: receiver idle |
| 6 | CEC_TX_FAIL | R/O | 0x0 | CEC Tx fail indicator for last sent message. 1: fail; 0: success. |
| 5 | CEC_TX_FUL | R/O | 0x0 | CEC Tx FIFO full indicator. 1: FIFO is full; 0: FIFO is not full. |
| 4 | CEC_TX_EMP | R/O | 0x1 | CEC Tx FIFO empty indicator. 1: FIFO is empty; 0: FIFO is not empty |
| 3:0 | TX_FIFO_CNT | R/O | 0x0 | The number of bytes in CEC Tx FIFO |

TABLE 9.4

CEC FIFO Register, DisplayPort Address: 0x00573

| Bit(s) | Name | Type | Default | Description |
|---|---|---|---|---|
| 7:0 | CEC_FIFO | R/W | 0x0 | CEC FIFO data port |

If a CEC Host wants to send a CEC command, the CEC Host may check a CEC status at first to identify whether the CEC line is ready to send command. When the CEC line is ready, then the CEC Host may write the CEC command content to CEC_FIFO until CEC FIFO is full or the CEC command is completed. Then the CEC Host may set CEC_TX_ST to start CEC for sending the command. If the CEC Host detects the CEC FIFO is not full and there is still command content pending to send, the CEC Host may write a second command to CEC FIFO until FIFO is full or the second command is finished. After all commands are sent or the FIFO is full, the DP receiver vendor-specific interrupt at Bit 7 of DPCD 00510h may be set to indicate this event.

Figure 29:
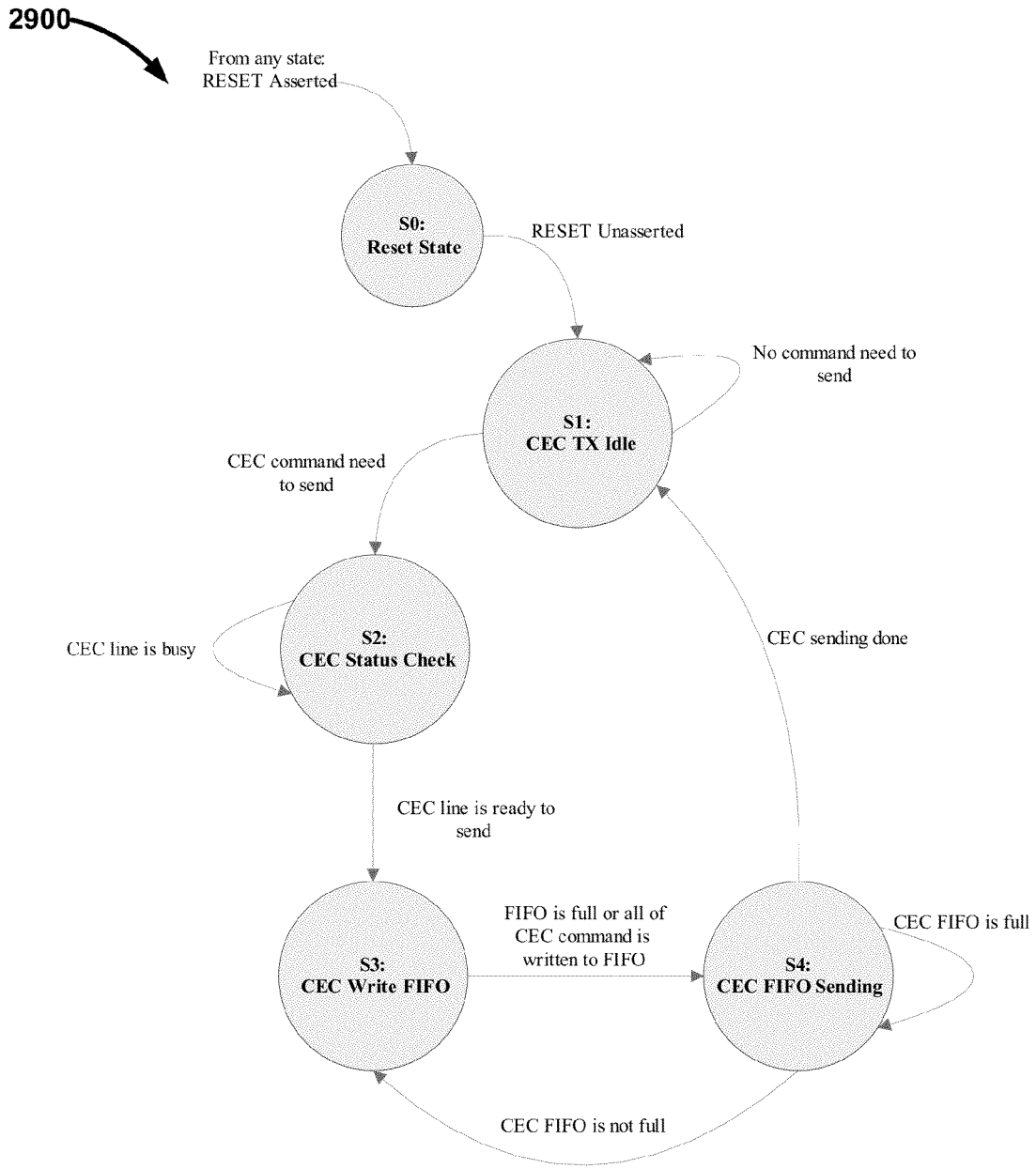
FIG. 29 is a state diagram of an exemplary interface assembly providing a Consumer Electronics Control (CEC) command.
Figure 30:
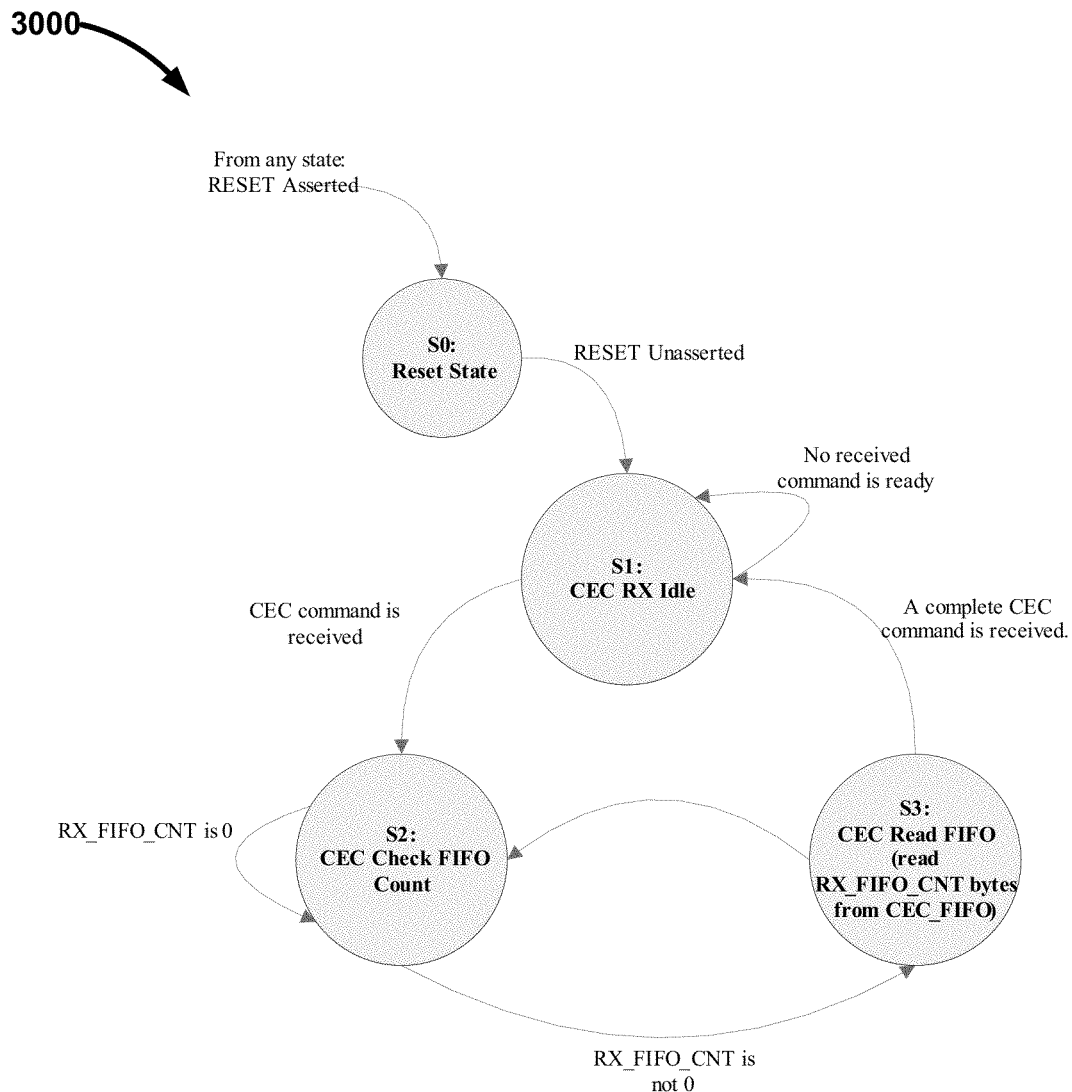
FIG. 30 is a state diagram of an exemplary interface assembly receiving a CEC command.

If a CEC command is received by a CEC repeater/converter from, for example, an HDMI sink device, the CEC repeater/converter may notify the CEC Host with the DP receiver vendor-specific interrupt. The CEC Host may read the CEC command from CEC FIFO. FIGS. 29 and 30 illustrate exemplary CEC sending flow and CEC receiving flow charts respectively. Table 10 illustrates exemplary vendor-specific interrupts.

TABLE 10

Vendor Specific Interrupt List

| DPCD Address | Definition | Read/Write |
|---|---|---|
| 00510h | VENDOR_SPECIFIC_INTERRUPT<br>Bit 0 = Downstream HPD is changed from 0 to 1.<br>Bit 1 = Downstream HPD is changed from 1 to 0.<br>Bit 2 = Link is down.<br>Bit 3 = Downstream HDCP is done.<br>Bit 4 = Downstream HDCP is fail.<br>Bit 5 = Downstream HDCP link integrity check fail.<br>Bit 6 = Received CEC command ready.<br>Bit 7 = CEC command transfer done. | Write clear<br>(Write 1 to each to clear the corresponding interrupt.) |
| 00511h | VENDOR_SPECIFIC_INTERRUPT<br>Bit 0 = CEC TX Error.<br>Bit 1 = CEC TX No ACK.<br>Bit 2 = Downstream HDMI sink termination resistor is detected.<br>Bit 3 = Downstream 2.1 V power is ready.<br>Bit 4 = Downstream 5 V power is ready.<br>Bit 5 = Downstream power status change.<br>Other bit is reserved. | Write clear<br>(Write 1 to clear the corresponding interrupt.) |

A protocol to merge the USB data stream into the DisplayPort data lane(s) to more efficiently utilize the available bandwidth on the DisplayPort link is described herein. That is, data, multimedia, or a combination thereof may be transferred from a source device to a downstream device over a single source device port to a single sink device. Furthermore, the received data, multimedia or a combination thereof may be split into their appropriate formats—i.e. data may be stored or synchronized and multimedia may be passed on for rendering.

USB 2.0 standard was defined in 2000, and defines a bi-directional differential signaling with speed up to 480 Mbps. DisplayPort defines a high-speed audio/video data transfer interface with 1 to 4 data lanes and one AUX channel. The data lane can have 1.62 Gbps/2.7 Gbps (for DisplayPort 1.1) or 5.4 Gbps (for DisplayPort 1.2) link speed and the AUX channel has 1 Mbps link speed. All the data lanes are uni-directional. The audio/video data is packed into the data lanes as long as the bandwidth allows.

Figure 43:
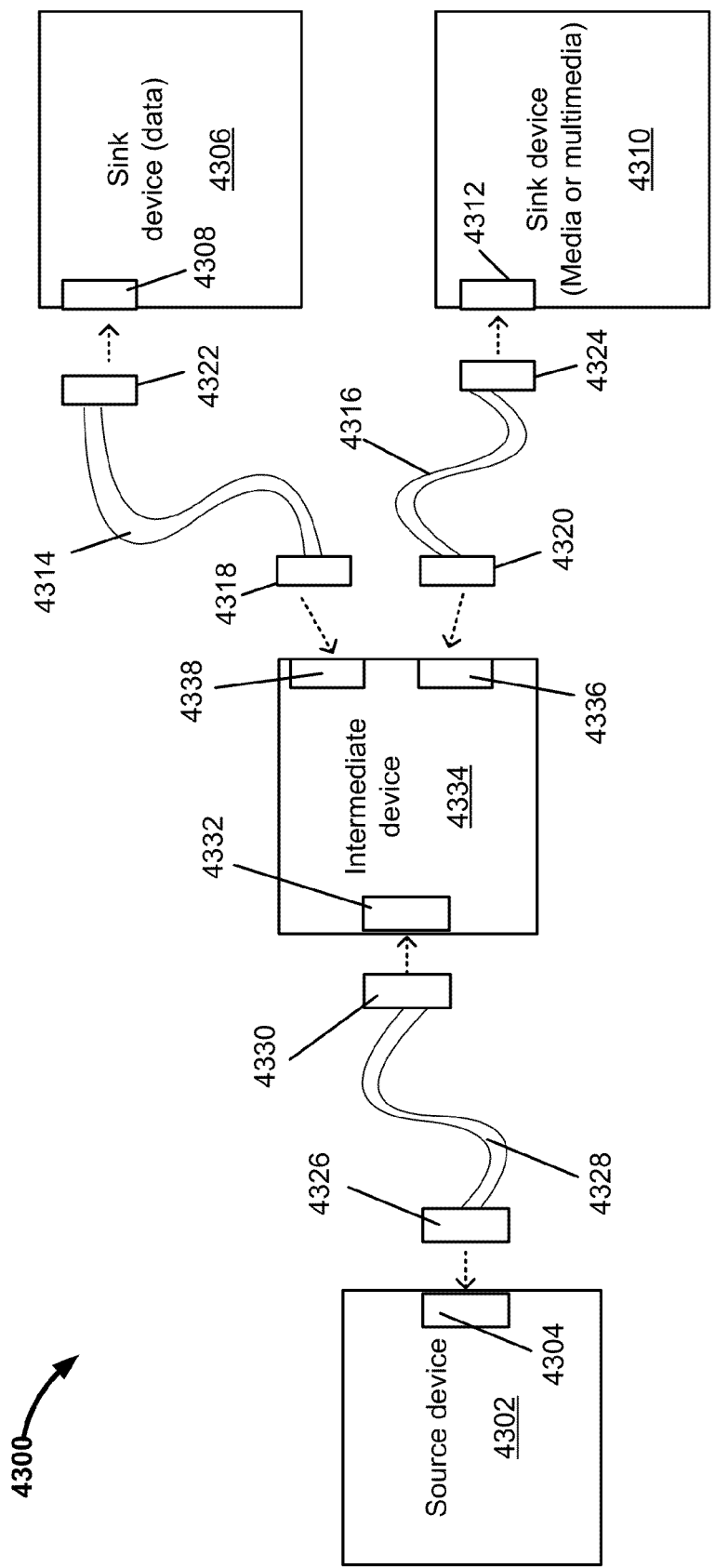
FIG. 43 is a block diagram of an environment for transfer of data, multimedia, or a combination thereof from source device to downstream device over a single source device port.

FIG. 43 is an exemplary block diagram of an environment 4300 for transfer of data, multimedia, or a combination thereof from source device to downstream device over a single source device port. The environment 4300 includes a system for transferring data according to various embodiments. The environment 4300 includes a source device 4302, an intermediate device 4334, a first sink device 4306, and a second sink device 4310. Source device 4302 may have a first media port 4304, and intermediate device 4334 may have a second media port 4332, USB output port 4338, and media data output port 4336. First sink device 4306 may include a USB port 4308, and second sink device 4310 may include a media data port 4312.

Source device 4302 may provide an output of data (in USB format or in another data transmission format), multimedia (e.g., uncompressed high definition media data or DisplayPort data), or a combination thereof over first media port 4304. Source device 4302 may communicate with intermediate device 4334 via cable 4328. An exemplary source device 4302, and the coupling and communication between the source device 4302 and the intermediate device 4334 are discussed in more detail below with respect to FIG. 34.

Intermediate device 4334 may be used to communicate with sink devices, such as first sink device 4306 and second sink device 4310, in some embodiments. The intermediate device 4334 may, in some embodiments, be a sink device. Many suitable form factors may act as the intermediate device 4334, including, for example, a source device dock and a computing device (e.g., laptop or desktop computer). Intermediate device 4334 may provide an output of data (in USB format or in another data transmission format) over a data port (e.g., USB output port 4338). Intermediate device 4334 may communicate with first sink device 4306 via cable 4314 and with second sink device 4310 via cable 4316. In some exemplary embodiments, the intermediate device 4334 may be integrated with one of or both the first sink device 4306 and the second sink device 4310 as a single unit.

The USB port 4308 may be one of various types including, but not limited to, a Micro-USB connector in accordance with a USB 3.0 specification standard, a Mini-USB connector in accordance with a USB 2.0 specification standard, and a Micro-USB connector in accordance with a USB 2.0 specification standard. The term "port" may also be referred to herein as a receptacle or connector. Hence, "port" as used herein is merely explanatory for emphasizing the function as a receptacle included as part of a device that may accept a corresponding connector (plug).

A media cable 4328 may be used to couple source device 4302 with intermediate device 4334 via first media port 4304 and second media port 4332 of devices 4302 and 4334, respectively. Intermediate device 4334 may also be considered a master or a slave device, at least because communication over the first media port 4304 and second media port 4332 may be bi-directional. Hence, either end of the media connection (for example, intermediate device 4334) may be considered either the master or the slave device in the connection, depending on who controls the transaction and what devices are connected on both sides. The media cable 4328 may have a first media connector 4326 at one end and a second media connector 4330 at the other end. The media connectors 4326 and 4330 may each be configured to "plug" into the corresponding media ports 4304 and 4332.

A USB cable 4314 may be used to couple intermediate device 4334 with first sink device 4306 via USB ports 4338 and 4308 of devices 4334 and 4306, respectively. First sink device 4306 may also be considered a master or a slave device, at least because USB transactions are bi-directional. Hence, either end of the USB connection (for example, first sink device 4306) may be considered either the master or the slave device in the connection, depending on who controls the transaction and what devices are connected on both sides. The USB cable 4314 may have a first USB connector 4318 at one end and a second USB connector 4322 at the other end. The USB connectors 4318 and 4322 may each be configured to "plug" into the corresponding USB ports 4338 and 4308.

Media cable 4316 may be used to couple intermediate device 4334 with second sink device 4310. Media cable 4316 includes a first media connector 4320 at one end and a second media connector 4324 at the other end. The first media connector 4320 may be configured to plug into media data output port 4336 of intermediate device 4334, and second media connector 4324 may couple to media data port 4312 of the second sink device 4310. The media cable 4316 and media data ports 4336 and 4312 may utilize any suitable standard or protocol, including, for example, DisplayPort, HDMI, VGA, or a proprietary standard or protocol. Media cable 4316 may include conductors, circuits and other components to couple the connectors 4320 and 4324.

First sink device 4306 may receive and/or transmit data in accordance with a USB standard or protocol. Though intermediate device 4334 may typically act as a "host" in a connection with first sink device 4306, first sink device 4306 may also act as a host in the connection. Examples of first sink device 4306 include a camera, smart phone, a hard drive, and video cam.

Second sink device 4310 may receive media (audio or video) or multimedia (both audio and video) signals via the media cable 4316 and provide a media output (video and/or audio) or otherwise process the received data. Media data port 4312 on second sink device 4310 may be a media or multimedia port. In some embodiments, second sink device 4310 is a DisplayPort compatible device, and port 4312 is configured to receive a DisplayPort compatible connection. Port 4312 and connector 4324 may also be compatible with other media or multimedia standards. Examples of second sink device 4310 include a projector, television, AV receiver, repeaters, or other media or multimedia capable device.

Figure 34:
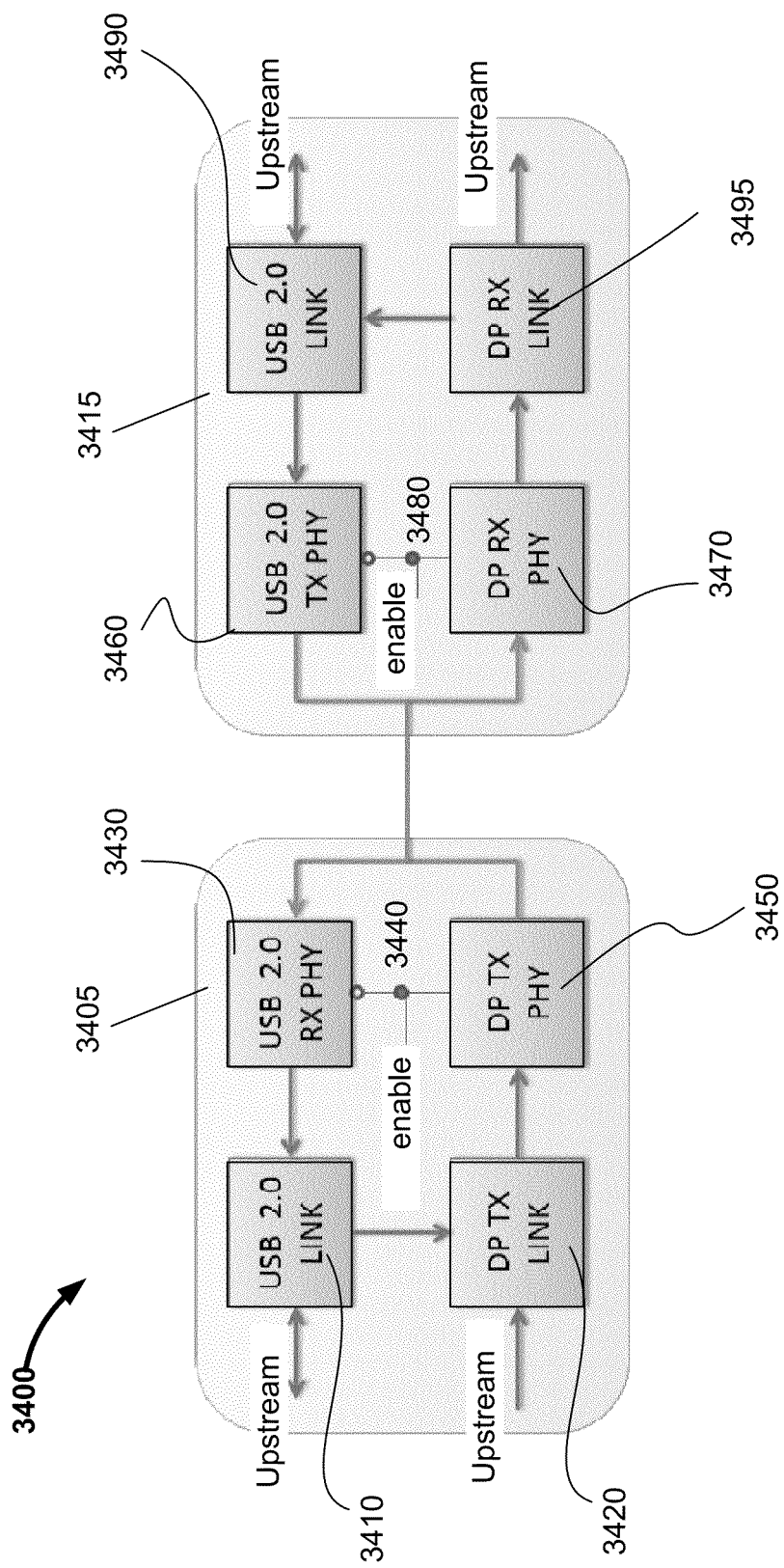
FIG. 34 is a block diagram showing an exemplary embodiment of a system that allows USB data transmission on a media port link.

An exemplary hardware structure 3400 is shown in FIG. 34. The USB 2.0 RX PHY 3430 and DP TX PHY 3450 are controlled by a first 'enable' signal 3440 and are not enabled at the same time in the exemplary embodiment. The USB 2.0 TX PHY 3460 and DP RX PHY 3470 are controlled by a second 'enable' signal 3480 and are not enabled at the same time in the exemplary embodiment. Compared with legacy DisplayPort 1.2 specification, the USB 2.0 TX/RX PHY 3430 and 3460 and LINK blocks 3410 and 3490 are extra hardware to support USB 2.0 data transfer on the DisplayPort link.

In an exemplary embodiment, three work modes are supported by the hardware structure in FIG. 34: media mode (which may be, for example a DisplayPort mode), USB mode and Mixed mode. A selection circuit may be used to determine which work mode the system of FIG. 34 utilizes. In an exemplary embodiment, a first selection circuit may be operative to selectively couple at least one of a USB transceiver circuit and a transmitter circuit to a first media port (which may be on a source device). The first selection circuit may perform the selective coupling based at least on a first configuration data received at the first media port. The first configuration data may be associated with a second device (e.g., a sink device).

In some embodiments, a second selection circuit may be operative to selectively couple at least one of a USB transceiver circuit and a transmitter circuit to a second media port (which may be on a sink device). The second selection circuit may perform the selective coupling based at least on a second configuration data received at the second media port. The second configuration data may be associated with the first device (e.g., a source device).

Figure 35A:
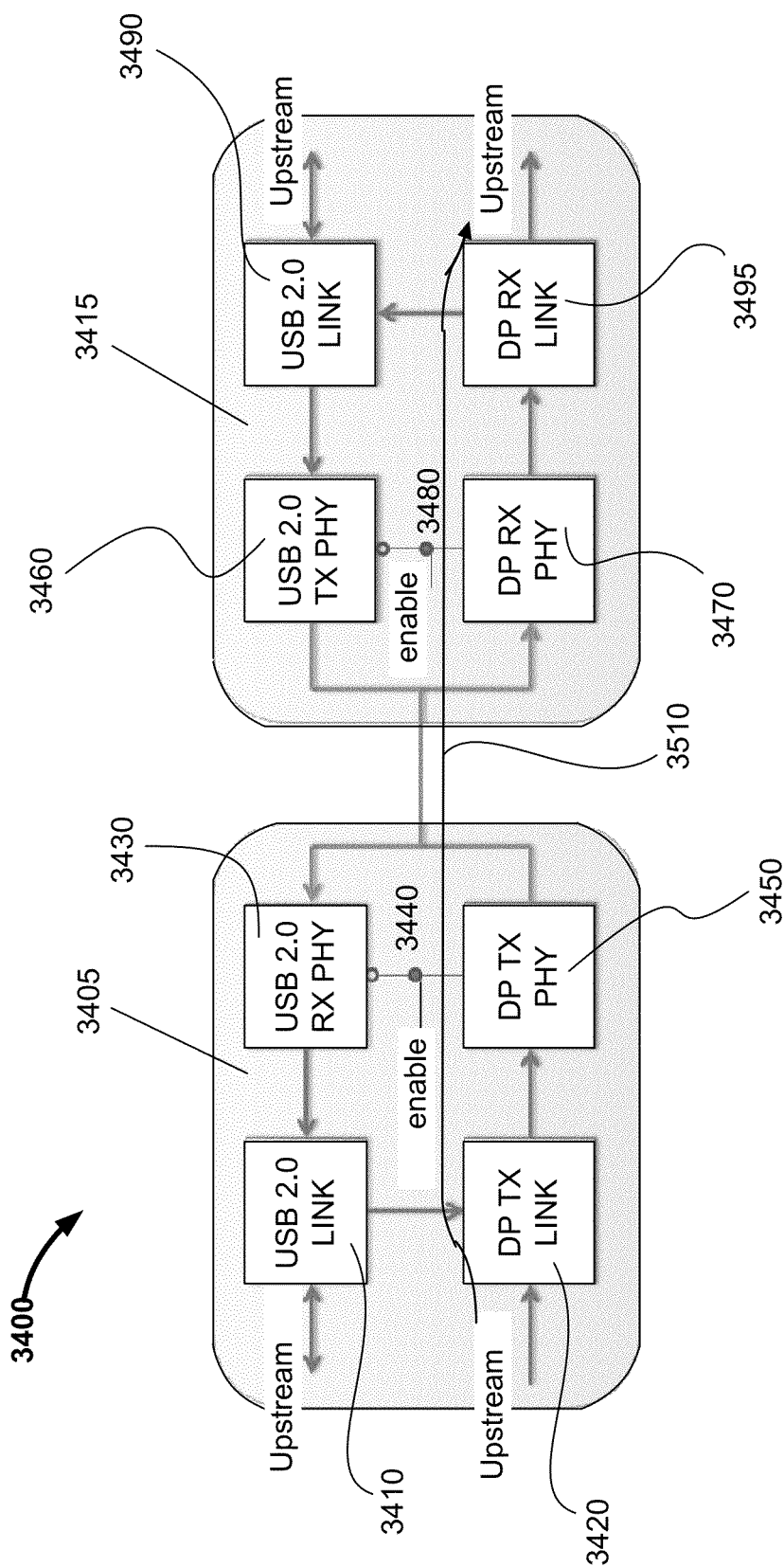
FIG. 35$a$ is a block diagram of an exemplary embodiment of a system that allows USB data transmission on a media port link configured to transmit video stream data in a media mode.

In DisplayPort mode, the DP TX PHY 3450 and the DP RX PHY 3470 are enabled, while the USB 2.0 RX PHY 3430 and USB 2.0 TX PHY 3460 are disabled, as shown in the example in FIG. 35*a*. Only the DisplayPort data is transferred on the link and it follows standard DisplayPort protocol. The data flow 3510 under this mode is shown in FIG. 35*a*.

Figure 35B:
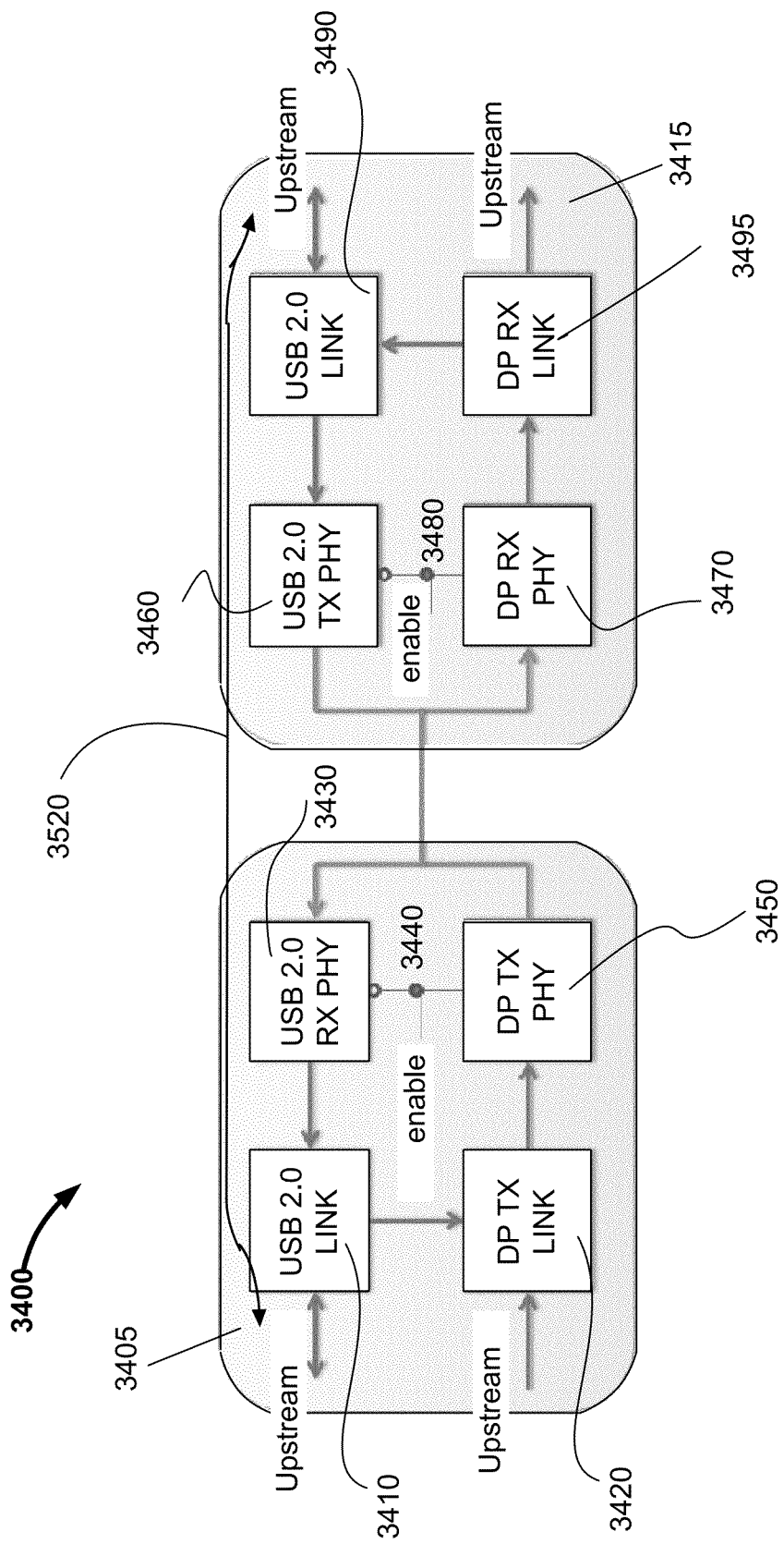

In USB mode, the DP TX PHY 3450 and DP RX PHY 3470 are disabled while USB 2.0 TX PHY 3460 and USB 2.0 RX PHY 3430 are enabled. The link may be working at USB 2.0 mode and bi-directional USB data may be transferred following the USB 2.0 standard. The data flow 3520 under this USB mode is shown in FIG. 35*b*.

In mixed mode, the DisplayPort source side may be configured to transmit a data flow that includes both USB protocol data and uncompressed high definition media data to the sink device. All the DP and USB 2.0 PHYs may be enabled, but not at the same time, according to an exemplary embodiment. USB 2.0 transaction is bi-directional, so the data transfer on the link may be performed in either the forward direction or backward direction. In the forward direction, the DP TX PHY 3450 and DP RX PHY 3470 may be enabled, while USB 2.0 TX PHY 3460 and USB 2.0 RX PHY 3430 may be disabled. The USB data may be transferred from the DisplayPort source side to the DisplayPort sink side, while at the same time the video stream data (which may be uncompressed high definition video data in an exemplary embodiment) may be transferred on the same link.

In mixed mode, the USB 2.0 transmitter data is sent to the DP TX LINK 3420 and multiplexed (muxed) together with the video data from upstream. A modified MST protocol may be applied to support transmission of both video data and USB data at the same time. The bandwidth allocation and throughput control may be done by the upstream device. That is, for forward USB transmission, the bandwidth allocation and throughput control may be performed by the source device 3405. Conversely, in backward USB transmission, the bandwidth allocation may be performed by the sink device 3415. At the DisplayPort receiver side, the recovered data from DP RX PHY 3470 is first sent to the DisplayPort RX LINK 3495 and then the extracted USB data is sent to the USB 2.0 LINK 3490.

In the backward direction, the USB data may be sent from DisplayPort sink side back to the DisplayPort source side. The backward data transfer may take place during the video blanking period. When USB data is sent in the backward direction, the DP TX PHY 3450 and DP RX PHY 3470 may be disabled and the USB 2.0 TX PHY 3460 and USB 2.0 RX PHY 3430 may be enabled. The link turn-around from the forward direction to the backward direction may take place after the last active pixel of the current display line is sent and the necessary MSA/VBID/SDP is transferred, which is done in the forward direction. MSA refers to Main Stream Attribute data, VBID refers to the Vertical Blanking IDentification data packet and SDP refers to the Secondary Data Packet.

The number of bytes to be sent in the backward direction may be pre-calculated and communicated through the AUX channel of the DisplayPort link. According to an exemplary embodiment, after the required USB data is transferred, another link turn-around may occur. That is, the link may go from the backward direction back to the forward direction, and the link may prepare for the next video line active pixels transfer.

Figure 35C:
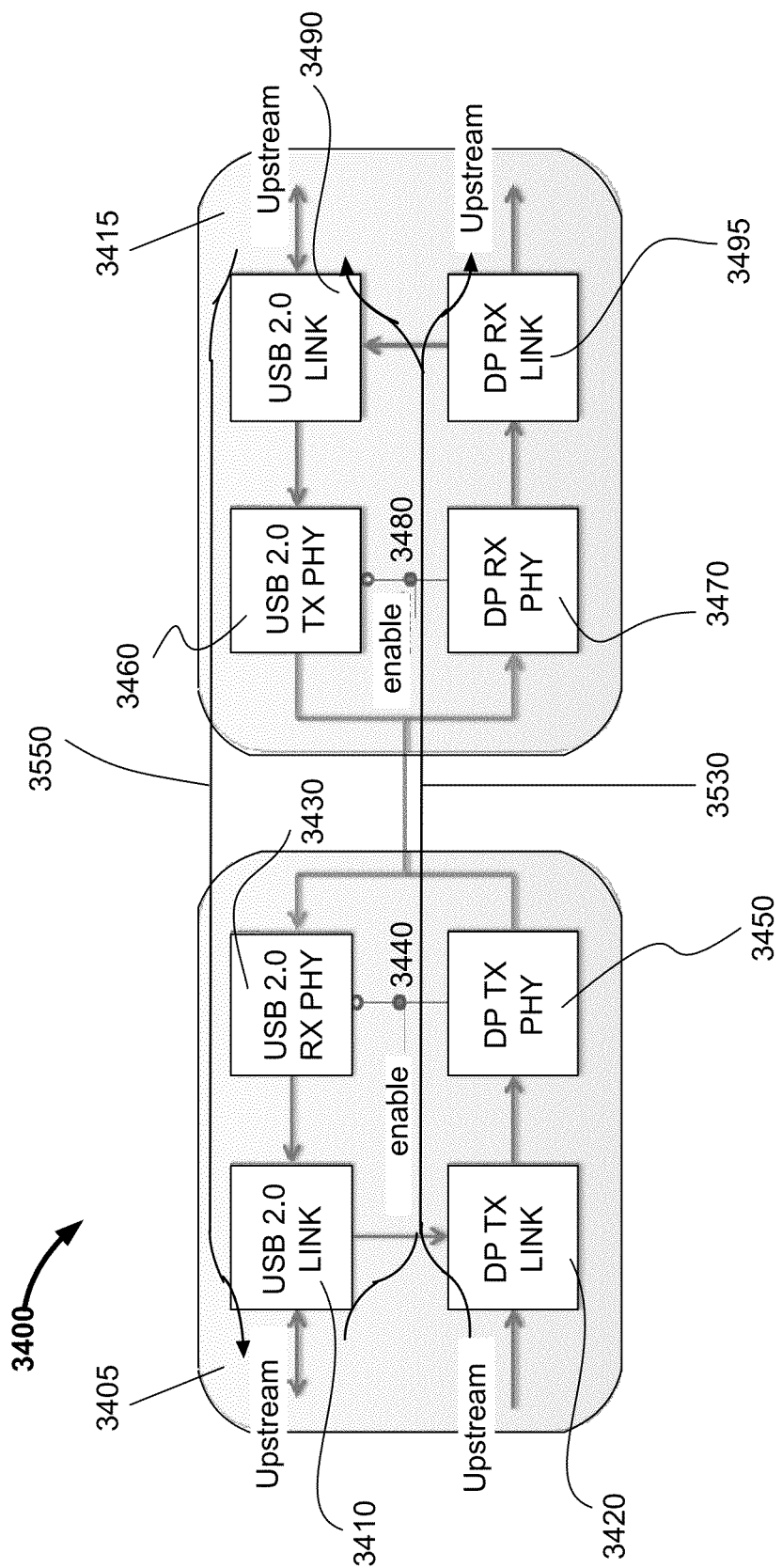

An exemplary forward/backward data flow under mixed mode is shown in FIG. 35*c*. The exemplary data flow 3530 may include the DisplayPort data flow together with USB forward data flow. The exemplary data flow 3550 may include the USB backward data flow.

Figure 36:
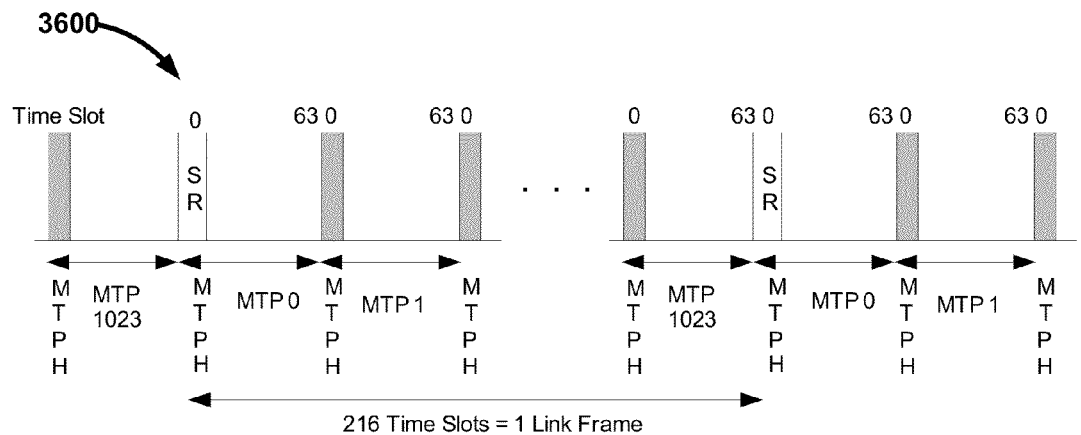
FIG. 36 is a timing diagram illustrating an exemplary media link timing for the transfer of media data in a multi-stream transport mode.
Figure 37:
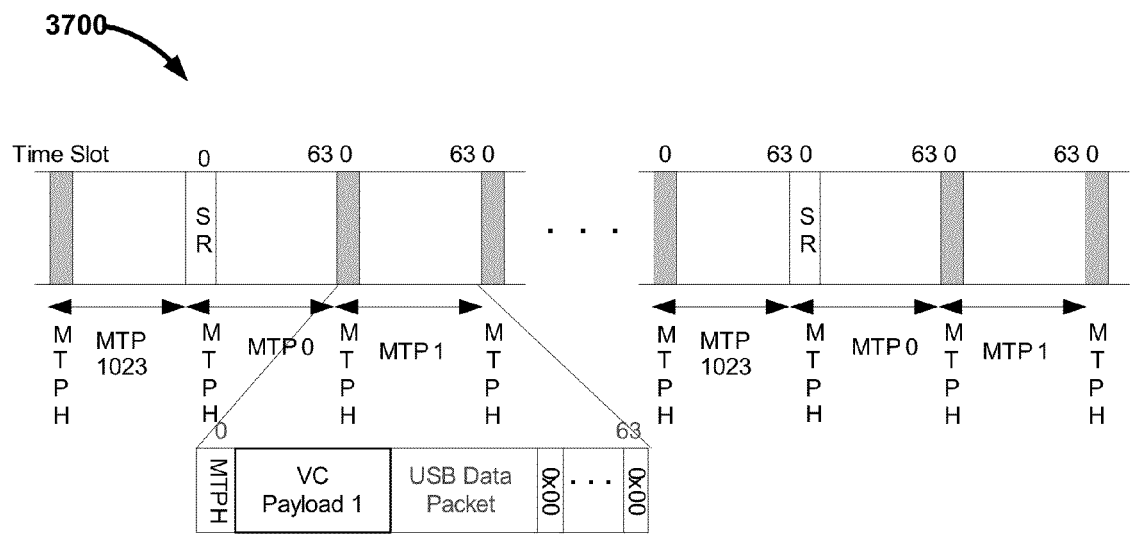
FIG. 37 is a timing diagram illustrating an exemplary media link timing for the transfer of media data and USB data in a multi-stream transport mode.
Figure 38:
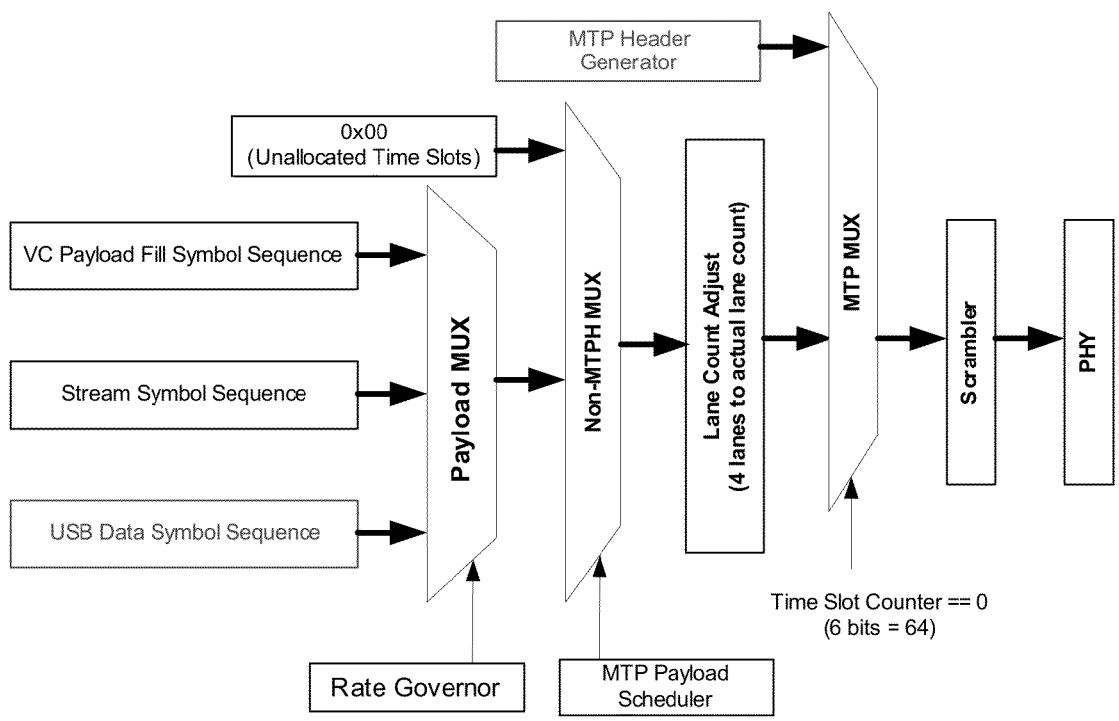
FIG. 38 is a block diagram for an exemplary embodiment of USB data packet insertion with media data in a multi-stream transport mode.

The DisplayPort link timing generation for the MST protocol may be defined in DisplayPort 1.2 and is repeated here in FIG. 36. To add the USB data transfer, the same link timing generation scheme may be applied, but with a change from the authentic video data to USB data, as shown in FIG. 37. The USB data sequence may be added into the VC (virtual channel) payload, as shown in an exemplary embodiment shown in FIG. 38. The USB data may just be treated as another pseudo 'video' stream with its content being not video data, but, rather, the USB 2.0 data.

The USB 2.0 Data packet insertion and deletion may be handled by a Payload Bandwidth Manager (PBN) the same way as defined in DisplayPort 1.2 Specification sections 2.6.3~2.6.5. In order to insert or delete a USB 2.0 data packet the PBN may first write to DPCD registers 0x001C0h~0x001C2h and then check the VC payload ID table update status on DPCD register 0x002C0 bit 0. If the VC payload ID table is updated, the PBN may trigger the VC payload allocation over the Main Link via inserting ACT Trigger sequence into four consecutive MTP Header time slots.

In order to identify the added stream is USB data packets in various embodiments, an extra bit is defined in DPCD register 0x001C0h, which is shown below:

TABLE 1

The DPCD register 0x001C0 definition with USB 2.0 data packet identifier

| DPCD Address (Hex) | Definition |
|---|---|
| 001C0 | Bits 6:0 = VC Payload ID to be allocated (R/W) ID of 0 means that the time slots unallocated. Bit 7 = USB 2.0 data packet identifier 1 = this payload ID corresponds to an USB 2.0 data stream 0 = this payload ID corresponds to normal video stream. |

In some embodiments, other DPCD register bits may be defined as the USB data packet identifier.

The allocated time slot for the USB 2.0 data may be calculated by the PBN using the following formula:

USB data packet time slot number=[20 Mhz/ DP_LINK_FREQUENCY(Mhz)*63]+1

According to various embodiments, the DP_LINK_FREQUENCY is 162 Mhz (RBR mode), 270 Mhz (HBR mode) or 540 Mhz (HBR2 mode).

The starting position of the time slot and the time slot count may then be written into DPCD registers 0x001C1h and 0x001C2h, respectively.

Figure 39:
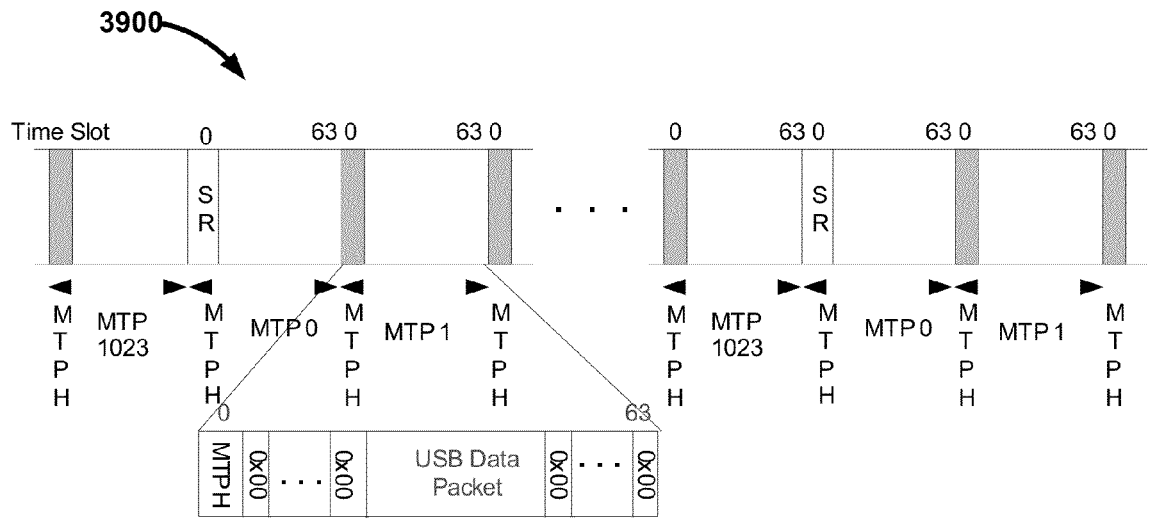
FIG. 39 is a timing diagram illustrating an exemplary USB data allocation within a single transfer unit during a video blanking period.

During the video horizontal and/or vertical blanking period, if there is no data transferred from the sink side, the DP source device may still use this time to transfer USB data if desired. The data arrangement within the TU (transfer unit) may be slightly different from the embodiment shown in FIG. 37 where there is active pixel in parallel. The data bytes allocation during the video blanking period may be as shown in the embodiment in FIG. 39. A difference in FIG. 39 from FIG. 36 is the VC payload 1, which represents active video pixels in FIG. 37, are replaced with NULL data in FIG. 39.

Figure 40:
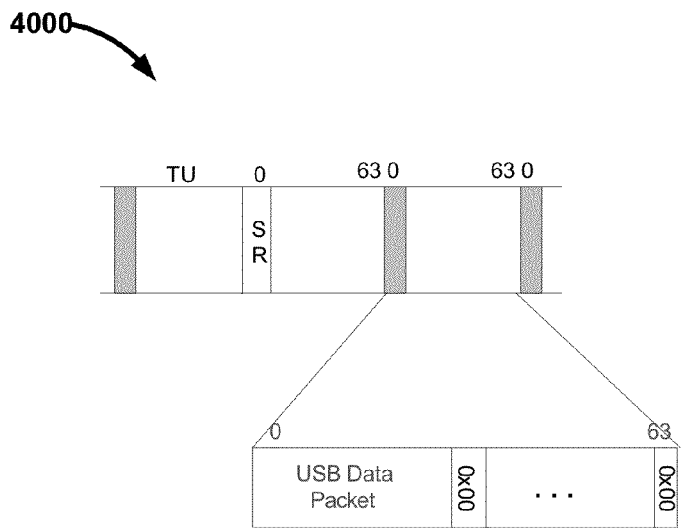
FIG. 40 is a timing diagram illustrating an exemplary USB data allocation within a single transfer unit during a video blanking period during a backward transfer.

As described above, the USB data backward transfer may be accomplished during the video horizontal blanking period for each video line. The data transfer may follow the SST (single-stream transport) protocol defined in DP 1.2 standard since only one stream is transferred. The Main Stream Attribute (MSA) may be modified to support such data transfer. The USB data allocation may be as shown in FIG. 40. The occupied byte number within the TU may be calculated similarly to the calculation for the USB data forward transfer. The exemplary calculation formula is shown below:

USB data packet time slot number=[20 Mhz/ DP_LINK_FREQUENCY(Mhz)*64]+1

Figure 41:
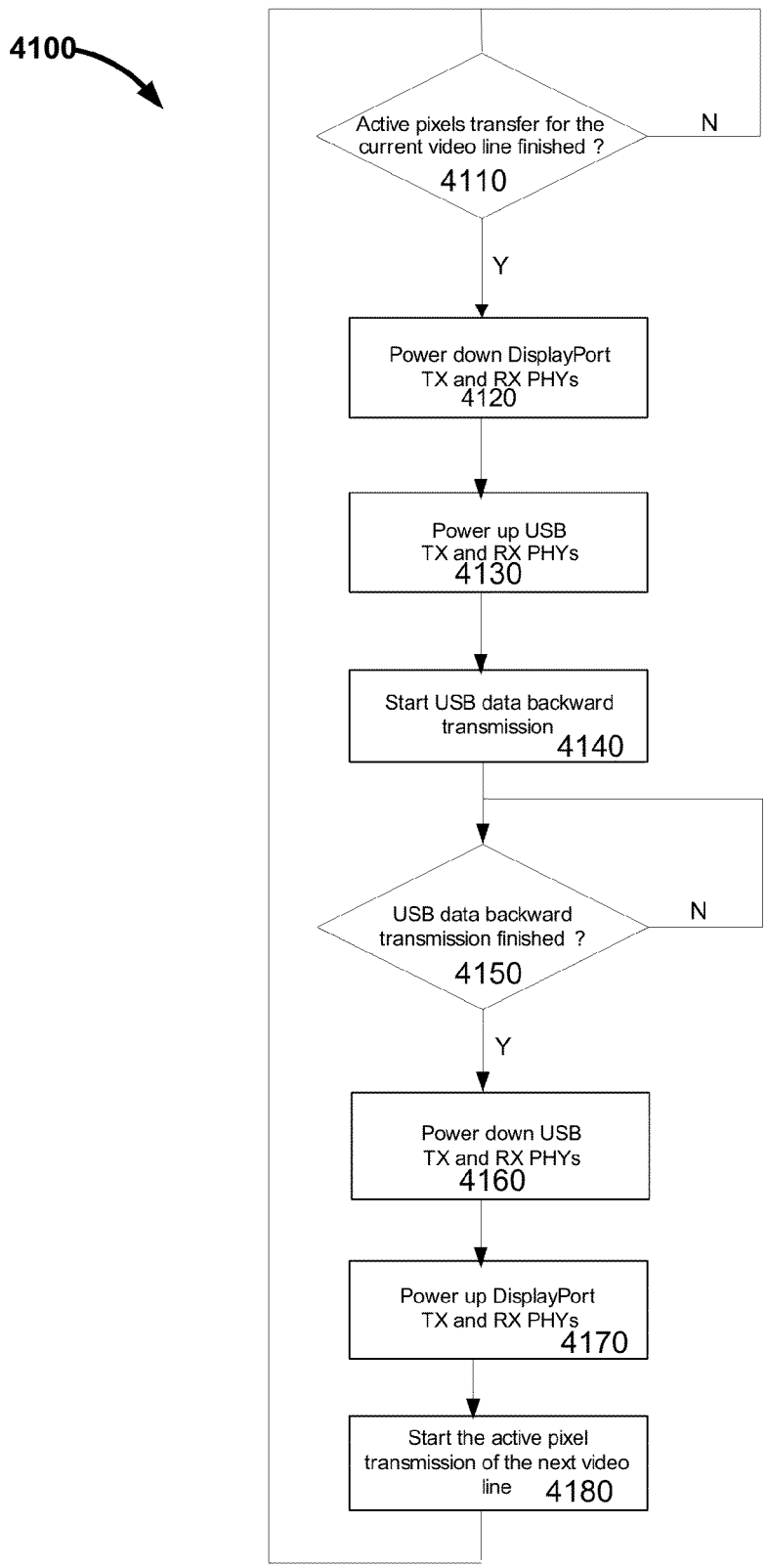
FIG. 41 is flow chart of an exemplary method for media link turn-around and USB data backward transmission.

FIG. 41 is a flow chart 4100 of an exemplary method for media link turn-around, USB data backward transmission, and USB data forward transmission. The DisplayPort source device may send inquiry through the AUX channel during the video active period to check if there is need for a USB backward transfer. If the DisplayPort sink device acknowledges this request, both sides may start to prepare link turn-around after the last active pixel of the current video line is transferred (e.g., operation 4110). The DisplayPort source PHY and sink PHY may first power down to put the physical link in between in idle (high-Z) mode (e.g., operation 4120), then the USB TX PHY on the DisplayPort sink side and the USB RX PHY on the DisplayPort source side may power up (e.g., operation 4130) to perform the USB data transfer from sink side to the source side (e.g., operation 4140). After the USB transmission is finished in various embodiments (e.g., operation 4150), the USB PHYs return to the power down state (e.g., operation 4160) and the DisplayPort PHYs return to the normal operation mode during USB data forward transmission (e.g., operation 4170) so as to continue to send the next active video line (e.g., operation 4180).

The USB backward transfer inquiry may also be achieved by the HPD interrupt event. Once an HPD interrupt event is detected for USB backward transfer, the DisplayPort source device may inform the sink device to acknowledge this event and both sides may prepare such transfer at the next video blanking period.

In various embodiments, the Main Stream Attribute (MSA) data format, originally defined in DisplayPort specification, is modified to support USB data transfer. An exemplary new MSA data format to support USB data transfer under different lane count configuration is shown in FIG. 42. The Dtotal[23:0] may be the total number of bytes within the current USB data packet.

In some embodiments, the source device and/or sink device may include proprietary connectors for communicatively coupling a proprietary port to an external interface that is in turn coupled between the source and sink devices. In various embodiments, various USB connectors and/or DisplayPort connectors, examples of which are described herein, may be used at sink and/or source device to couple to an external interface for data transfer between the devices. The source device and sink device may be communicatively coupled using an external interface, which may be, for example, a cable or similar suitable interface.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

The invention claimed is:

1. A method for selectively communicating data between a first device and a second device, the method comprising:
receiving an indication of a configuration of the second device;
generating a selection signal based on the configuration of the second device; and
causing Universal Serial Bus (USB) protocol data, uncompressed high definition media data, or a combination thereof to be selectively supplied to the second device by the first device, via an external interface, based on the selection signal, wherein the indication is received by the first device via the external interface, the indication being indicative of a USB mode, a media mode, or a mixed mode; and in the mixed mode, configuring the first device to transmit a data flow comprising both the USB protocol data and the uncompressed high definition media data to the second device and configuring the first device to receive USB protocol data from the second device, wherein the USB protocol data from the second device is received during a video blanking period.

2. The method of claim 1, further comprising detecting that the second device is communicatively coupled to the first device via the external interface.

3. The method of claim 2, wherein the external interface is a USB interface.

4. The method of claim 2, wherein the external interface is a DisplayPort interface.

5. The method of claim 2, further comprising transmitting by the first device the selected data over the external interface to the second device.

6. The method of claim 1, further comprising, in the USB mode, configuring the first device to receive the USB protocol data from the second device.

7. The method of claim 1, further comprising, in the mixed mode, generating the data flow comprising the USB protocol data and the uncompressed high definition media data multiplexed together, the data flow being selectively supplied to the second device by the first device based on the selection signal.

8. The method of claim 1, further comprising, in the mixed mode, using an extra bit in a configuration data register to identify that the data flow includes USB data packets.

9. The method of claim 1, wherein the indication of the device configuration is indicative of resources available to the second device.

10. The method of claim 1, wherein the uncompressed high definition media data comprises at least one lane of data in accordance with a DisplayPort standard.

11. The method of claim 1, wherein the uncompressed high definition media data further comprises one or more of audio data and side-band communication data.

12. The method of claim 1, wherein the external interface is operative to communicatively couple a proprietary port of the first device to the second device and comprises a cable.

13. A system for transferring data, the system comprising:
a first device comprising:
a first media port;
a first Universal Serial Bus (USB) transceiver circuit operative to send and receive USB protocol data signals via the first media port;
a transmitter circuit operative to transmit uncompressed high definition media signals and USB protocol data signals via the first media port; and
a first selection circuit operative to selectively couple at least one of the USB transceiver circuit and the transmitter circuit to the first media port based at least on a first configuration data received at the first media port, the first configuration data being associated with a second device; and the second device comprising:
a second media port;
a second USB transceiver circuit operative to send and receive USB protocol data signals via the second media port;
a receiver circuit operative to receive the uncompressed high definition media signals and the USB protocol data signals via the second media port; and
a second selection circuit operative to selectively couple at least one of the USB transceiver circuit and the receiver circuit to the second media port based at least on a second configuration data received at the second media port, the second configuration data being associated with the first device;
the first configuration data comprising an indication of a configuration of the second device received by the first device from an external interface, the indication being indicative of a USB mode, a media mode, or a mixed mode;
in the mixed mode, configuring the first device to transmit a data flow comprising both the USB protocol data signals and the uncompressed high definition media signals to the second device via the external interface and configuring the first device to receive USB protocol data from the second device via the external interface, and wherein the USB protocol data from the second device is received during a video blanking period.

14. The system of claim 13, wherein the first selection circuit comprises a controller coupled to the first USB transceiver circuit and the transmitter circuit.

15. The system of claim 14, wherein the controller enables at least one of the USB transceiver circuit and the transmitter circuit to communicate with the first media port as a function of the second device configuration.

16. The system of claim 13, wherein the first selection circuit comprises a controller coupled to an analog switch.

17. The system of claim 16, wherein the controller is operative to cause the analog switch to couple at least one of the first USB transceiver circuit and the transmitter circuit to the first media port as a function of the second device configuration.

18. The system of claim 13, wherein the first USB transceiver circuit and the second USB transceiver circuit conform to one of a USB 2.0 standard and USB 3.0 standard.

19. The system of claim 13, wherein the first device is configured to transmit to the second device a data flow comprising both the USB protocol data signals and uncompressed high definition media signals.

20. The system of claim 19, wherein the data flow, comprising both the USB protocol data signals and uncompressed high definition media signals, is transmitted on a DisplayPort link between the first and second devices, the uncompressed high definition media data signals comprising at least one lane of data in accordance with a DisplayPort standard.

* * * * *